United States Patent
Lida et al.

(10) Patent No.: US 9,331,962 B2
(45) Date of Patent: May 3, 2016

(54) METHODS AND SYSTEMS FOR TIME SENSITIVE NETWORKS

(75) Inventors: Eyran Lida, Kfar Ha-Oranim (IL); Nadav Banet, Kadima (IL); Aviv Salamon, Raanana (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 501 days.

(21) Appl. No.: 13/169,877

(22) Filed: Jun. 27, 2011

(65) Prior Publication Data

US 2011/0317587 A1    Dec. 29, 2011

Related U.S. Application Data

(60) Provisional application No. 61/358,917, filed on Jun. 27, 2010.

(51) Int. Cl.

| | |
|---|---|
| *H04L 12/28* | (2006.01) |
| *H04W 4/00* | (2009.01) |
| *H04L 12/939* | (2013.01) |
| *H04L 1/00* | (2006.01) |
| *H04L 12/26* | (2006.01) |
| *H04L 12/823* | (2013.01) |
| *H04L 29/06* | (2006.01) |

(52) U.S. Cl.
CPC ............ *H04L 49/557* (2013.01); *H04L 1/0072* (2013.01); *H04L 12/2832* (2013.01); *H04L 12/2838* (2013.01); *H04L 43/0847* (2013.01); *H04L 47/32* (2013.01); *H04L 49/555* (2013.01); *H04L 69/22* (2013.01); *G09G 2370/20* (2013.01); *H04L 2012/2849* (2013.01)

(58) Field of Classification Search
None
See application file for complete search history.

(56) References Cited

U.S. PATENT DOCUMENTS

| | | | | |
|---|---|---|---|---|
| 6,081,536 | A * | 6/2000 | Gorsuch et al. | 370/468 |
| 8,228,861 | B1 * | 7/2012 | Nix | 370/329 |
| 2006/0242669 | A1 * | 10/2006 | Wogsberg | 725/74 |
| 2008/0144568 | A1 * | 6/2008 | Usuda et al. | 370/329 |
| 2009/0015723 | A1 * | 1/2009 | Doumuki | 348/725 |
| 2009/0296731 | A1 * | 12/2009 | Lida | G06F 3/1454 370/449 |
| 2010/0034107 | A1 * | 2/2010 | Chin et al. | 370/252 |
| 2011/0156944 | A1 * | 6/2011 | Ward et al. | 341/176 |
| 2011/0206035 | A1 * | 8/2011 | Lee et al. | 370/351 |

* cited by examiner

*Primary Examiner* — Kodzovi Acolatse
(74) *Attorney, Agent, or Firm* — Active Knowledge Ltd.

(57) ABSTRACT

A packet based switched multimedia network which consolidates networking of high throughput, time sensitive data, and control streams, with Ethernet data networking over home span. The multimedia network may support in parallel, over the same home span cabling infrastructure, high quality networking including time sensitive data streams, such as HDMI, USB, and Ethernet, transparent network attachment for legacy devices, multi stream, and low power modes.

16 Claims, 24 Drawing Sheets

| | Device Discovery Method | Device Directional Connectivity Discovery Method | Session Possible Routes Discovery Method |
|---|---|---|---|
| "Many" CPs & "Many" RPEs | PDME: By Periodic SNPM<br>SDME: Device Status Broadcast<br>CPME: Device Status Broadcast<br>RPE: Device Status Broadcast | PDME: By Periodic SNPM<br>SDME: By Periodic SNPM<br>CPME: Directional Connectivity Broadcast<br>RPE: Directional Connectivity Broadcast | PDME: By Unicast SNPM / from RPE<br>SDME: By Unicast SNPM / from RPE<br>CPME: From RPE<br>RPE: Link Status Broadcast |
| "Many" CPs & "Few" RPEs | PDME: By Periodic SNPM<br>SDME: Device Status Broadcast<br>CPME: Device Status Broadcast<br>RPE: Device Status Broadcast | PDME: By Periodic SNPM<br>SDME: By Periodic SNPM<br>CPME: Directional Connectivity Broadcast<br>RPE: Directional Connectivity Broadcast | PDME: By Unicast SNPM / from RPE<br>SDME: By Unicast SNPM / from RPE<br>CPME: From RPE<br>RPE: Link Status Unicast |
| "Few" CPs & "Few" RPEs | PDME: By Periodic SNPM<br>SDME: By Periodic SNPM<br>CPME: Device Status Unicast<br>RPE: Device Status Unicast | PDME: By Periodic SNPM<br>SDME: By Periodic SNPM<br>CPME: Directional Connectivity Unicast<br>RPE: Directional Connectivity Unicast | PDME: By Unicast SNPM / from RPE<br>SDME: By Unicast SNPM / from RPE<br>CPME: From RPE<br>RPE: Link Status Unicast |
| "Many" CPs & No RPEs | PDME: By Periodic SNPM<br>SDME: Device Status Broadcast<br>CPME: Device Status Broadcast | PDME: By Periodic SNPM<br>SDME: By Periodic SNPM<br>CPME: Directional Connectivity Broadcast | PDME: By Unicast SNPM<br>SDME: By Unicast SNPM<br>CPME: By Unicast SNPM |
| "Few" CPs & No RPEs | PDME: By Periodic SNPM<br>SDME: By Periodic SNPM<br>CPME: Device Status Unicast | PDME: By Periodic SNPM<br>SDME: By Periodic SNPM<br>CPME: Directional Connectivity Unicast | PDME: By Unicast SNPM<br>SDME: By Unicast SNPM<br>CPME: By Unicast SNPM |
| No CPs & No RPEs | PDME: By Periodic SNPM<br>SDME: By Periodic SNPM | PDME: By Periodic SNPM<br>SDME: By Periodic SNPM | PDME: By Unicast SNPM<br>SDME: By Unicast SNPM |

FIG. 17

METHODS AND SYSTEMS FOR TIME SENSITIVE NETWORKS

CROSS-REFERENCE TO RELATED APPLICATIONS

This application claims the benefit of U.S. Provisional Patent Application No. 61/358,917, filed Jun. 27, 2010.

BACKGROUND

Various time sensitive and asynchronous communication networks supporting different physical infrastructures and standards for their operation have been developed. The physical infrastructures may include, for example, twisted pair cables, coaxial cables, phone lines, optical fibers, or power line communication channels. Thus, there is a need for a multimedia network which consolidates networking of high throughput, time sensitive data, control streams, and asynchronous data over home span.

BRIEF SUMMARY

Some of the embodiments disclose a packet based switched Multimedia Network which consolidates networking of high throughput, time sensitive data, and control streams, with Ethernet data networking over home span. The Multimedia Network may be implemented over any appropriate physical media. The Multimedia Network may support in parallel, over the same home span cabling infrastructure, high quality networking including one or more of the following features: (i) time sensitive data streams such as HDMI, USB, and Ethernet; (ii) transparent network attachment for legacy devices; (iii) multi stream; (iv) self installable; (v) pure Ethernet control points; (vi) low cost CE solutions; and (vii) Low Power Partial Functionality modes.

BRIEF DESCRIPTION OF THE DRAWINGS

The embodiments are herein described, by way of example only, with reference to the accompanying drawings. In the drawings:

FIG. 17 illustrates examples of different discovery methods.

DETAILED DESCRIPTION

Figure 1:
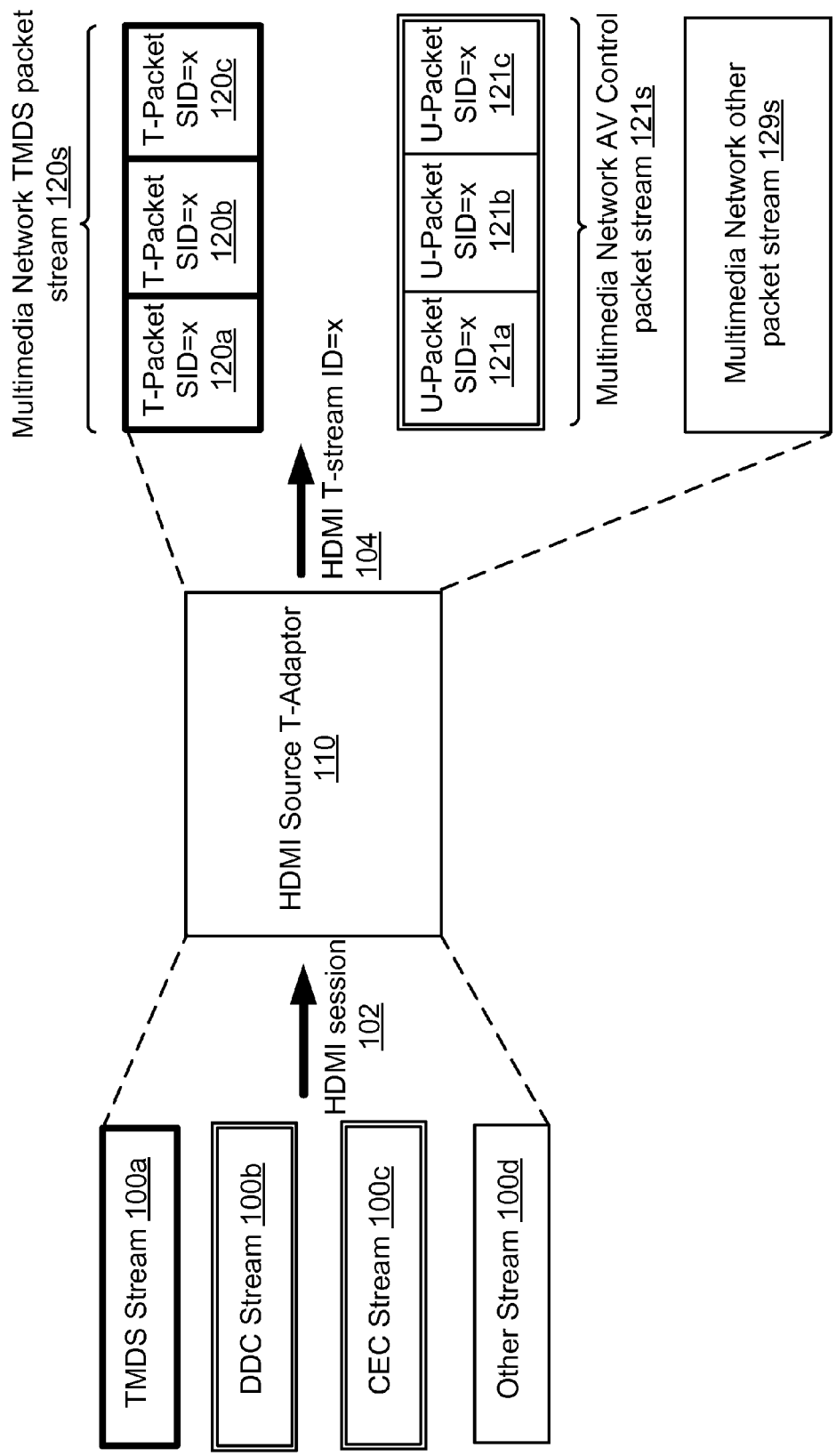
FIG. 1 illustrates one embodiment of a T-Stream.

Certain terminology is used throughout this document. Some of such terms are defined immediately below, but other terms may be defined throughout the specification.

"T-Adaptor" denotes an entity which converts protocol/interface/application data representation to a Multimedia Network representation and/or vice versa. T-Adaptors may use the T-Network services to communicate with other T-Adaptors of the same type. In one embodiment, T-Adaptors select the proper T-Services to communicate over a connected group of switch/daisy chain devices. The switch/daisy chain devices are not aware of the T-Adaptors types and handle their messages according to their selected T-Services. "T-Network" denotes a time sensitive data communication network that includes at least one T-Adaptor. "T-Services" denotes data services that are offered by the T-Network. These services may vary by protocols, interfaces, and/or applications.

T-Adaptors communicate with each other after a "session" has been created. In one embodiment, a session defines the communication network path between the T-Adaptors. Each active session is marked by a session identification (SID) token, sometimes referred to as Stream ID, which may be carried by each Multimedia Network packet, belonging to that particular session. Optionally, the switches along the network path switch packets according to their SID tokens. The usage of SID tokens minimize the overhead of packet addressing, thereby allowing the use of short packets required to insure low latency variation of a multi stream/hops network path, and to utilize efficiently the available throughput.

"T-Stream" denotes a collection of Multimedia Network packet streams, which convey information belonging to at least one protocol, interface, and/or application, involving a T-Adaptor. In one embodiment, packets belonging to a certain T-Stream carry the same SID token. The T-Stream may be comprised of packets of the same type, each requiring the same or a similar level of service from the T-Network, or may be of different types, each type requiring a different level of service from the T-Network.

In one embodiment, for some T-Adaptors, the native protocol, interface, and/or application may maintain more than one native session at the same time. In these cases, the T-Adaptor may create more than one T-stream, such as USB stream, since a USB host may interact simultaneously with more than one USB device, even though each device may be located at a different location in the network. A multi T-Stream T-Adaptor may split or merge a native session to the appropriate T-Streams, according to the native conventions of the particular protocol or interface.

"T-Group", also referred to as "T-G" denotes an entity which provides a network interface point for one or more T-Adaptors of different types. In one embodiment, the following features are typical of a T-Group, although these features may not be required and do not limit the scope of various embodiments: (i) T-Adaptors which are associated with the same T-Group may be coupled in a single session; (ii) Single T-Stream T-Adaptors are associated with one T-Group, whereas Multi T-Stream T-Adaptors may be associated with more than one T-Group; (iii) Two T-Adaptors, which are both receiving/transmitting the same packet type, might not be associated with the same T-Group; (iv) A session is created between T-Groups over the T-Network, identified by its SID token. The session may include all or some of the T-Adaptors which are associated with these T-Groups; (v) Using the SID, the network may route the associated T-Streams packets to the proper T-Group, the T-Group can dispatch the packets to the proper T-Adaptor according to the packet types, and the T-Adaptor can dispatch packets data to the proper session according to the packet's type and SID; (vi) A T-Group may take part in more than one active session at the same time. For example, but not by way of limitation, there may be multiple active sessions if a T-Group is associated with a multi T-Stream T-Adaptor or if the different sessions are using different sub sets of T-Adaptors from the T-Group.

"Multimedia Network Transmitter (TX) Function" denotes an entity which includes one or more downstream sub link transmitters and one or more upstream sub link receivers. In one embodiment, a transmitter couples/decouples one or several T-Streams with Ethernet packets into and/or out of the Multimedia Network link. "Multimedia Network Receiver (RX) Function" denotes an entity which includes at least one downstream sub link receiver and at least one upstream sub link transmitter. In one embodiment, a Receiver couples and/or decouples one or several T-Streams with Ethernet packets into and/or out of the Multimedia Network link.

"T-Switching Element" denotes an entity which performs switching of T-Stream Multimedia Network packets according to their SID tokens. "Ethernet switching element" denotes an entity which performs native Ethernet MAC addresses switching. In one embodiment, in each network hop, the Ethernet data is being encapsulated into Multimedia Network packets at one end, and de-capsulated at the other end, before the data is switched by the Ethernet switching element. Such mechanism insures seamless connectivity of Multimedia Network devices to legacy Ethernet networks and devices. "Switching Device Management element" (SDME) denotes an entity which manages the operation of the switching device, including the switching device's interaction with other switching devices in the Network and with the Multimedia Network Control Functions. "Multimedia Network Switching Device" denotes a Multimedia Network device including: (i) A T-Switching Element; (ii) An Ethernet Switching Element; and (iii) A Switching Device Management Element (SDME). A switch device may contain embedded T-Adaptors. These embedded T-Adaptors may be associated with one or more T-Groups. These T-Groups may be "located" in one or more virtual port elements inside the switch. The switch device may choose the internal connectivity scheme of these virtual ports and the T-Switching element (the virtual port may be RX/TX or symmetric).

"End Node Device", also referred to as "Multimedia Network End Node", denotes a device comprising one or more Multimedia Network port Devices with no T-Switching functionality between them. In one embodiment, an End Node Device may provide E-Switching functionality. Each end node port device includes (i) One or more T-Adaptors associated with one or more T-Groups; and (ii) A "Port Device Management Entity" (PDME). Each end node port device may provide Ethernet termination (MAC).

"Control Point function", also referred to as "CP", denotes an entity which allows the user to control and maintain the T-Network sessions between the various T-Adaptors in the network. In one embodiment, each CP may include a "Control Point Management Entity" (CPME). A CPME is an entity which communicates with other management entities such as SDMEs, Port Device Management Entities (PDMEs), and/or other CPMEs. CPMEs use regular Ethernet communication, therefore a CP can be implemented in an Ethernet enabled device including pure Ethernet devices. A CP can report the capabilities of the current network T-Adaptors, their directional connectivity, and their active sessions' status. The CP allows the user to create and control sessions between T-Adaptors, between T-Groups, and between T-Adaptors and T-Groups. Multiple CPs may exist and operate at the same time.

"Edge Link" denotes a Multimedia Network link which directly connects a switch device with an end node device. "Edge Port" denotes a Multimedia Network Port Device which is the connection point of an Edge Link to a switch device. "Edge Switch" denotes a Multimedia Network switch device which contains at least one edge port or at least one active T-Adaptor. "Edge SDME" denotes an SDME of an edge switch.

"Intra Link" denotes a Multimedia Network link which directly connects a switch device with another switch device. "Intra Port" denotes a Multimedia Network Port Device which is the connection point of an Intra Link to a switch device. "Intra Switch" denotes a Multimedia Network switch device which contains only intra ports and does not contain active T-Adaptors. "Intra SDME" denotes an SDME of an intra-switch.

"Multimedia Network Sub Network" denotes a group of Multimedia Network devices, connected with Multimedia Network links between them. In one embodiment, the boundaries of the Multimedia Network sub network are defined by the T-Adaptor elements. Legacy networking interfaces, such as Ethernet and HDMI-CEC, may be connected to the devices in the Multimedia Network Sub Network. These legacy interfaces may create a connection between Multimedia Network Sub Networks over the same legacy network. If multiple Multimedia Network Sub Networks are connected to the same pure Ethernet network, they may all belong to the same Ethernet broadcast domain.

"Multimedia Network Half-Link" denotes a low-power connectivity link which may deliver one or more of the following: high-throughput time-sensitive data (such as uncompressed Multimedia Network content, encapsulated using HDMI-HDCP link layer) from source to sink (optionally unidirectional), control data between source and sink (optionally bidirectional), and Ethernet data between Source and Sink (optionally bidirectional). It may also support low voltage power delivery over the same cable using Power over Multimedia Network (PoMN) methods.

The Multimedia Network

In one embodiment, the Multimedia Network is a packet based switched networking system which consolidates networking of high throughput, time sensitive data, and control streams, with Ethernet data networking over home span. Although many of the embodiments describe the Multimedia Network over standard CATSe/6 structured cabling, the Multimedia Network may be implemented over any appropriate physical media, such as non CATSe/6 wiring, modular connector, coaxial cable, and/or optical fiber.

In one embodiment, the Multimedia Network supports in parallel, over the same home span cabling infrastructure, high quality networking including one or more of the following features: (1) Time sensitive data streams such as (a) HDMI 1.4 streams with their associated controls; (b) S/PDIF streams; (c) USB streams; (d) Ethernet data; (2) Provide transparent network attachment for legacy devices/interfaces, such as HDMI, Ethernet, USB, and/or S/PDIF; (3) Provide transparent network attachment for future supported devices/interfaces, such as generalized core network services; (4) Self installable, where the Multimedia Network devices do not have to be individually configured in order to operate correctly over the network; (5) Enable pure Ethernet devices to function as Multimedia Network Control Points; (6) Enable low cost solutions for the CE price points; (7) Provide multi Stream support, such as supporting at the same time, over a link, at least one or the following: (a) 8 HDMI 1.4 down streams; (b) 12 USB or S/PDIF bi-directional streams; (c) 8 IR and 8 UART bi-directional streams; (8) Support link management HLIC commands; (9) Support two Low Power Partial Functionality (LPPF) modes: (a) LPPF #1 to support Multimedia Network Standby mode Interface (HDSBI) to transfer DDC, CEC, HPD, HLIC, IR and UART; and (b) LPPF #2 to Support HDSBI on pairs C&D and 100BaseTX full duplex on pairs A&B in the case of CAT5 cabling; (10) Support the optional Power over Multimedia Network (PoMN); (11) Co-exist with power transfer in Power over Ethernet (PoE) IEEE 802.3af and IEEE 802.3at techniques; (12) Extend PoMN power transmission to 100 W.

FIG. 1 illustrates one embodiment of a T-Stream. Three basic components are depicted, which will be explained. These three components are data input on the left, elements 100a-100d and 102, HDMI Source T-Adaptor 110 in the center, and data output on the right, elements 120a-120c, also designed 120s, 121a-121c, also designated as 121s, and element 129s. Various types of data are inputted into the system as High-Definition Multimedia Network Interface (HDMI) data. The act of inputting such data appears as HDMI session 102. This type of data may take different forms. Examples depicted in FIG. 1 include Transition Minimized Differential Signaling (TMDS) data 100a, Display Data Channel (DDC) 100b, and Consumer Electronics Control (CEC) data 100c. Other types of data, represented by element 100d, may also accompany the HDMI session.

Data inputted by the HDMI session 102 is processed by the HDMI Source T-Adaptor 110. The T-Adaptor is an entity that converts protocol/interface/application data representation to Multimedia Network data representation, and/or vice versa from Multimedia Network data representation to a different protocol/interface/application data. T-Adaptors use the T-Network services to communicate with other T-Adaptors of the same type. There are many possible kinds of T-Adaptors, including, among others, (1) an HDMI Source T-Adaptor 110, that converts from HDMI data to HDMI T-Stream data; (2) an HDMI Sink T-Adaptor that converts from HDMI T-Stream data to HDMI data; (3) a USB Host T-Adaptor the converts from USB data to USB T-Stream data and vice versa; and (4) a USB Dev/Hub T-Adaptor that converts from USB T-Stream to USB data and vice versa.

However, it is noted that although the T-Stream and other related elements and embodiments are exemplified herein using HDMI, the concept of the T-Stream and the other related elements and embodiments is not limited in any manner to HDMI, and is applicable to other multimedia formats, such as DisplayPort, DiiVA, Serial digital interface (SDI), or Thunderbolt.

The HDMI Source T-Adaptor 110 takes the inputted data and converts it into one or more streams. One typical stream may include T-packets with session ID=X, elements 120a, 120b, and 120c (that collectively comprise element 120s). A second typical stream may include control data, which are elements 121a, 121b, and 121c (that collectively comprise element 121s). Element 120s shows T-packets with SID=x, which are TMDS data packets converted from HDMI source data by the HDMI Source T-Adaptor 110. An "SID", may also be known as a "Session ID", "Session Identifier", "Session Token", "Stream ID", Stream Identifier", or "Stream Token". The SID is a token within a data packet or group of packets used in data network communication to identify a "session", in which the "session" is a data dialogue or conversation between multiple communication devices or between a communication device and a human user. In essence, 120s shows one example that certain HDMI session data have been converted by the HDMI Source T-Adaptor so that they may be sent optionally in serial fashion, optionally uncompressed, but in a manner which does not require HDMI cables.

In contrast to TMDS data in element 120s, element 121s shows control packets. The individual elements 121a, 121b, and 121c, respectively, are audio-visual stream controls, according to any number of possible formats, including, inter alia, DDC, CEC, HPD, and +5V Indication. These elements, also designated as 120s, provide guidance and control of HDMI T-Network.

In other, alternative embodiments, additional HDMI session data is processed. This extra data is represented in FIG. 1 as Other Stream 100d. It may be information packets, or control packets, or other types of packets (such as, for example but not by way of limitation, quality checking packets, or management packets, or something else). This Other Stream 100d may be processed, and may become part of 120s, or may become part of 121s, or may become part or all of Multimedia Network Other packet stream 129s.

As shown in FIG. 1, the information streams 120a-c, together with the control packets 121a-c, and the Multimedia Network Other packet stream 129s, comprise the HDMI T-Stream 104 outputted by the HDMI Source T-Adaptor 110. Also as shown in FIG. 1, it is element 100a that is converted by the HDMI Source T-Adaptor 110 to become elements 120a-c, whereas it is the control HDMI data, represented by 100b and 100c, which become the control packets 121a-c, and whereas it is Other Stream 100d which may become 120s and/or 121s and/or 129s.

In one embodiment, the T-Group may be important for calculating sessions, because the T-Group couples T-Adaptor to an entity, and calculations may be made on that entity. One potentially unique aspect is that different sessions are not required for related T-Adaptors. That is, the T-Group provides an additional hierarchy level that may reduce the total number of sessions, and hence simplify the session calculations.

Figure 2:
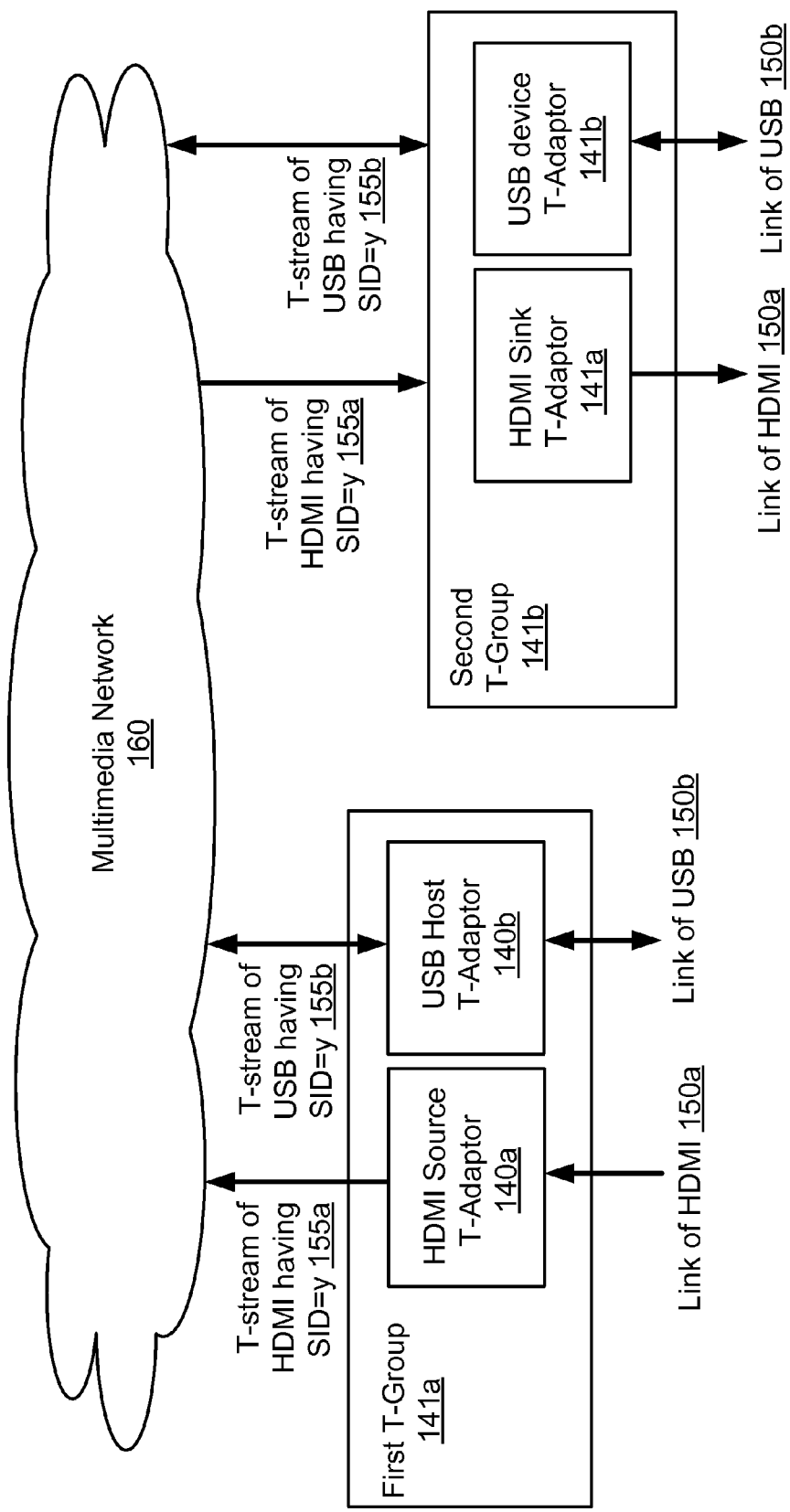
FIG. 2 illustrates one embodiment of T-Groups.

FIG. 2 illustrates one embodiment of T-Groups. A first set of at least two T-Adaptors 140a and 140b are identified as being related. The at least two T-Adaptors 140a and 140b are aggregated into a first T-group 141a. A second set of at least two T-Adaptors 141a and 141b are identified as being related. The at least two T-Adaptors 141a and 141b are aggregated into a second T-group 141b. A unique SID is selected to represent T-Streams connecting the T-Adaptors of the first T-Group 141a with T-Adaptors of the second T-Group 141b; this unique ID is illustrated as having a value of y. Link 150a is converted by T-Adaptor 140a into T-Stream 155a, and Link

150b is converted by T-Adaptor 140b into T-Stream 155b. The T-Streams 155a and 155b have the same SID value of y. A Multimedia Network 160 switches T-Streams 155a and 155b, using the SID value of y to indicate switching path, and delivers T-Streams 155a and 155b into the second T-Group 141b. Within the second T-Group 141b, T-Stream 155a is directed towards T-Adaptor 141a, and T-Stream 155b is directed towards T-Adaptor 141b. Since both T-Stream 155a and T-Stream 155b have the same SID of y, the direction of the T-Streams 155a and 155b into the appropriate T-Adaptors of the second T-Group 141b is done by analyzing the type of each T-Stream, and concluding the appropriate T-Adaptor destination accordingly. It is noted that only one SID is used in association of switching multiple T-Streams that are related. According to one example, link 150a is a link of HDMI, link 150b is a link of USB, T-Adaptor 140a is a T-Adaptor of HDMI Source, T-Adaptor 140b is a T-Adaptor of USB host, T-Stream 155a is a T-Stream of HDMI, T-Stream 155b is a T-Stream of USB, T-Adaptor 141a is a T-Adaptor of HDMI Sink, and T-Adaptor 141b is a T-Adaptor of USB device. The final direction of the T-Streams 155a and 155b into T-Adaptors 141a and 141b respectively is done by identifying HDMI data in T-Stream 155a and USB data in T-Stream 155b, and concluding that T-Adaptor 141a of HDMI Sink needs to convert T-Stream 155a into Link 150a of HDMI, and T-Adaptor 141b of USB device needs to convert T-Stream 155b into Link 150b of USB.

In one embodiment, the Multimedia Network includes a Multimedia Network Port Device, which is related to one Multimedia Network physical interface (RJ45) and includes one or more of the following functions: (1) a TX/RX function (may be one of: A-symmetric, bi-functional, symmetric); (2) T-Adaptors, e.g. Zero to 63 instances of T-Adaptors; (3) T-Groups, e.g., zero to 8 instances of T-Groups; (4) When located in a switch device it may support Ethernet connectivity and LPPF #2; (5) When located in an end node device it may support Ethernet connectivity, may support LPPF #1 and may support LPPF #2; (6) When located in an end node device, it may contain at least one T-Adaptor, at least one T-Group and a Port Device Management Entity (PDME); (7) a Port Device may be associated with a certain Multimedia Network physical interface; (8) Each Port Device may be identified using a unique identifier within the device it is located in.

In one embodiment, LPPF2 operates the Ethernet network. In one embodiment of LPPF2, the edge devices can decide whether to operate Ethernet or not. Conversely, LPPF1 does not include Ethernet, so in some embodiments with LPPF1, end nodes without Ethernet receive their identity from the switches to which they are connected.

In one embodiment, the LPPF mechanism has at least two unique aspects: first, it enables the system to move between states while keeping continuous communication with the control and management functions, even during the switch time between the different operating states. Second, end devices without Ethernet can communicate in LPPF2 even though they do not support Ethernet; they achieve this by taking their identity from the end switches.

Figure 3:
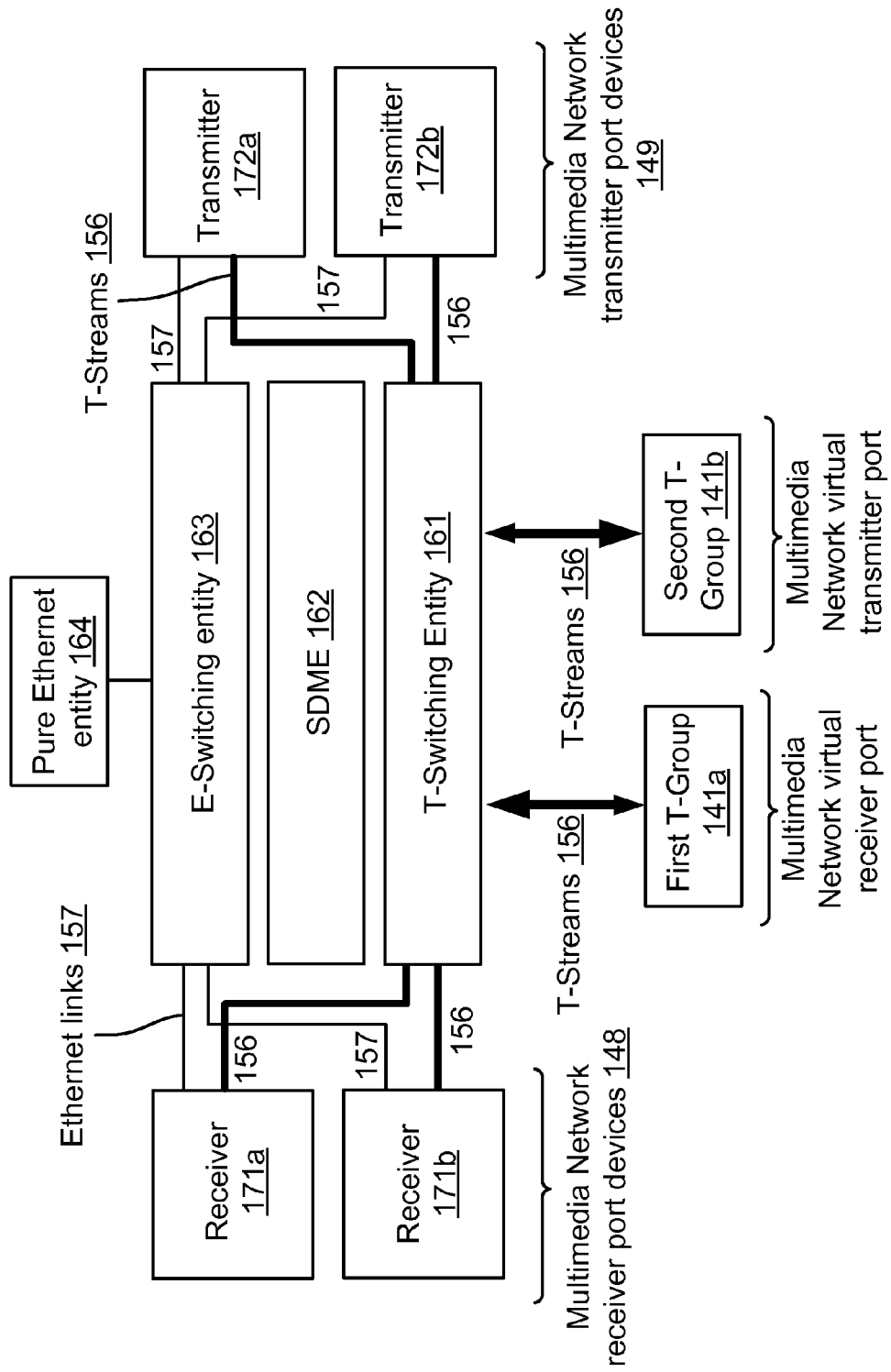
FIG. 3 illustrates one example of a switch device.

FIG. 3 illustrates one example of a switch device. The switch comprised of elements 161-163, which receive data packets from multiple sources (elements 141a, 141b, 171a, 171b, and 164), and which route the received data to various transmitters (Illustrated in FIG. 3 as 172a and 172b). The data may also be converted to T-streams, as discussed further below. Element 141a is a data stream composed of HDMI and/or USB data, as explained in greater detail in the description of FIG. 2. Such data is converted in 141a to T-packets, and then sent as a T-Stream 156 to T-Switching Entity. Both data and control packets are communicated between 141a and 161a, hence the arrow at 156 is bidirectional. Similarly, element 141b is a data stream composed of HDMI and/or USB data, as explained in greater detail in the description of FIG. 2. Such data is converted in 141b to T-packets, and then sent as a T-Stream 156 to T-Switching Entity. Both data and control packets are communicated between 141b and 161a, hence the arrow at 156 is bidirectional. 141a includes connection to a Multimedia Network virtual receiver port, and 141b includes a connection to a Multimedia Network virtual transmitter port, all as explained in the description of FIG. 2.

Various Multimedia Network Receiver port devices 148 may receive data for transmission to the switch. In the particular example illustrated in FIG. 3, there are two receivers, 171a and 171b, either of which or both may receive Ethernet packets and/or T-Streams. Each receiver transmits T-Stream packets over T-Stream paths, here shown as 156, to the switch, and specifically to the part of the switch, T-Switching Entity 161, which switches T-Stream traffic. Similarly, each receiver transmits Ethernet packets over the Ethernet paths, here shown as 157, to the switch, and specifically to the part of the switch, E-Switching Entity 163, which switches Ethernet packets traffic. The switch may also receive Ethernet packets from a "Pure Ethernet entity" 164, such as computer or other data device connected to the switch by an Ethernet connection. Element 164 is connected to the switch at the E-Switching Entity 163.

In one embodiment, the SDME 162 manages the operation of the switch. Element 162 stays in very close communication with elements 161 and 163. The SDME 162 commands the T-Switching Entity 161 where to send the T-packets. Here, element 161 sends the T-packets over T-Streams 156 to Transmitters 172a and 172b. The SDME commands the E-Switching Entity 163 where to send the Ethernet packets. Here, element 163 sends the Ethernet packets over 157 to Transmitters 172a and 172b. The Transmitters 172a and 172b may transmit the received packets, whether T-Packets or Ethernet packets, downstream over various kind of cables to additional devices, which may be further switches, or CE devices such as televisions.

Figure 4:
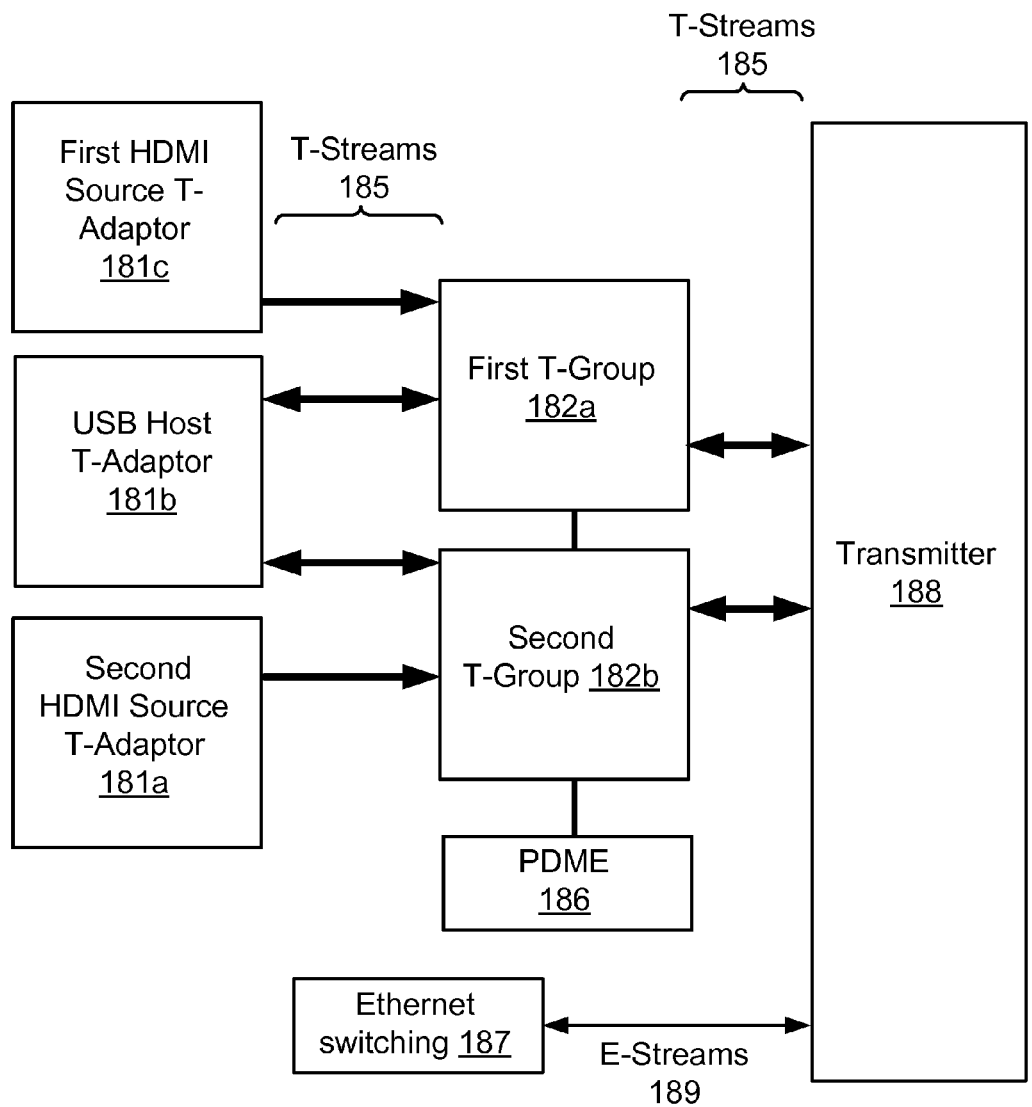
FIG. 4 illustrates one example of an end node device.

FIG. 4 illustrates one example of an end node device. A First HDMI Source T-Adaptor 181a and a USB Host T-Adaptor 181b provide T-packets over T-Streams 185 to a First T-Group 182b. The connection 181b-182b is bidirectional, optionally according to the definition of the USB technical standard. The connection 181a-182b may be unidirectional to 182b as shown, or could be bidirectional. Similarly, a Second HDMI Source T-Adaptor 181c and a USB Host T-Adaptor 181b provide T-packets over T-Streams 185 to a Second T-Group 182a. The connection 181b-182a is bidirectional, optionally according to the definition of the USB technical standard. The connection 181c-182b may be unidirectional to 182b as shown, or could be bidirectional.

In each T-Group, be it 182a or 182b as shown, the same SID is assigned for data coming from multiple HDMI and USB sources via 181a, 181b, and 181c. This means that only one transmission calculation is needed for the packets with same SID, and there is only one transmission path for packets with the same SID. These implications add significantly to system transmission efficiency.

In the specific non-limiting example of FIG. 4 it is unpermitted to have same type of data transferred from two sources to one T-Group. For example, 181b may contribute USB T-Packets to both 182a and 182b, without trouble. However, it would not be permissible to have a second USB Host T-Adapter, not 181b, contributing T-packets to either 182a or 182b, because if that happened, two USB Host T-Adaptors would be contributing the same type of data to one T-Group, the two streams would receive the same SID, and it would become impossible to distinguish the sources of the data (that is, impossible for devices downstream to know which HDMI Sources T-Adaptor contributed which data), and hence also impossible for the system to be certain where to send the data. Hence, where FIG. 4 shows one USB Host T-Adaptor, here 181b, contributing to two T-Groups, no other USB Host T-Adaptor could contribute to those T-Groups. Similarly, there are two HDMI Source T-Adaptors, 181a and 181c, but each one contributes to only one T-Group, here 182b and 182a, respectively. It would not be permitted for 181a and 181c to both contribute packets to 182b or to 182a. However, other permutations that permit to have same type of data transferred from two sources to one T-Group are possible. For example, a permutation may have one HDMI Source T-Adaptor contribute packets to two T-Groups, or two USB Host T-Adaptors contribute packets to two T-Groups.

Once T-packets have been transmitted to the T-Groups 182a and 182b, PDME 186 manages the data, and tells the T-Groups where and when to send the packets. In addition to the USB and HDMI data sources, Ethernet packets may be contributed. The Ethernet packets arrive at Ethernet switch 187 from any number of possible sources not shown in FIG. 4 (such as a pure Ethernet entity), which may then send such packets as Ethernet packets 189 to Transmitter 188.

Figure 5:
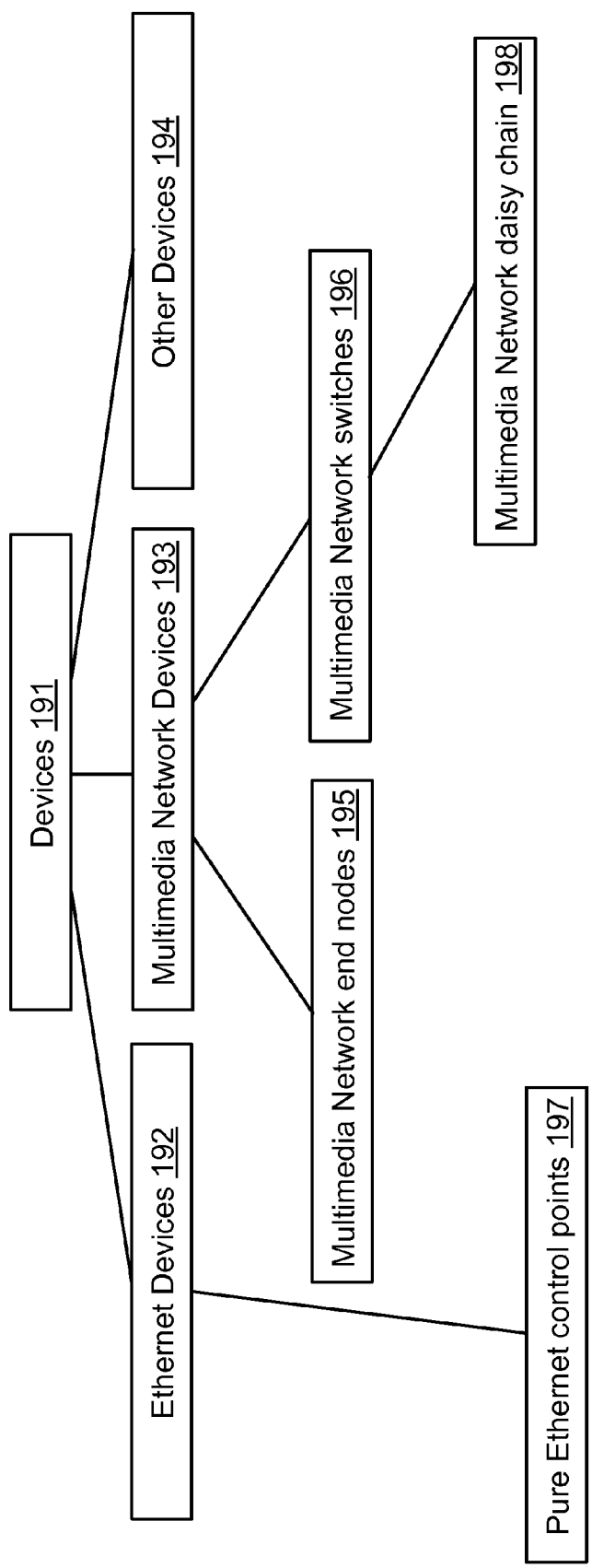
FIG. 5 illustrates a categorization of various types of Multimedia Network Devices.

FIG. 5 illustrates a categorization of various types of Multimedia Network Devices. It is not a flow diagram, nor is it a structure, but simply an illustration of possible categories of devices. Device 191 is a high level representation of a device, composed of three types of devices, which are Ethernet Devices 192, Multimedia Network Devices 193, and Other Devices 194 (non Ethernet or Multimedia Network Devices). Multimedia Network Devices 193 are comprised of Multimedia Network End Nodes 195 and Multimedia Network Switches 196. One type of Ethernet Device 192 is a Pure Ethernet Entity 197, which may have a Control Point function. The Multimedia Network Switch 196 may function as a Daisy Chain Device, and if so, may be referred to as a Multimedia Network Daisy Chain 198. In one embodiment, the devices in FIG. 5 have various embedded management entities. For example, Pure Ethernet Entity 197 has an embedded CPME management entity. As a second example, Multimedia Network End Nodes have an embedded PDME management entity, and may optionally have E-Switching and/or CPME. As a third example, Multimedia Network Switches 196, including but not limited to Multimedia Network Daisy Chain 198, may have an SDME management entity, E-Switching, and T-Switching; they may have, in addition, a CPME management entity.

Figure 6:
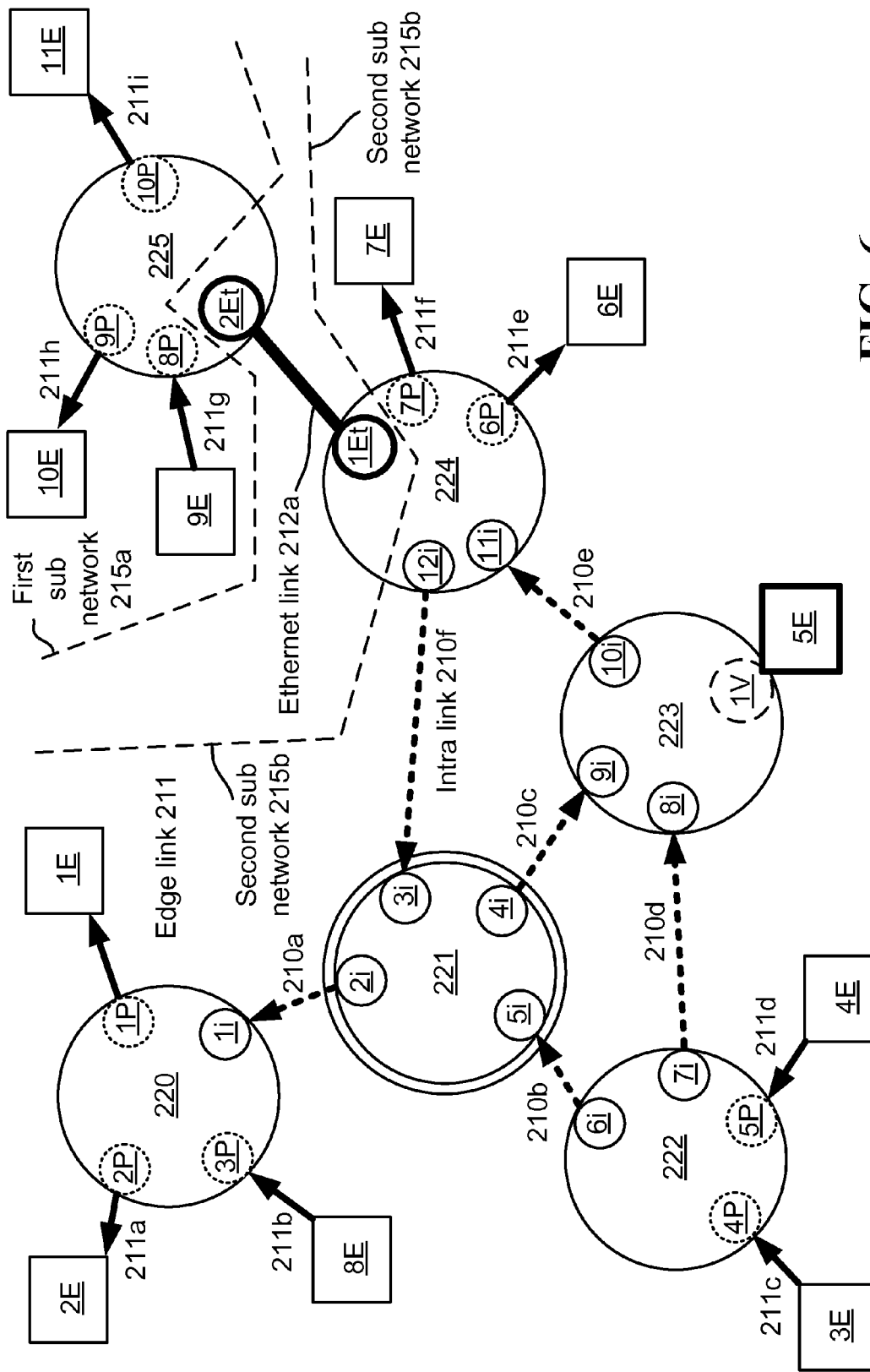
FIG. 6 illustrates one embodiment of a single network with multiple sub-networks.

FIG. 6 illustrates one embodiment of a single network with multiple sub-networks. It is a single network because, as explained more fully below, every node in the network is connected directly or indirectly to every other node in the network. It is multiple networks because not every node is connected to every other node via a Multimedia Network link. In FIG. 6, the link between element 2Et within 225 and element 1Et within 224 is Ethernet link 212a. Hence, 225, and the elements associated directly with 225 (meaning 2Et, 8P, 9P, and 10P, within 225; 9E, 10E, and 11E) form their own sub-network 215a, whereas the other elements in FIG. 6, which are connected directly or indirectly by Multimedia Network links, form their own sub-network 215b.

In the first sub-network 215a, there is an Edge Switch 225, which contains four ports, including Edge Port 10P connected by Edge Link 211i to End Node Device 11e, Edge Port 9P connected by Edge Link 211h to End Node Device 10E, Edge Port 9P connected by Edge Link 211g to End Node Device 9E, and Pure Ethernet Port 2Et connected by Ethernet Link 212a to Pure Ethernet Port 1Et in Edge Switch 224.

Within the second sub-network 215b, in Edge Switch 224, there are five ports, including Intra Port 11i connected by Intra Link 210e to Intra Port 10i within Edge Switch 223, Intra Port 12i connected by Intra Link 210f to Intra Port 3i within Intra Switch 221, Edge Port 7P connected by Edge Link 211f to End Node Device 7E, Edge Port 6P connected by Edge Link 211e to End Node Device 6E, and as noted above, Pure Virtual Port 1Et is connected by Ethernet Link 212a to Pure Virtual Port 2Et within Edge Switch 225.

Within the second sub-network 215b, in Edge Switch 223, there are four ports, including Intra Port 8i connected by Intra Link 210d to Intra Port 7i within Edge Switch 222, Intra Port 9i connected by Intra Link 210c to Intra Port 4i within Intra Switch 221, Intra Port 10i connected by Intra Link 210e to Intra Port 11i within Edge Switch 224, and Virtual Edge Port 1V connected to Embedded T-Adaptor 5E. A "Virtual Edge Port" is not an "Edge Port" in that the Virtual Edge Port has a logical connection but no physical connection, and the Virtual Edge Port is connected to a T-Adaptor that is embedded in the same switch as the Virtual Edge Port.

Within the second sub-network 215b, in Edge Switch 222, there are four ports, including Intra Port 6i connected by Intra Link 210b to Intra Port 5i within Intra Switch 221, Edge Port 4P connected by Edge Link 211c to End Node Device 3E, Edge Port 5P connected by Edge Link 211d to End Node Device 4E, and Intra Port 7i connected by Intra Link 210d to Intra Port 8i within Edge Switch 223. In Intra Switch 221, there are four ports, including Intra Port 2i connected by Intra Link 210a to Intra Port 1i within Edge Switch 220, Intra Port 3i connected by Intra Link 210f to Intra Port 12i within Edge Switch 224, Intra Port 4i connected by Intra Link 210c to Intra Port 9i within Edge Switch 223, and Intra Port 5i connected by Intra Link 210b to Intra Port 6i within Edge Circuit 222. In Edge Switch 220, there are four ports, including Edge Port 1P connected by Edge Link 211 to End Node Device 1E, Edge Port 2P connected by Edge Link 211a to End Node Device 2E, Edge Port 3P connected by Edge Link 211b to End Node Device 8E, and Intra Port 1i connected by Intra Link 210a to Intra Port 2i within Intra Switch 221.

The directions of the arrows indicate a communication path at a particular point of time, according to one embodiment, and do not indicate that any communication is unidirectional. In one example, the links are bidirectional, unless the network manager has deliberately chosen to restrict some link to uni-directionality.

It is to be understood that the network illustrated in FIG. 6 is only one of many possible network topologies. The key point is not that there are exactly two sub-networks. Rather, it may be noted, among other notes explained above, that in one embodiment: (1) A sub-network is defined by whether the points in the sub-network are connected directly or indirectly by a Multimedia Network link. If they are not, then the points are part of different sub-networks; (2) For a switch to be an Edge Switch, it may have at least one Edge Port connected to an End Node Device or one Virtual Edge Port connected to one Embedded T-Adaptor. If it does not have either connection, then it is an Intra Switch, and it will therefore have only Internal Ports; (3) A Virtual Edge Port is a logical connection only. Unlike an Edge Port, a Virtual Edge Port is not a physical connection; (4) An Intra link is a link between two switches. A link between a switch and an End Node Device is an Edge Link.

In one embodiment, the Multimedia Network is a packet based switched networking system which consolidates networking of high throughput, time sensitive, data and control streams with Ethernet data networking. One non-limiting aspect of the Multimedia Network mission is to specify an infrastructure to provide home span, multimedia networking of native CE devices/interfaces/applications consolidated with native support for datacomm devices/interfaces/applications. The following paragraphs describe the requirements from such multimedia network.

One embodiment of the Multimedia Network System may support in parallel, over the same home span cabling infrastructure, high quality, scalable, predictable, networking of: (1) Multiple, high throughput, time sensitive data streams such as uncompressed audio-video (AV); and (2) Conventional data communication. One embodiment may (1) Provide, as transparently as possible, network attachment for legacy CE and Datacomm devices/interfaces/control-schemes; (2) Provide a scalable infrastructure which may allow transparent network attachment for future supported devices/interfaces/applications; (3) Plug & Play, non-engineered, self-installable network; (4) Provide a scalable control layer infrastructure which may ease the creation of network/device/application control and management functions; and/or (5) Enable low cost solutions within the CE price points. In one embodiment, the Multimedia Network may scale up to multi switch topology (e.g., central switch+per room switches), including, without limitation, the addition of more switch boxes.

In one embodiment, the Multimedia Network may support simultaneous transfer of several, unrelated, AV/data/control streams over its links. The network may enable the creation of multi user AV sources with single attachment cable to the network (e.g., multi user STB/PC/Game box/PVR). The network may enable multi streams over the inter-switch links resulting from the combination of multiple sources and multiple sinks which may exist in the network. In one embodiment, the Multimedia Network may have high-throughput, time-sensitive data streams such as uncompressed video. The network may generate continuous, isochronous streams of data towards their native interface (e.g., HDMI). The combination of multiple stream support and complex topologies creates variability in packets transfer delay over the network path (Latency Variation/packets arrival time jitter) due to scheduling interference per network hop. End nodes and switches may use buffers to compensate for this network latency variation property. The network may limit the network path latency variation in order to reduce the compensation buffers size at the end node and in the switches. In one embodiment, the Multimedia Network may provide a mechanism, enabling "network clients" and control functions to create time sensitive sessions, reserving the proper resources along the network path. In one embodiment, the Multimedia Network may ensure that the proper throughput is available along the chosen network path for the whole duration of the session, since time sensitive applications may sometime not tolerate oversubscription/congestion/packet-dropping/end-to-end retransmission, of data stream packets. In one embodiment, the Multimedia Network may control the total latency along the chosen network path for the whole duration of the session. The Network may limit the packets length, packets burst size per packet stream and the number of interfering, alien, packet streams along the chosen network path for the whole duration of the session to ensure that the latency variation limit is not violated.

In one embodiment, the Multimedia Network may enable legacy CE and Datacomm devices to operate, as transparently as possible, over the network, interacting with other legacy devices or new devices in order to leverage the huge installed base of legacy CE and Datacomm devices. Additionally, in one embodiment the Network may extend the networking capabilities of these legacy devices beyond their original networking scheme (e.g., multi-sink CEC network, multi-host USB network). The network may enable the user to control the connectivity of these legacy device using newly developed control functions while providing basic connectivity control-scheme (e.g., select an over-the-network source) using HDMI-CEC, enabling legacy devices (e.g., TV) to function as control points for legacy and new devices connectivity.

In one embodiment, early stage switch boxes in the installed base may be able to support future end-nodes and control functions which may provide network attachment for interfaces/protocols/applications not supported by the description here. Therefore, the network/switches may provide general services not directly tied to specific interface/application clients of the network. These general services may create a broad enough infrastructure to enable usage by a wide range of future interfaces/protocols/applications. In one embodiment, the Multimedia Network control scheme may be generalized to take into account this future support scalability in device discovery and control as well as in session creation/management methods.

In one embodiment, the Multimedia Network offers the advantages that (1) Multiple Control functions can discover, on the fly, device statuses, capabilities and connectivity; and (2) Multiple Control functions can present to the user dynamic network view and enable the user to create, maintain, or terminate, sessions without pre-programming.

In one embodiment, the Multimedia Network may balance various factors such as: (1) Required entry-level link performance; (2) Up scalability in terms of number of devices/interfaces/streams/switches use cases and functionalities; and (3) Committed level of service (directly reflected in the amount of compensation buffers at the end nodes and the switches).

The Multimedia Network Link.

In one embodiment, Multimedia Network devices are connected through Multimedia Network ports using Multimedia Network links. An a-symmetric Multimedia Network link delivers high throughput, time sensitive data, (such as uncompressed multimedia content, encapsulated using HDMI-HDCP link layer), from source to sink (unidirectional), control data between source and sink (bidirectional), and optionally other data, such as Ethernet data between the source and sink (bidirectional). It can also support power delivery over the same cable using Power over Multimedia Network (PoMN) methods.

In one embodiment, the Downstream Sub Link, normally directed from AV source to AV sink, carries the high throughput, time sensitive, data streams, such as HDMI-AV data, as well as the source to sink portion of the Ethernet and Control data. The various data types are grouped into "data type specific" packets that are being multiplexed over the downstream sub link. The Upstream Sub Link, normally directed from Sink to Source, carries the sink to source portion of the Ethernet and Control data. In one example, both Sub Links utilize all four twisted pairs of a Cat5/6 LAN cable transmitting in full duplex, downstream and upstream at the same time. The Multimedia Network link may also provide different transmission quality for the various data types by using different modulations according to the data type which is being transferred.

Figure 7:
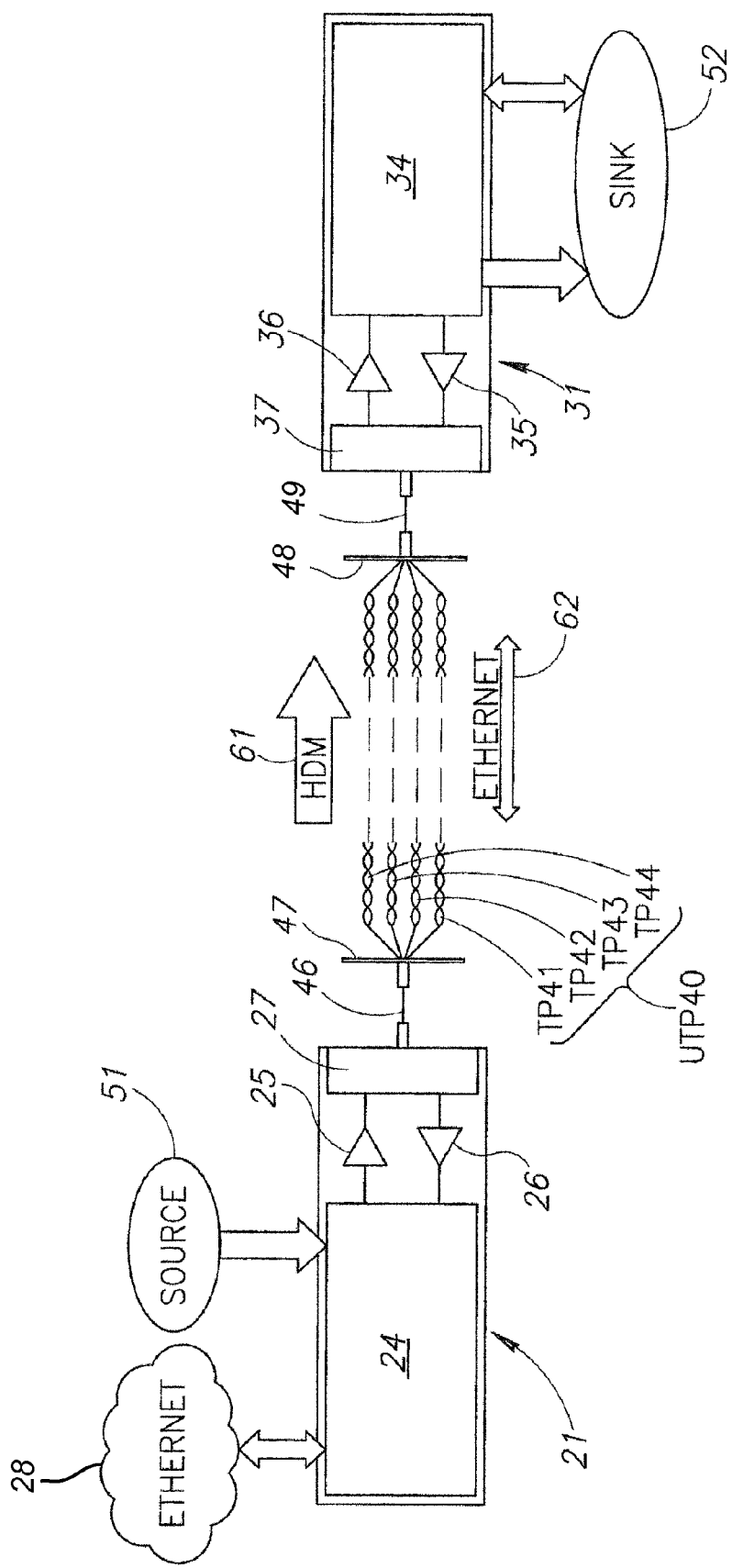
FIG. 7 illustrates a Multimedia Network a-symmetric link, with sub links and link structure.

FIG. 7 illustrates a Multimedia Network a-symmetric link, with sub links and link structure. Element 21 is an End Node Device. One non-limiting example of such an End Node Device is a data communication unit attached to a DVD player (not shown in the figure). Element 24 is the physical layer of the End Node Device 21. Multiple types of data may come into the End Node Device 21. In FIG. 7, Ethernet data in 28 and source data 51 (for example, but not by way of limitation, HDMI data), may come into 24. The two-way arrow between 24 and 28 indicates that data may flow from the Ethernet source to the physical layer of the End Node Device, or vice versa. Data is transmitted to and from the physical layer 24 to a physical connection 27 (which might be, for example but not by way of limitation, an RJ-45 connector). Data from the physical layer 24 to the physical connection 27 is by way of a line with line driver 25, whereas data from the physical connection 27 to the physical layer 24 is by way of a line with line driver 26. Data is transmitted between (to and from) the physical connection 27 and the fixed physical source 47 (such as, for example, a wall within a building), via a cable or other communication medium 46. Data is communicated between fixed physical source 47 and fixed physical sink 48 via, for example, a Category 5 cable UTP40. The Category 5 cable includes four lines, represented respectively by TP41, TP42, TP43, and TP44. (High Definition Media (HDM) data flows from fixed physical source 47 to fixed sink 48, but not vice versa. Conversely, Ethernet data 62 is transmitted in both directions, bidirectionally to and from the fixed physical source 47 and the fixed sink source 48. The relative thickness of HDM and Ethernet is intended to communicate that the bandwidth for HDM may be greater than the bandwidth for Ethernet.

Data is transmitted between (to and from) the physical connection 37 and the fixed physical sink 48 (such as, for example, a wall within a building), via a cable or other communication medium 49. Data from the physical layer 34 of an End Node Device 31 to the physical connection 37 is by way of a line with line driver 35, whereas data from the physical connection 37 to the physical layer 34 is by way of a line with line driver 36. Ethernet data between the physical layer 34 of End Node Device 31 and a sink 52, is bidirectional, as represented by the bidirectional arrow between 34 and 52. HDM and other non-Ethernet data, is transmitted one-way from the physical layer 34 of the End Node Device 31 to the sink 52. The sink 52 may be any kind of data communication unit, such as, solely as one example, a modem that is connected directly to a large screen such as a plasma television screen.

In one embodiment, the Symmetric Multimedia Network link is a symmetric connectivity link which uses the wires to transmit in both directions, at the same time, high throughput, time sensitive data, (such as uncompressed multimedia content, encapsulated using HDMI-HDCP link layer), control data, and optionally Ethernet data. It can also support power delivery over the same cable using Power over Multimedia Network (PoMN) methods.

In one embodiment, the Multimedia Network offers a Half-Link, which is a low power, a-symmetric connectivity link which delivers high throughput, time sensitive data, (such as uncompressed multimedia content, encapsulated using HDMI-HDCP link layer), from Source to Sink (unidirectional), control data between source and sink (bidirectional) and Ethernet data between the Source and Sink (bidirectional). The Half-Link may also support special low voltage power delivery over the same cable using Power over Multimedia Network (PoMN) methods.

Multimedia Network Layered Architecture.

Figure 8:
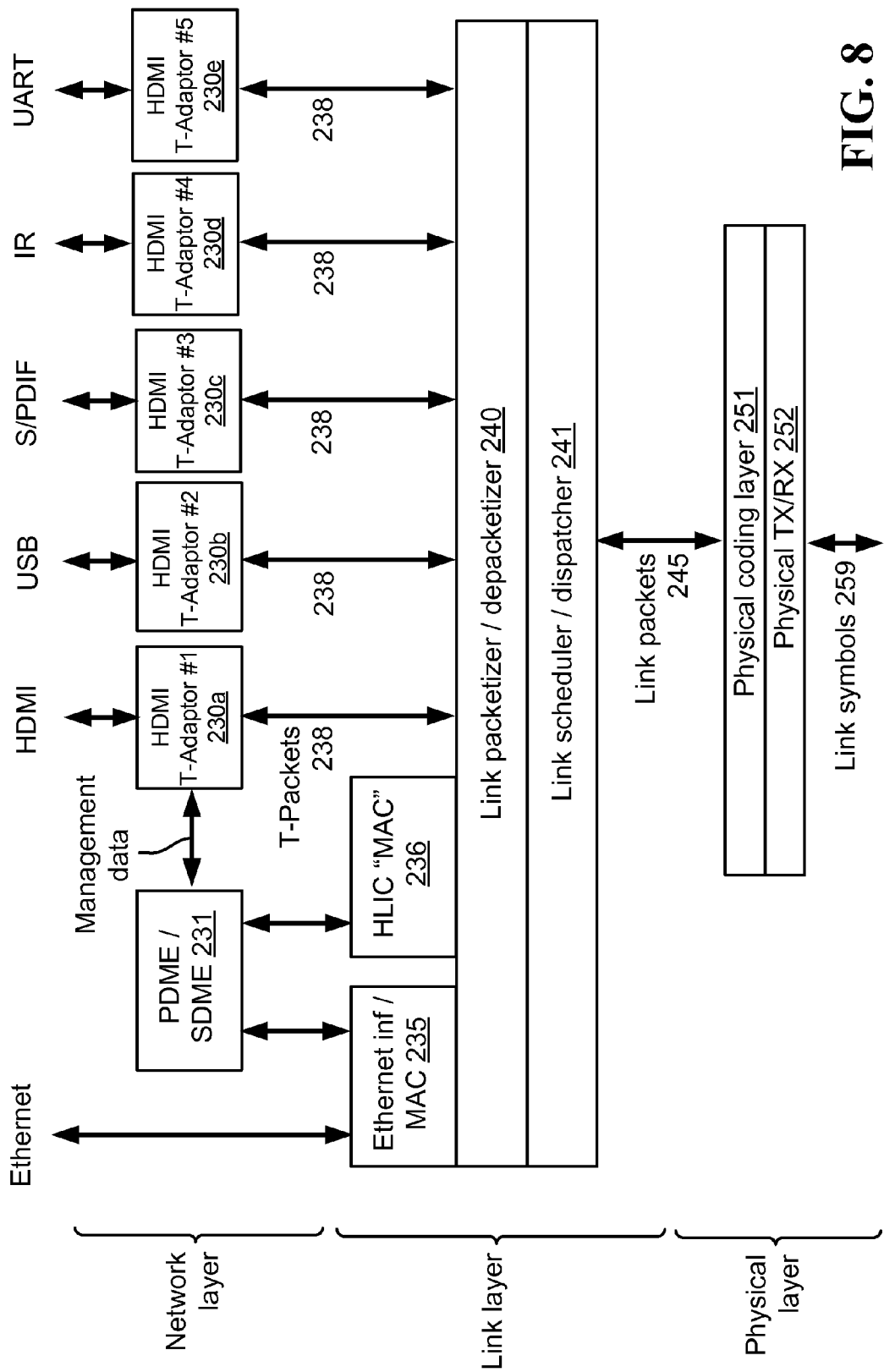
FIG. 8 illustrates one embodiment of a layered architecture of a Multimedia Network End Node Device.

FIG. 8 illustrates one embodiment of a layered architecture of a Multimedia Network End Node Device. Only three layers are shown in FIG. 8. These three layers will be outlined generally below together with a discussion of the other elements. The physical layer creates and maintains a Multimedia Network physical link for the different operation modes and sub-link types. In the transmission path, the physical layer receives Link Tokens from the Link Layer, converts them using the Physical Coding Sublayer (PCS) to the proper symbol according to the desired sub-link, and transmits these symbols to the physical link. In the receive path the physical layer receives Link Symbols from the physical link, converts these symbols, using the PCS, to Link Tokens and provides them to the link layer. The link layer defines the general framing format of the Multimedia Network packets, used by the different T-Adaptors to create their T-Stream packets (T-Packets) and to specify their required T-Network services. The Link Layer also provides these T-Services for its T-Adaptors and management users. In the transmit path the Link Layer receives T-Packets from its different T-Adaptor users, converts these T-Packets to the proper Link Packets according to the desired sub-link, optionally ensures the transfer-quality by choosing the number of bits per token and the usage of local retransmission, generates proper packet header and trailing CRC and ensure the proper scheduling-priority by properly scheduling the different Packets into the physical link. In the receive path, the Link Layer receives Link Tokens from the physical layer, assembles them to link packets, checks the CRC and marks bad CRC when needed, requests local retransmission when needed, modifies clock measurements when needed, converts the link packets to T-Packets and dispatches them to the proper T-Adaptor. The Link Layer also provides link services to the end-node's management entity using Ethernet MAC, if it exists, and HLIC MAC. Using the management interfaces HD-CMP messages may flow to/from the management entity and through the link.

In the illustrated example, the network layer provides the networking services to the T-Adaptors and enables them to communicate over the network with matching T-Adaptors using T-Sessions. In the transmit path the T-Adaptors receive information blocks from their associated interfaces (HDMI, USB, IR, UART, S/PDIF), converts them to T-Packets which represent this information in the "Multimedia Network Format" and sends them to the link using the T-Services provided by the Link layer. In the receive path the Link layer dispatches the received Link packets converted to T-Packets, to the proper T-Adaptors (according to the packet type and session ID) which regenerate their information block and transmit it to their interfaces. The T-Adaptors are responsible to select the proper link/network services matching their interface requirements, provide buffers to compensate for the T-Network latency variation, handle clock regeneration for isochronous applications/interfaces, perform clock compensation according to the specific rules of the target interface if needed and provide methods to handle the T-Network latency towards their interface. The device management entity provides the HD-CMP interface, which connects it to other management entities in other devices and control points. The T-Adaptors use the management entity to publish their existence in the network, to discover other T-Adaptors in the network and to create/maintain sessions with these T-Adaptors. In FIG. 8, various types of data are located in the Network Layer, including, as shown, Ethernet, HDMI, USB, S/PDIF, IR, and UART. Ethernet is transferred directly to Ethernet information over MAC 235. Each of the other types of data is transferred to an HDMI T-Adaptor, HDMI to 230*a*, USB to 230*b*, S/PDIF to 230*c*, IR to 230*d*, and UART to 230*e*. The data is then converted by the appropriate HDMI T-Adaptor to T-Packets. The T-Packets are then transferred directly 238 to the Link layer. PDME/SDME 231 provides management data to various points in the system. For example, 231 management data is used by the T-Adaptors to process the data (e.g., HDMI, USB, S/PDIF, IR, and UART), into T-Packets. The arrow between 231 and the T-Adaptors is bidirectional, because management data is passed in both directions. As another example of the function of 231, PDME/SDME 231 management data is passed to and from Ethernet info/MAC 235, where it is used to help process the Ethernet data. As a third example of the function of 231, PDME/SDME 231 management data is transferred to and from HLIC "MAC" 236, where it may later be used in the Link layer at 240.

Data packets, be they Ethernet packets via 235, or 231 management packets via 235, of 231 management packets via 236, or T-Packets 238, are transferred to the Link layer, and specifically to Link packetizer/depacketizer 240. Various T-Services may be performed on various of the packets. Some of these services include (1) general framing; (2) ensuring transfer quality by manipulating a payload's bits and/or token; (3) ensuring transfer quality by local retransmission; (4) CRC handling; (5) clock measurement; and (6) Nibble Stream Services. Data packets which have been processed at 240 are transferred to the Link scheduler/dispatcher 241, which provides T-Services and enforces scheduling priority. The link packets 245 are then transferred to the physical coding layer 251, which may code the link packets and send them to the physical layer TX/RX 252, which may then transmit or receive the information in the form of link symbols 259.

Figure 9:
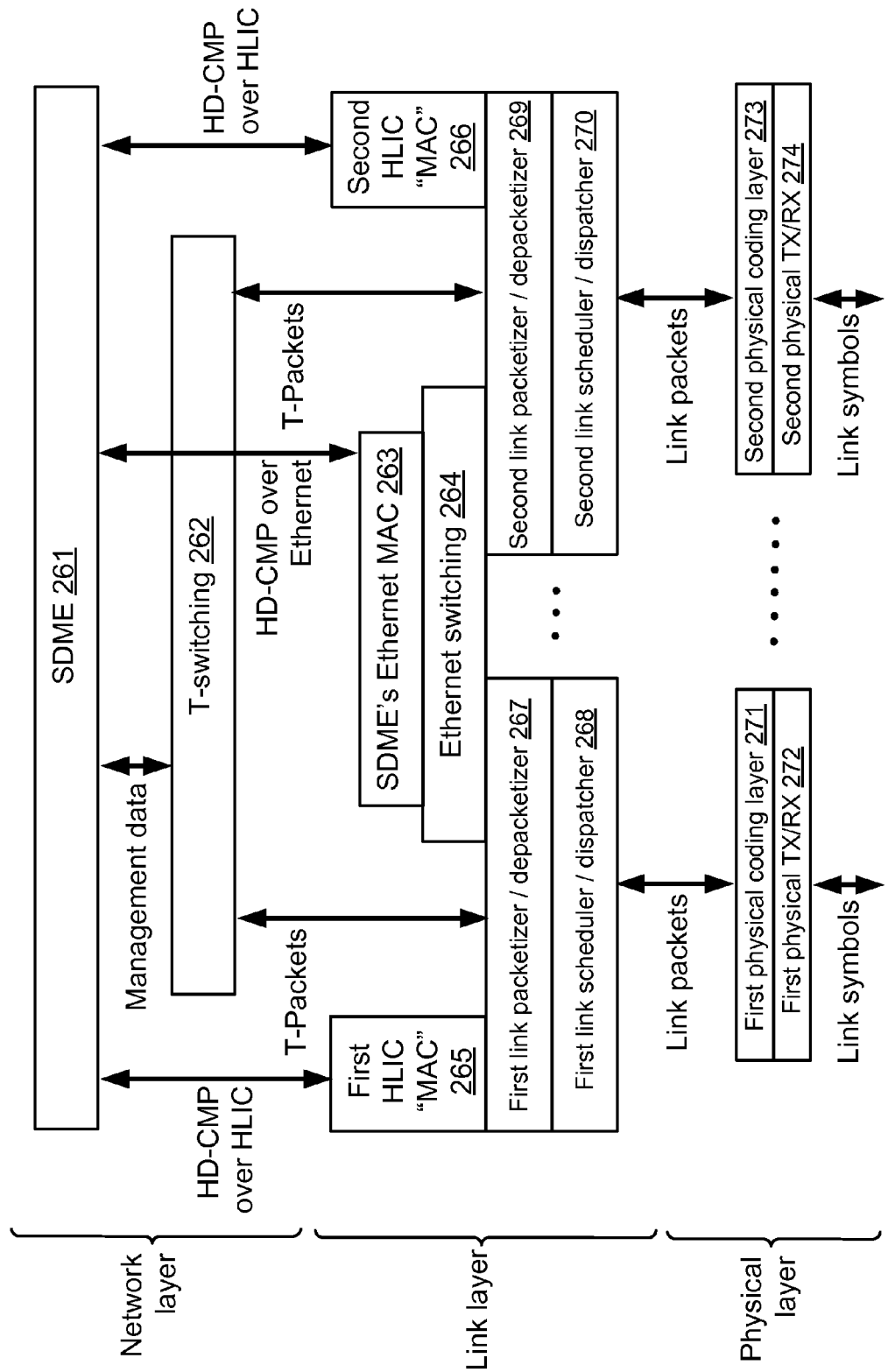
FIG. 9 illustrates one embodiment of a layered architecture for a Multimedia Network Switch.

FIG. 9 illustrates one embodiment of a layered architecture for a Multimedia Network Switch. The three layers are illustrated in FIG. 9 are outlined generally below, together with a discussion of the other elements in FIG. 9. The Ethernet Switching (E-switching) function resides at the Link Layer since the E-Switching is done using conventional Ethernet switching with no awareness of the T-Network topology, devices, and active sessions. The E-Switching function is connected directly to each Multimedia Network port's link layer. In the receive path, the link layer reconstructs the Ethernet packets from the Multimedia Network Link packets received over the link, and provides them for the E-Switching function to be natively switched. In the transmit path the E-Switching function provides Ethernet packets to the link layer which converts them to Link packets and transmits them into the link. In a switch device, an Ethernet MAC function may also be connected to the E-Switching function providing the HD-CMP over Ethernet interface for the SDME. The T-Switching function resides at the Network Layer providing packet forwarding/switching services for the different T-Packets coming from the various Multimedia Network ports. The T-Switching is done according to the SID token located at each T-Packet. The scheduling of the forwarded T-Packet, into the next link/hop is done according to the Scheduling-Priority property associated with each packet type. The SDME interacts using HD-CMP with the other devices and control points and performs the required tasks needed for device/topology discovery, session management, and interaction with the control points. The SDME also manages the active sessions' table of this switch and configure the forwarding table used by the T-Switching function to determine the next link/hop per T-Packet's SID token.

As a switch, FIG. 9 shows multiple processors at the Link layer and Physical layer. In the example, there are two sets of processors, but that is optional, and the number of sets of processors may be greater than two. FIG. 9 shows that data processed at SDME 261 may follow any of six paths through the Multimedia Network Switch, as follows:

Path 1: From 261, to HD-CMP over HLIC, to First HLIC "MAC" 265. Additional processing occurs at 265, then the packets are transferred to First link packetizer/depacketizer 267 which performs the same processing as discussed in connection with element 240 in FIG. 8, above. The packets are then transferred to First link scheduler/dispatcher 268, which provides the same services and scheduling priority as discussed in connection with element 241 in FIG. 8 above. The data is then sent as Link packets to First physical coding layer 271, which performs the same processing as discussed in connection with element 251 in FIG. 8 above. The packets are then transferred to First physical TX/RX 272, which performs the same functions as discussed in connection with element 252 above.

Path 2: This is essentially the same general processing as for path 1, except that here the data is transferred by 261 to the Second HLIC "MAC" 266, rather than to 265. Thus, the second path is 261 to HD-CMP over HLIC, to Second HLIC "MAC" 266 (which performs the same functions as 265 discussed above), then to Second link packetizer/depacketizer 269 (which performs the same functions as 267 discussed above), then to Second link scheduler/dispatcher 270 (which performs the same functions as 268 discussed above), then as Line packets to Second physical coding layer 273 (which performs the same functions as 271 discussed above), then Second physical TX/RX 274 (which performs the same functions as 272 discussed above), and transferred as Link symbols.

Path 3: SDME 261 sends management data to T-switching 262. For path 3, 262 sends the data a T-Packets to 267, which performs the functions previously discussed, then to 268 which performs the functions previously discussed, then as Link packets to 271 which performs the functions previously discussed, then to 272 which performs to the functions previously discussed, then transferred as Link symbols. In this path, it is management data that is transferred from 261, and which may help in the processing of payloads at 267, 268, 271, and 272.

Path 4: From 261 to 262 as discussed with regard to Path 3, but then as T-Packets to 269 (rather than to 267), hence to 270, then as Link packets to 273, hence to 274, and then transferred as Link symbols. Again, this is management data, and therefore it may help in the processing of payloads at 269, 270, 273, and 274.

Path 5: In this path, data is processed at 261, then transferred directly to SDME's Ethernet MAC 263 (thereby bypassing 262). 263 performs additional processing of Ethernet data, then sends the data to Ethernet Switch 263. In Path 5, 263 transfers the data to the First link packetizer/depacketizer 267, which processes and transfers to 268, which processes and send as Link packets to 271, which processes and sends to 272, which transmits or receives as Link symbols.

Path 6: In this path, the progression 261 to 263 to 264 is the same progression. However, here 264 sends the data to Second link packetizer/depacketizer 269 (rather than to 267), which processes and sends to 270, which processes and sends as Link packets to 273, which processors and sends to 274, which transmits or receives as Link symbols.

Link Layer

In one embodiment, The Link Layer defines the general framing format, used by the different T-Adaptors to create their packets T-Stream and to specify their required T-Network services. The Link Layer, using the services provided by the Physical Layer, is responsible to provide to these packets the proper T-Network service as conveyed in the packet header, when transmitted into the link and when received from the link.

T-adaptors convert their native information blocks into Multimedia Network formatted T-adaptor Packets (T-Packets). T-packets' information may be transferred over the Downstream and/or Upstream sub-Links. The T-adaptor is aware whether it is transmitting over the network on a DS path, an US path, or a Mixed path.

In one embodiment of an a-symmetric link, each DS T-Packet is transmitted using one Downstream Packet. The Downstream Link Layer may modify the number of symbols used to carry the packet payload according to the transfer-quality property and link conditions. The Upstream Link is bandwidth limited and uses Fixed-size Frames. The US T-Packets are converted by the Link Layer into Sub-packets. T-adaptors which use the Upstream Link may use the Nibble Stream service. For T-adaptors which do not use the Nibble Stream service each US T-Packet is converted to one Sub-packet. For T-adaptors which use the Nibble Stream service each T-Packet may be converted by the Link Layer into one or more Sub-packets.

In one embodiment, the Multimedia Network core provides general, packet based, T-Network services for the different T-Adaptors attached to it, including some or all of the following features: (1) Highest level of Transfer-Quality for packet headers over the network; (2) Different levels of Transfer-Quality for packet payloads translating into different packet error rate figures per quality level over the network; (3) Different levels of packet Scheduling-Priority translating into different latency and latency variation figures per priority level; (4) Clock measurement service, enabling the T-Adaptor client to measure the frequency offset between the originating T-Adaptor clock and the target T-Adaptor clock to enable proper clock regeneration for mesochronous applications such as video; (5) Bad-CRC-notification propagation to the target T-Adaptor, enabling the T-Adaptor to treat this packet according to its specific application; (6) Nibble Stream service supporting split and merge of packets going in and out of the upstream links on their network path.

In one embodiment, for each Multimedia Network packet type, there are associated Transfer-Quality and Scheduling-Priority properties according to the requirement of the data type being carried by this packet. Packet types may be pre-defined, Quality specific, and/or Priority specific. Future packet types or protocols may carry their Quality and Priority in the extended type token, within each packet header. Packet type, quality and priority properties may be used by the switches along the network path to insure the proper service is provided for a packet. In one example, the per packet type, Transfer-Quality property creates differentiation in the service provided by the network, for different data types, in terms of target maximum Packet Error Rate (PER). For packets with higher transfer-quality, the payload may be transmitted using lower order modulation utilizing more channel bandwidth per info unit. The Multimedia Network Link may set the actual payload modulation order according to the channel condition and the required Transfer-Quality. In one example, there are three levels of quality, in which normal quality perms BER of 1 in ten to the ninth power, high quality permits a BER of one in then to the twelfth power, and very high quality permits BER of one in ten to the sixteenth power.

The, per packet type, Scheduling-Priority property creates differentiation in the service provided by the network, for different data types, in terms of max latency and max latency variation over the full network path. Packets with higher Priority may be scheduled for transmission over the Multimedia Network link before packets with lower Priorities. Per stream, packets transmitted with the same Priority Code may arrive to their destination at the same order as they were transmitted.

In one embodiment, T-Packet headers and tails are typically transmitted using the highest quality level; therefore, normally they are transmitted using lower order modulation than their packet payload. In these cases, upon detection of bad CRC at the receiver, the probability that the error is at the payload is much higher than that the header/tail is erroneous. In these cases, the packet continues its way on its network path, propagating the fact that it suffers from a bad CRC along the path. At a high probability this packet may reach its proper target T-Adaptor which can decide what to do with this erroneous packet according to the information carried in the packet header and the protocol it conveys. For certain applications, the header information is used (such as the amount of data transferred or extended info within the header carrying sync points or other controls). For other applications, such as video, the payload data may still be useful (assuming only few payload symbols are erroneous).

Nibble Stream.

In one embodiment, to facilitate packet synchronization and to reduce framing overhead, the Multimedia Network upstream link operates using fixed-size frames which carry a plurality of sub packets of different data types. Since the upstream channel is also very limited in bandwidth, it is important to use its frames efficiently and to minimize the number of unused symbols slots. An upstream transmitter may be able to split and merge packets, of the same sub type and session ID, according to the upstream frame utilization. Multimedia Network Nibble Stream is a general service which the T-Network provides enabling a T-Adaptor to send its information, over the T-network, encoded as a sequence of nibbles (4 bit units), with some sync points spread along the stream. The T-Network can split or merge Nibble Stream packets going into or out from the upstream links on their network path. The T-Network commits to reconstruct the original sequence of nibbles, including the exact location of its sync points at the target T-Adaptor.

In one embodiment, the typical Nibble Stream users, for T-Adaptors, are USB and S/PDIF. They may use Nibble Streams on various kinds of network paths: pure DS, pure US and mixed path. Nibble Stream payload split and merge is not supported over pure DS paths; Nibble Stream packets sent over pure DS paths travel intact all the way to their destination T-Adaptor. Future packet types may use Nibble Streams with the same mechanism. Link Layer/Switches complying with this specification may use, when needed, NibbleStream split/merge operations on USB, S/PDIF and other packet types, with Scheduling-Priority codes 1 and 2. Future T-Adaptors which use packet types with Scheduling-Priority codes 1 and 2 may support Multimedia Network Nibble Stream, in which their original packet payload may be split and/or merged along the upstream path to their destination. Streams which allow mixed path (combination of downstream and upstream links on their network path) may also use this method on their downstream packet headers and may assume split and merge along the upstream path.

In one embodiment, streams which use Nibble Stream may use the Extended Control Info token in some DS packets/US sub packet headers, to mark Sync Points. The frequency of transmitting Sync Points, preferably scarce, is data type dependent, and their location is preserved across the splits and merges.

In one embodiment, there are two types of sync points: start and end. If a packet/sub-packet is marked with a Start Sync Point, its payload may not be merged with a previous packet's payload and the Start Sync Point is at the beginning of the data conveyed in this packet's payload. If a packet/sub packet is marked with an End Sync Point, its payload may not be merged with a following packet's payload and the Sync Point is at the end of the data conveyed in this packet's payload. A packet/sub-packet may contain both Start and End sync points.

In one embodiment, a Nibble Stream packet/sub-packet may carry some T-adaptor specific info in the Extended Info sub field of its Extended Control Info Token and/or Generic Extended Info Tokens. When splitting such packets, the T-adaptor specific information may be only conveyed in the first resulting sub-packet (carrying the Start Sync Point of the original packet).

One example is a conversion of a T-Adaptor Information Block into T-Packets and Upstream Frames and back to the original Information Block using both Start and End Sync Points. An Information Block is a T-Adaptor native block of information as defined by the T-Adaptor type. For instance, for S/PDIF each S/PDIF Block is treated as the S/PDIF Information Block and has a Start Sync Point at the beginning of each S/PDIF Block. For USB, a single or several USB Packets are treated as an Information Block with a Start Sync Point at the beginning and an End Sync Point at the end of USB Data Packets. The T-Adaptor partitions the Information Block into T-Packets. T-Packets have length limits depending on whether they are to be conveyed over Downstream, Upstream or Mixed Path. Each T-Packet is conveyed on the Downstream as a single Downstream Packet. On the Upstream T-Packets' payload is transferred over Sub Packets which are formed "dynamically" in order to optimally utilize available bandwidth in the fixed-length Upstream Frames. In one example, the translation from T-Packets to Sub Packets may disregard T-Packet boundaries, but may maintain Sync Point positions. In a general Nibble Stream case, the Information Block data may be split and merged several times along the network and arrive in the final receiver divided to Sub-Packets in a different way. It is guaranteed though that the nibbles sequence including the position of the Sync Points is kept. Finally, at the receiver, the Sub Packets' payload is delivered to the T-Adaptor which reassembles the original Information Block.

In one embodiment, the Link Layer interfaces with the Physical Layer using Link Tokens. Each Link Token corresponds to one symbol period of the appropriate physical sub link. For example, a Link Token given by the Source Downstream Link Layer to the Downstream transmitter may be transmitted during one Downstream Sub Link symbol period (e.g., 1/500 MHz) on all four channels (pairs) at the same time. Another example is that a Link Token given by the Upstream receiver to the Sink Upstream Link Layer contains data that was captured in one Upstream Sub Link period (e.g., 1/25 MHz) on all four channels (pairs). In one embodiment, to accommodate for different transfer quality requirements for different data types, the Multimedia Network provides multiple levels of Error Resistance for Link Tokens. The more bits per Link Token, the higher modulation order used by the Physical Layer (on all four channels) to transmit the symbol, which results in reduced error resistance.

Clock Measurement Service Packet.

In one embodiment, for Isochronous applications, such as video, the target T-Adaptor may regenerate the Application Clock as was present in the source T-Adaptor. The source T-Adaptor measures the Application Clock with its own reference clock and sends this information into the T-Network in a Clock Measurement packet in the "Measurement" part. In order to regenerate the Application Clock at the sink T-Adaptor, the reference clock frequency offset between the source and sink T-Adaptors might also be needed and therefore it is also carried in the Clock Measurement packet in the "FreqOffset" part.

In one example, the Clock Measurement T-Packet has a packet type of 2, and its payload includes the two-byte "FreqOffset" part followed by the "Measurement" part. The "FreqOffset" field may carry the relative difference between the source T-Adaptor reference clock (normalized to its nominal value) and the reference clock (normalized to its nominal value) of the link carrying the Clock Measurement packet, for example in PPM/32 units (e.g., a FreqOffset value of 32 means 1 PPM). Each Multimedia Network Port transmitting the Clock Measurement T-Packet may update the "FreqOffset" part of the Clock Measurement packet, when needed, such that the "FreqOffset" word always reflects the relative difference between the source T-Adaptor normalized reference clock and the normalized reference clock of the link carrying the Clock Measurement T-packet. The "Measurement" part format and meaning is determined by the specific T-Adaptor using the clock measurement service and is specified in the corresponding T-Adaptor section, and might not be modified by switches along the network path.

In one example of a TMDS Clock over Multimedia Network, a TMDS Video stream is carried between a source T-Adaptor and Sink T-Adaptor via a single T-Switch. The TMDS Clock is measured at the source T-Adaptor using a F0=500 MHz nominal clock reference with an actual frequency f0. The Clock measurement packet is transmitted over a link with a nominal rate of R1 and actual rate r1. The T-Switch receives the packet from the link operating at r1 and before transmitting it over a link with nominal rate R2 and actual rate r2, may adjust the "FreqOffset" part. The sink T-Adaptor receives the packet from the link operating at r2 and needs to adjust the "Measurement" part TMDS_IN_COUNT according to its own reference clock which has nominal frequency F3=F0. The measurement period and the format of the TMDS_IN_COUNT are known to the HDMI T-Adaptors, the TMDS_IN-COUNT value and FreqOffset2 are known from the Clock Measurement T-Packet received by the Sink T-Adaptor, and the ratio (r2/R2)/(f2/F2) can be measured.

In one embodiment, the Multimedia Network Link Scheduler controls the order in which packets are transmitted to the link, which may be a DS link, a US link, or a Mixed link. Various packet groups may be defined according to the different data types transferred by the Multimedia Network link. For example, different packet type codes may be defined for HDMI-AV Packets, Control Packets, and Ethernet Packets. Once a packet starts to be transmitted (Packet Type Token was transmitted) into the link, its transmission may be completed. When there is no packet that is currently being transmitted on the link, the Multimedia Network Link Scheduler may select which of the available packets is the next one to be transmitted. In one example, the Link Scheduler may enforce the following priority order between these packet groups, although this is one possible priority scheme: (1) Control Packets have the highest priority hence they are transmitted before Ethernet packets and HDMI-AV packets; (2) Ethernet Packet may be transmitted before HDMI-AV packets; (3) HDMI-AV Packets have the lowest priority and may be transmitted only if there is no available packet from another packet group. In another example, whenever there is more than one available packet of the selected group, the DS Scheduler may enforce the following priority order, although this is only one possible scheme: (1) HDMI-AV packets may be transmitted according to the order in which they are constructed from the TMDS stream; (2) Ethernet packets may be transmitted according to the order in which they are constructed from the RMII/MII MAC interface: (3) Control packets may be transmitted according to their packet type codes, such as, for example, Packet type code of Asynchronous Stream Control has the highest priority, Packet type code of Periodic Stream Control has the mid priority, and Packet type code of General Status has the lowest priority.

Standby Interface

In one embodiment, a Multimedia Network Standby Interface (HDSBI) is used to communicate between two Multimedia Network compliant devices in LPPF #1 and LPPF #2 modes. It is a low power, bi-directional and symmetric link that used to transfer the following information types: (1) HLIC (Multimedia Network Link Internal Controls) messaging; (2) HDMI Controls (DDC, CEC, HPD/5V). In one embodiment, the HDSBI uses the same cable (e.g., Cat5/6) and connector (e.g., RJ45) as the Multimedia Network but uses only a subset of the available channels, e.g., two channels out of four; one channel is used to transfer data in the downstream direction and one channel is used to transfer data in the upstream direction.

In one embodiment, the HDSBI link may have three states, which are Active Send—In this state HDSBI data symbols are transmitted, Active Wait—In this state HDSBI idle symbol is transmitted, and Silent—In this state nothing is transmitted. In one example, the HDSBI link enters into Active state when data needs to be transmitted, and exits to Silent state as soon as no data is expected to be transmitted. The transition from Silent state to Active state is known as the startup sequence. The Active Wait state is used while the HDSBI link needs to be kept "alive" but there is no actual data to transmit.

In one embodiment, the startup sequence is built to guarantee a robust link establishment after a Silent period. There are two parties participating in the startup sequence, which are (1) Initiator—this is the party that initiates the startup sequence. Typically, this party is the one that receives new data (e.g. DDC) and needs to transfer it to the other party; and (2) Follower—the party that detects that the link is no longer in Silent state and respond. Optionally, the same device can be Initiator on some occasions and Follower on other.

In one example over a Cat5 cable, these may be the steps of a start-up sequence (1) The Initiator starts to send Idle Symbols to the other partner. In case the Initiator is a source it may transmit on its C channel and in case the Initiator is a sink it may transmit on its D channel; (2) The Follower detects activity on one of its channels (C or D), set its receiving cannel accordingly and start loading its descrambler; (3) When the Follower's descrambler is "locked" it starts to transmit Idle Symbols on its transmitting channel and wait to receive an Info Packet Request; (4) The Initiator detects activity on its receiving channel and start loading its descrambler; (5) When the Initiator's descrambler is "locked", it sends an Info Packet Request and waits to receive an Info Packet Response; (6) Upon reception of Info Packet Request, the Follower sends Info Packer Response and move to Active state; and (7) Upon reception of Info Packet Response, the Initiator move to Active state.

In one embodiment, during HDSBI Silent state, each party may periodically try to establish a link by acting as Initiator. The period between two consecutive Partner Detection Initiatives may be different between sources to sink to minimize the probability of the cases where both sides try to act as Initiators at the same time. It may also contain a random component to assist in the cases where two devices of the same gender try to act as Initiators. This mechanism guarantees two Multimedia Network compliant devices may eventually establish an HDSBI link.

Network Layer

In one embodiment, the Multimedia Network implements in parallel two networking schemes over the same LAN cabling infrastructure: (1) T-Network: provides reservation based, predictable, stable, high throughput and low latency services (T-Services) for time sensitive communication streams; and (2) E-Network: provides regular Ethernet services.

These T-Services are provided by the T-Network to different protocol/interface/application T-Adaptors, implemented at the network edges and wishing to communicate over the Multimedia Network. In order for a T-Adaptor to communicate over the network with another T-Adaptor, a session may be created. The session defines the communication network path and reserves the proper service along it. Each active session is marked by a SID (Session ID) token carried by each Multimedia Network packet which belongs to the session. The T-Switches along the network path switch those packets according to their SID tokens.

In order to ensure compatibility with the large installed base of Ethernet based applications, the Multimedia Network implements native Ethernet networking by encapsulating or deencapsulating the Ethernet data per Multimedia Network hop and by switching it, using a Ethernet switching function, at each Multimedia Network switch. This E-Switching function within the Multimedia Network switch device may support RSTP (IEEE 802.1D-2004 Rapid Spanning Tree Protocol) as well as other bridging or tree standards. This function can be connected to pure Ethernet switches via pure Ethernet links. The Ethernet active topology, whether RSTP or a similar bridging or treeing standard, may create active Ethernet connections between different E-Switching entities through pure Ethernet switches. Or in other words, when an Ethernet message is sent from one E-Switching entity to another E-Switching entity (even a neighboring entity), the message path is not limited to Multimedia Network links and may involve pure Ethernet links and switches. In addition, the native Ethernet support may allow pure Ethernet devices to function as Control Points for the Multimedia Network. It is to be noted that the embodiments are not limited to the Ethernet example, and the embodiment may also cover other network protocols.

One objective of the Multimedia Network, in one embodiment, is to support in parallel, over the same home span cabling infrastructure, high quality networking of time sensitive data streams, such as, but not limited to: (1) HDMI 1.4 streams with their associated controls. (2) S/PDIF streams; (3) USB streams; and (4) Ethernet data. Another objective of the Multimedia Network, in one embodiment, is to provide transparent network attachment for legacy devices/interfaces, such as, but not limited to, HDMI, Ethernet, USB and S/PDIF. A third objective of the Multimedia Network, in one embodiment, is to provide transparent network attachment for future supported devices/interfaces—Generalized core network services. A fourth objective of the Multimedia Network, in one embodiment, is to be easily installable, possibly self installable. This means in particular, but not exclusively, that Multimedia devices need not be individually configured in order to operate correctly over the network. A fifth objective of the Multimedia Network, in one embodiment, is to enable pure Ethernet devices to function as Multimedia Network Control Points. A sixth objective of the Multimedia Network, in one embodiment, is to enable low cost solutions for CE price points In one embodiment, the Multimedia Network may support any kind of network topology, including but not limited to, point-to-point, star, mesh, and daisy chain topologies. In one embodiment, the Multimedia Network also supports the following port directionalities, as well as similar port directionalities, such as: (1) Fixed A-Symmetric downstream input or a downstream output. (2) Bi-Functional A-Symmetric port that can function either as a downstream input or as a downstream output. (3) Symmetric port that can function as a downstream (high throughput) input and as a downstream (high throughput) output, at the same time.

In one embodiment, the Multimedia Network may support up to any predefined number of network hops. The number of hops may affect the buffer size of the switches. In one embodiment, the Multimedia Network supports IEEE 802.1D-2004 Rapid Spanning Tree Protocol (RSTP) to enable Ethernet loop removal, as well as similar such bridging or treeing standards. It is noted that Ethernet packets may flow through the Multimedia Network's E-Network, in a different path than the T-Network packets.

In one embodiment, the Multimedia Network supports a maximum T-Network latency over full network path, optionally depending on the predefined number of hops. For example, supports a maximum T-Network latency of not more than 100 uS, from first symbol in the packet, transmitted to the Multimedia Network, to last symbol received at its final destination, where the edge T-Adaptors latency is not included. In another example, the Multimedia Network supports a full downstream path with maximum latency variation of not more than 20 uS.

In one embodiment, the Multimedia Network supports control and management using Multimedia Network Control Point functions. In one embodiment, the Multimedia Network supports network operation without mandating the presence of a control point function. In one embodiment, the Multimedia Network supports control using HDMI-CEC, and provides extended CEC switching to enable operation with multiple sinks. In one embodiment, the Multimedia Network supports control using USB device selection, and provides extended USB switching to enable operation with multiple USB hosts. In one embodiment, the Multimedia Network supports Multimedia Network Control and Management during Standby mode, and in particular: (1) A Multimedia Network switching port devices may operate at LPPF #2 during Standby mode. (2) A Multimedia Network non-switching port devices may operate at least in LPPF #1 and may operate at LPPF #2 during Standby mode.

Entity Referencing Method.

Figure 11:
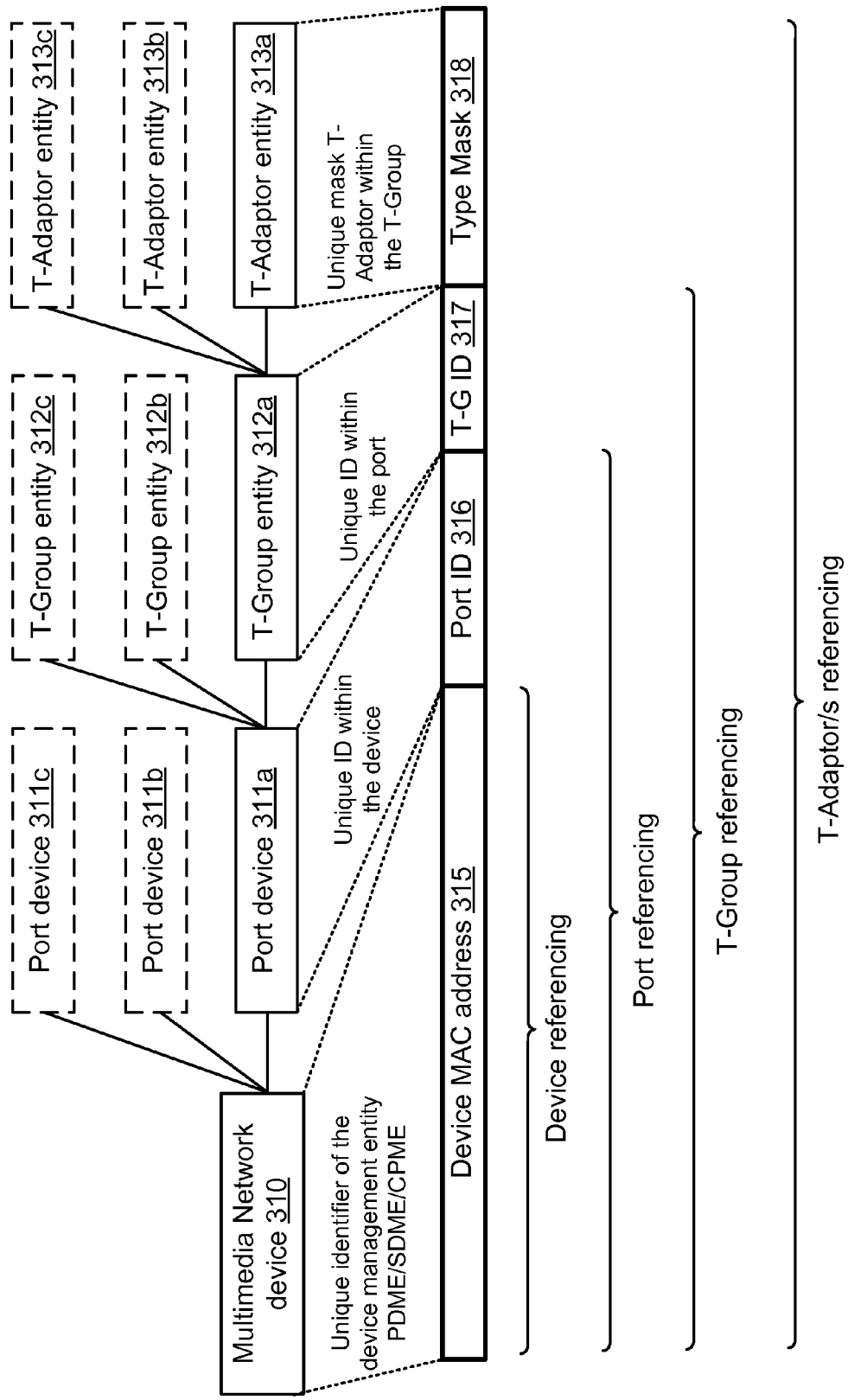
FIG. 11 illustrates one embodiment of such a hierarchical referencing method.

In one embodiment, Multimedia Network entities may be referenced/identified in the Multimedia Network using a hierarchical referencing method. FIG. 11 illustrates one embodiment of such a hierarchical referencing method. Each device 310 may have multiple port devices 311a, 311b, and 311c. Each port device 311a may have multiple T-Groups entities 312a, 312b, and 312c. Each T-Group entity 312a may have several T-Adaptors entities 313a, 313b, and 313c. According to one example, the device MAC address 315 field stores the MAC address of the Multimedia Network device 310, the Port ID 316 field is used for port referencing, the T-G ID 317 field is used for T-Group referencing, and the Type Mask 318 field is used for T-Adaptor/s referencing.

In one embodiment, each T-Group contains a T-Adaptor Type Mask field, which represents the types of T-Adaptors associated with this particular T-Group. Since each T-Group may be associated with only one instance of a certain T-Adaptor type, the type mask field uniquely identifies the T-Adaptor instances within the T-Group. Using type mask referencing, it is possible to reference one or several T-Adaptor instances from the T-Adaptors group, which is associated with this T-Group. This flexibility allows the creation of a session involving only a subset of the T-Adaptor group. This flexibility also allows communication with one, several, or all, of the T-Adaptors.

In one embodiment, the Port and T-Group ID (also called "TPG") field conveys an bit index of the port device within the Multimedia Network device concatenated with T-Group index within the port device. In one embodiment, the full TPG ID field provides a unique reference for a certain T-Group entity within the device, with these parameters: (1) Port index—non-zero value providing a unique reference for a port device within the Multimedia Network device. (2) T-Group index—non-zero value providing a unique reference to a certain T-Group within the port device. In one example, when the T-Group index is zero, the TPG ID provides a unique reference for the port within the device and can be referred to as port ID. In another example, when the Port index is zero the TPG ID do not provide any meaningful reference.

In one embodiment, the Multimedia Network uses Ethernet MAC addresses as unique identifiers for the management entities within its devices. SDMEs and CPMEs may provide Ethernet termination and therefore may use their Ethernet MAC address as their unique identifier. PDMEs may provide Ethernet termination. The following are exemplified attributes of the use of Ethernet termination, in one embodiment: (1) If Ethernet termination is provided by a PDME, the PDME may use its Ethernet MAC address as its unique identifier. (2) If Ethernet termination is not provided by a PDME: (a) The PDME may communicate its lack of Ethernet termination to its link partner edge switch using HLIC transactions. (b) The PDME may "borrow" the identity of its link partner edge switch port by retrieving its SDME device ID and the Port index within the switch using HLIC. (c) The PDME may use the link partner SDME MAC address as its own "Device ID" and may use its link partner Port index as its own Port index in the management transactions towards the network. The link partner SDME may route the management transactions targeting this Port of this switch to the link partner PDME. (d) If the link partner is not a switch, as in direct point to point, then such PDME might not have a unique identifier and would be reached by its link partner. (3) As a result, Port Referencing (Device ID: Port ID (T-Group bits are zero)) is needed to uniquely identify a PDME.

The usage, in one embodiment, of the E-Network Ethernet MAC address as the T-Network Device ID creates a linkage between the T-Network and the E-Network, and allows the management of T-Network entities and sessions using Ethernet communication.

Routing Schemes.

The Multimedia Network may utilize the following various routing schemes. Examples discussed below include Distributed Routing Scheme, "DRS", and Centralized Routing Scheme (CRS).

In one embodiment, the Multimedia Network utilizes a default Distributed Routing Scheme (DRS) which allows session creation between T-Adaptors with and without the existence of a Multimedia Network control point function in the network. It allows controlling the network using extended legacy control functions such as HDMI-CEC and USB. In DRS, each T-Adaptor may initiate, maintain, and terminate, through its associated management entity PDME/SDME, a session with other T-Adaptors in the sub network. DRS also allows operation with and without the existence of a Routing Processor Entity (RPE), which maintains knowledge regarding the network topology and the status of the links/devices in it. DRS uses the HD-CMP Broadcast SNPM mechanism to discover T-Adaptors in the sub network with their directional connectivity. DRS uses the HD-CMP Unicast SNPM mechanism to provide distributed route/path computing and maintenance.

Figure 10:
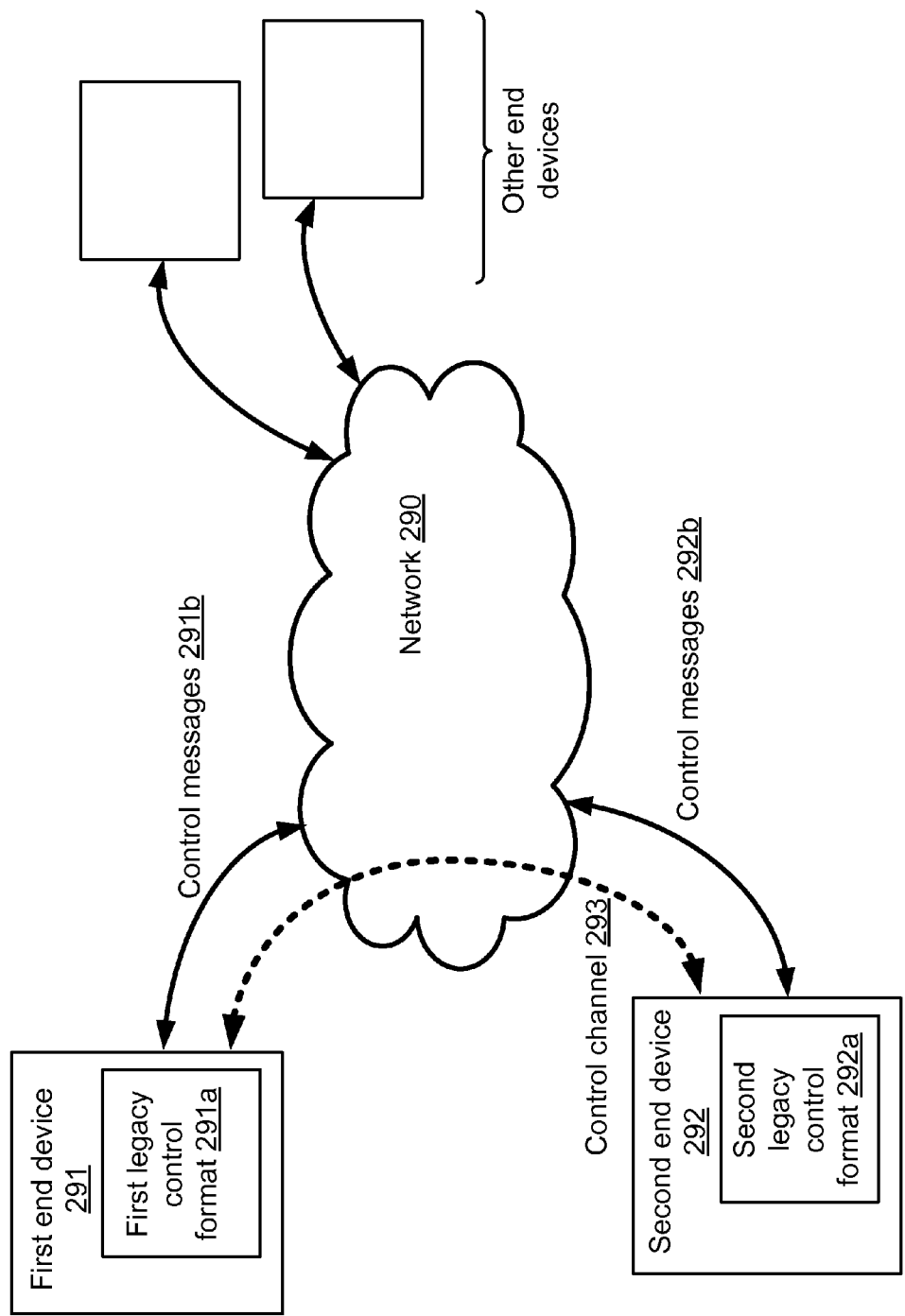
FIG. 10 illustrates embodiments of conveying control messages between two devices having different control formats.

FIG. 10 illustrates embodiments of conveying control messages between two devices having different control formats. In one embodiment, Network 290 translates and conveys control channel 293 between a first end device 291 and a second end-devices 292 supporting first and second legacy control formats 291a and 292a respectively. The network 290 discovers the first and second end-devices 291 and 292 supporting the first and second legacy control formats 291a and 292a respectively. The network 290 spoofs a first network view for the first end-device 291 in order to enable first end-device 291 to communicate with network 290 using the first legacy control format 291a. The network 290 spoofs a second network view for the second end-device 292 in order to enable second end-device 291 to communicate with network 290 using the second legacy control format 292a. Optionally, network 290 waits for an indication of the first end-device 291 selecting the second end device 292. Optionally, a session over network 290 is generated between the first and second end-devices 291 and 292. Control channel 293 is transported within the session. Optionally, the session includes network 290 resource allocation. Optionally, the resource allocation includes bandwidth guarantee. Optionally, the resource allocation sets the maximum number of interfering streams. Control messages are conveyed between the first and second end-devices 291 and 292. The control messages are conveyed by first sending a control message 291b from first end-device 291 to network 290 using the first legacy control format 291a, then translating control message 291b into control message 292b, and sending control massage from network 290 to the second end-device 292 using the second legacy control formal 292a.

In one embodiment, a network translates and conveys control channels between first and second end-devices supporting first and second legacy control formats respectively. The method including the following steps: (i) Discovering, by the network, the first and second end-devices supporting the first and second legacy control formats. (ii) Spoofing, by the network, a first network view for the first legacy device to enable the first legacy device to communicate with the network using the first legacy control format. (iii) Spoofing, by the network, a second network view for the second legacy device to enable the second legacy device to communicate with the network using the second legacy control format. Optionally, the method further includes waiting for an indication of the first legacy device selecting the second legacy device. Optionally, the method further includes generating a session over the network between the first and second legacy devices. Optionally, the session includes resource allocation. Optionally, the resource allocation includes bandwidth guarantee. Optionally, the resource allocation sets the maximum number of interfering streams. And (iv) Conveying over the network control messages between the first and second legacy devices.

In one embodiment, a network translates and conveys control channels between end-devices supporting different legacy control formats. The method including the following steps: (i) Discovering, by the network, the end-devices coupled to the network, wherein the network is not a mere point-to-point connection and supports many different connectivity combinations between the end-devices coupled to the network. (ii) Spoofing, by the network, network views for the end-devices to enable the end-devices to communicate with the network using their legacy control formats. (iii) Receiving a selection indication between first and second end-devices coupled to the network. (iv) Checking whether the network is able to guarantee the required resources needed to connect between the first and second end-devices. And (v) If possible to guarantee the resources, generating a session over the network between the first and second end-devices, and allocating the resources needed for the session. Optionally, the method further including transmitting the selection indication from the first end-device to the second end-device, over the network, by converting the legacy format of the first device to the format supported by the network, and then converting the network supported format to the format supported by the second end-device.

In one embodiment, the Multimedia Network enables the usage of an optional Centralized Routing Scheme (CRS) in which an optional Routing Processor Entity (RPE) may be implemented, at any device, on top of the CPME functionality. The combination of RPE and CPME provides an entity which is aware and can maintain the full topology and status of each link in the network, and is capable of computing an optimal route and a valid session ID for each session upon creation. The RPE/CPME may be implemented at an end node, switch or pure Ethernet device. The RPE/CPME functionality enables a faster route and faster SID computation, thereby enabling a faster session creation. Using its knowledge base, the RPE may provide session route computation services for any management entity upon request. Each SDME and CPME may comply with the requirements as set by the RPE to ensure that an RPE, if it exists in the network, will be able to function. Each CPME may use the RPE route or SID computation services, if such RPE exists in the network. Each PDME/SDME may use the RPE route or SID computation services, if such RPE exists in the network.

Multimedia Network Control & Management Protocol (HD-CMP).

In one embodiment, the Multimedia Network's management entities, PDMEs, SDMEs and CPMEs, communicate using HD-CMP messages. HD-CMP messages may be encapsulated using Ethernet packets to be transferred over the Ethernet network, or using HLIC packets to be transferred from one management entity to a neighboring management entity over the Multimedia Network link. In one embodiment, HD-CMP messages may be sent using either or both of two different methods: (1) Direct: unicast and broadcast communication according to the Ethernet active topology (as determined by the RSTP protocol). Unicast messages may use HLIC on the edge links. (2) Sub Network Propagation Message (SNPM): an Intra Multimedia Network Sub Network restricted, T-Network direction aware, loop protected, message sent by a PDME/SDME to its directional neighboring, PDMEs/SDMEs according to the Multimedia Network physical topology and type of message. The types of messages are (a) Downstream SNPM (DSPM)—The message propagates to downstream neighbors. (b) Upstream SNPM (USPM)—The message propagates to upstream neighbors. (c) Mixed-path SNPN (MXPM)—The message propagates to the neighbors.

In one embodiment, the following definitions apply for HD-CMP messages encapsulated within Ethernet packets: "Destination MAC Address"—Conveys the Device ID reference of the destination management entity (SDME/PDME/CPME) for this message or an Ethernet broadcast address. "Source MAC Address"—Conveys the Device ID reference of the source management entity (SDME/PDME/CPME) for this message. "EtherType"—A unique, N byte, EtherType value. "Destination TPG"—Completes the TPG reference for the destination entity of this message and also identifies the intended target port device. Note that due to the RSTP active topology, the Ethernet packet may arrive to its destination device through a different port device. "Source TPG"—Completes the TPG reference for the source entity of this message and also identifies the intended source port device. Note that due to the RSTP active topology, the Ethernet packet may be transmitted by the source device through a different port device In one embodiment, upon the reception of a message with "good CRC", the destination management entity may treat the message as if it was received through the intended destination port device and was transmitted from the intended source port device. If the destination Port reference (Device ID: Port ID) is "borrowed" by a non-Ethernet terminating edge PDME, the link partner, edge SDME, may forward the message to the proper port device using HLIC. HD-CMP Ethernet packets with a broadcast destination address might not be forwarded to the "borrowing" PDME.

In one embodiment, HD-CMP messages may be encapsulated within HLIC packets with full form and short form formats. Full Form HD-CMP messages convey a Port and T-Group reference of the source and destination entities. Short Form HD-CMP messages are encapsulated within HLIC packets identified by HLIC Op Code. Short Form messages do not convey references to the source and destination entities and they are useful since some frequent HD-CMP messages, such as periodic SNPMs are sent between, management entities of link partners with no need to specify their source and destination entities In one embodiment, there are several commonly conveyed data structures as payload sections in several types of HD-CMP messages. One type is Path Description Section (PDS"). The PDS contains an array of PDS entries each describing a device with input port into the device and output port from the device. An array of such entries defines a sub network path, since paths in the Multimedia Network sub network are reversible, which means that the "return channel" of the session is flowing in the same sub network path but in the opposite direction. A first PDS usage is to collect the sub network path in which an SNPM message (broadcast or unicast) have been flowing, where each intermediate device fills up the next available PDS entry in the PDS array, with its own information. While updating the PDS, the intermediate device may also check for topology loops in the sub network and discard messages with detected loops. A loop is detected when the device finds its own device ID in a previous, already filled, PDS entry of a received Intra SNPM message. A second PDS usage is to communicate/define a sub network path by sending a pre-filled PDS in unicast SNPM or direct messages.

In one embodiment, the PDS may be transmitted and updated according to the following format: (1) Max Count Path Description Max Number Of Entries—The sender of the SNPM may specify how many entries are pre allocated in this PDS. Non Occupied PDS entries may contain all zero values. (2) Occ Count: This field may be used in the following manner per use case: (a) When using the PDS to collect a path description the Occ Count may represent the current number of occupied (non-zero) entries in the PDS. Each device, in the path, may fill up the next available PDS entry (in Index Occ Count+1) and increase the Occ Count by one. (b) When using the PDS to define a path for a unicast SNPM message the transmitted absolute value of Occ Count may represent the PDS entry index, describing the device which is about to receive this message. The receiving device uses the indexed entry input and output port IDs to determine where to propagate the message. If the Occ Count value is larger than zero the receiving device propagate the message according to the output port as listed in the proper entry. If the Occ Count value is smaller than zero, it means that the message may be propagated in the reverse order of the PDS, and therefore the receiving device may propagate the message according to the input port as listed in the proper entry (switch the input and output roles due to reverse propagation). In both cases, the device may increase the Occ Count by one before propagating it. (3) If the Max Count is zero, Occ Count may also be zero and no PDS entries may be allocated. Therefore, the length of the PDS, in bytes, may be equal to PDS_Length_in_Bytes=N+Max Count*M (size of a PDS entry).

In one embodiment, the Multimedia Network uses a data structure to represent the directional network availability and/or resource requirements of/from a certain path or a link. This may be called selection of Network Path Availability ("NPA"). The NPA is defined in terms of available throughput and the accumulated number of packet streams per priority, per direction along the path. The first NPA usage is to collect the resources availability and usage of a network path in which an SNPM message (broadcast or unicast) is flowing, where each intermediate device may properly update the NPA. Edge SDMEs may properly fill up the NPA on behalf of the edge link as well. The NPA in this context will represent the available throughput and the number of packet streams interfering with each priority as detailed below. The second NPA usage is to report/define the resource requirements from a certain path, link or a session. The NPA may use the format illustrated in FIG. 12.

Figure 12:
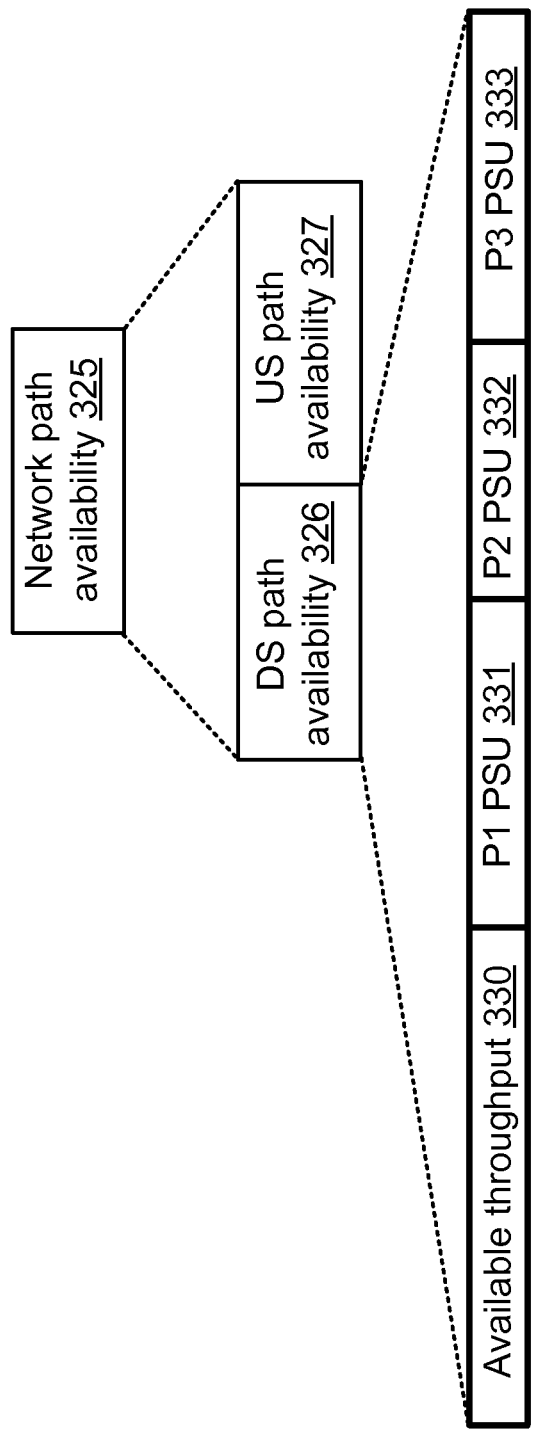
FIG. 12 illustrates one embodiment of representing network path availability.

FIG. 12 illustrates one embodiment of representing network path availability. The network path availability 325 of a path may include a downstream path availability field 326 and an upstream path availability field 327. In one example, the downstream path availability field 326 includes an availability throughput 330 field, a first priority PSU 331, a second priority PSU 332, and a third priority PSU 333. The DS Path is a field which represents the availability/requirements of the path in the downstream direction. The US Path is a field which represents the availability/requirements of the path in the upstream direction. Each of these fields may contain the following sub fields: (1) Available Throughput—A sub field which may represent the available/required throughput in Mbps of/from a path or link. The value may take into account the link conditions in the case of reporting the available throughput and framing overhead/required protection level in the case of specifying the requirements from the path. When collecting the available throughput of a certain path, in a SNPM, each device compares the available throughput it has on the next link of the path and if it is lower than what is currently listed in the sub field it may modify the Available Throughput sub field. When specifying the session requirements this sub field may represent the accumulation of throughput required by the packet streams needed for this session, taking into account the needed overhead. (2) Priority 1 PSU—A sub field which may represent the accumulation of packet streams number in PSU which exist/are-required along the path. When collecting the interfering PSUs for priority 1 victim packet, along a certain path, each SDME may act according to the SNPM description below. When specifying the session requirements this sub field may represent the accumulation of priority 1 PSUs required by priority 1 packet streams needed for this session. (3) Priority 2 PSU—A sub field which may represent the accumulation of packet streams number in PSU which exist/are-required along the path. When collecting the interfering PSUs for priority 2, victim packet, along a certain path, in a SNPM, each SDME may act according to the SNPM specification below. When specifying the session requirements this sub field may represent the accumulation of priority 2 PSUs required by priority 2 packet streams needed for this session. (4) Priority 3 PSU—A sub field which may represent the accumulation of packet streams number in PSU which exist/are-required along the path. When collecting the interfering PSUs for priority 3, victim packet, along a certain path, in a SNPM, each SDME may act according to the SNPM specification below. When specifying the session requirements this sub field may represent the accumulation of priority 3 PSUs required by priority 3 packet streams needed for this session.

One service provided by the T-Network in one embodiment is controlled latency variation, that is, the T-Network limits the latency variation that packets may experience along the path. The latency variation of a certain victim packet comprises the accumulation of additional delays at each transmitter/switch function along the path. Other interfering packets will cause the victim packet to "wait for its turn", adding nondeterministic extra delay to its arrival time at the final destination. In one embodiment, at each node the scheduling interference is caused by: (1) Packets belonging to packet streams with higher priority than the victim packet, which may be served by the transmitter/switch before the victim packet even if they arrive after the victim packet; (2) Packets belonging to packet streams with the same priority as the victim packet, which may be served by the transmitter/switch before the victim packet only if they arrive before/with the victim packet; (3) A packet belonging to a packet stream with a lower priority than the victim packet, whose transmission started before the arrival of the victim packet.

The amount of scheduling interference at each transmitter/switch is the accumulation of the interfering packet sizes transmitted from the arrival of the victim packet until its actual transmission. While the "burstiness" of each packet stream, by itself, can be controlled, different packet streams are unrelated to each other. With a certain probability, a group of packets each belonging to a different packet stream, arriving in short period of time to a certain node and wishing to continue through a certain link, can create a "burst" of packets interfering with a victim packet wishing to continue through the same link. Combination of such interfering bursts per each node along the path can create large latency variation when compared with the case of un-interfered transmission of packets belonging to the same victim stream. In one embodiment, in order to control the latency variation, the T-Network limits, per victim priority, the sum of max packet size over the interfering packet streams, accumulated along the network path. This limit is on the sum of max size packets of different streams, for example if the limit is '8' it can be satisfied with 8 streams with max size '1', 2 streams with max size '4', 2 streams with max size '1'+2 streams with max size '3', etc.

In order to provide an efficient representation of this sum, the Multimedia Network defines a Packet Stream Unit (PSU) for the DS (DPSU) and US (UPSU) which may be used in the NPA data structure/section. For example, a declared value of 32 PSU can represent two streams each using 'Full Size' packets (32=2 streams×16 PSU/stream) or eight streams each using 'Quarter Size' packets (32=8 streams×4 PSU/stream), or any combination which result in a total of 32 PSU. The mapped packet size may consider also the changes in packet size due to dynamic modulation changes done by the transmitter according to the link conditions.

In one embodiment, SNPM is an HD-CMP message, which is generated by a PDME/SDME and propagates, within the Multimedia Network Sub Network, from PDME/SDME to neighboring PDMEs/SDMEs, until it reaches its destination or the sub network boundaries. At each intermediate PDME/SDME the management entity may inspect/store/update the information conveyed in the message and add additional information. This allows the usage of the SNPM to collect/set information regarding network paths, links utilizations and nodes along the path.

The SNPM is T-Network direction aware, which means that the propagating entity propagates the message only at the proper direction (downstream/upstream) according to the SNPM message directionality and the T-Network physical topology. SNPM may use the target neighbor PDME/SDME reference (device id: intended receive port id) as the 'Destination Entity' reference field and it may use the sender PDME/SDME reference (device id: intended transmit port id) as the 'Source Entity' reference field within the HD-CMP message. This means that per hop the content of these fields may be changed. Note that when SNPM is sent over Ethernet the actual transmit/receive port may be different then intended.

In one embodiment, SNPM may use a HD-CMP OpCode field format, which may include any or all of the following features: (1) Prefix—defines that this is an SNPM; (2) Broadcast/Unicast—A field indicating a broadcast SNPM, or a unicast SNPM; (3) Type—a field which defines up to M message types per broadcast/unicast category; (4) Mod—a field which defines the propagation mode of this SNPM. Broadcast SNPMs may use a certain value which means—propagate to ports with the proper directionality; (5) Dir—A field which defines the propagation directionality of this message. In some cases, An SNPM sent towards Edge links is referred to as an Edge SNPM. An SNPM sent towards Intra links is referred to as an Intra SNPM.

In one embodiment, each SNPM carries an NPA field. Each PDME/SDME, when generating an SNPM, may properly "update" an initially zeroed NPA before sending it into the link. Each SDME may properly update the NPA field before propagating the SNPM. This update is needed in order to collect and compute the sum of interfering PSUs a victim packet from a given priority and direction might suffer along the path. In order to update properly the NPA's 'Priority× PSU' sub fields the updating device, may identify, per direction, the following: (1) Port IN from which the SNPM was received/is-intended-to-be-received into the SDME; (2) Port OUT where the SNPM may be propagated to; (3) Port A—The input port per computed PSU direction (A=IN if the SNPM direction equals to the computed PSU direction (DS/US) and A=OUT if the SNPM direction is the opposite of the currently computed PSU direction); (4) Port B—The output port per computed PSU direction (B=OUT if the SNPM direction equals to the computed PSU direction (DS/US) and B=IN if the SNPM direction is the opposite of the currently computed PSU direction); (5) Port B Session Group (BSG)—The sessions that are active on port B; (6) Added Session Group (ASG)—The sessions that are active on port B but are not active on port A.

In one embodiment, per active session, each SDME/PDME may store the number of committed PSUs per priority per direction. BSG_Px denotes the sum of committed Priority X PSUs in sessions belonging to BSG. ASG_Px denotes the sum of committed Priority x PSUs in sessions belonging to ASG.

In one embodiment, Mixed-Path sessions may specify their session PSU requirements in US PSU units. The first subfield (DS) may hold the NPA at the message propagation direction, while the second subfield (US) may hold the NPA at the opposite direction. When sending mixed path session requirements not over SNPM, the first subfield (DS) may hold the NPA for the "First Partner" to "Second Partner" propagation direction, while the second subfield (US) may hold the NPA at the opposite direction.

In one embodiment, per SNPM type, the units of each NPA subfield may be properly maintained. Per session directionality (DS/US, Mixed Path) the units of the session requirements NPA may be properly maintained. For each SNPM, when the B port is a downstream output the calculation may be done as for the DS NPA case, per interfering session the updating device may identify properly which PSU subfield (DS or US) of the session's requirements NPA is relevant to this output B and perform units conversion when needed (16 US PSU=1 DS PSU) before the calculation. The resulting updated NPA may be represented according to the SNPM type using conversion when needed. When the B port is an upstream output, the calculation may be done as for the US NPA case, per interfering session the updating device may identify properly which PSU subfield (DS or US) of the session's requirements NPA is relevant to this output B and perform units conversion when needed (16 US PSU=1 DS PSU) before the calculation. The resulting updated NPA may be represented according to the SNPM type using conversion when needed.

Broadcast SNPM

In one embodiment, Broadcast Intra SNPMs may be used to create Intra sub network restricted, broadcast messaging between SDMEs. PDMEs may also use broadcast Edge SNPM to communicate with their SDME link partner but these messages might not be propagated by the SDME. SDMEs may send their Intra Sub Network broadcast SNPM (messages sent to their Intra ports) encapsulated within Ethernet packets. SDMEs may accept broadcast SNPM received in both Ethernet and HLIC encapsulations.

In one embodiment, Broadcast SNPM is different from the regular broadcast in a number of respects, including but not limited to: (1) The regular broadcast updates the nodes in the network and does not register the nodes along the path, while Broadcast SNPM updates only the need to know nodes and provides information on the nodes along the path; (2) The regular broadcast message propagates to all directions, so may not indicate the network directionality; (3) Broadcast SNPM is limited to a single sub network, and therefore fits a time sensitive network like the T-network.

In one embodiment, an SDME may propagate a received broadcast SNPM according to some or all of the following rules: (1) A received Broadcast SNPM, which contains a PDS entry occupied with the receiving device ID (A loop is detected), may be discarded; (2) A received Broadcast SNPM, which contains an already full PDS (Number of occupied entries is equal to PDS max entries) might not be propagated; (3) A Broadcast SNPM, received from an Edge Port, might not be propagated; (4) A Broadcast SNPM might not be propagated towards Edge Ports; (5) A Bi-Directional port may be considered as both a downstream input port and a downstream output port implemented on the same port; (6) Broadcast Downstream SNPM (B_DSPM): When received from a downstream input, may be propagated to other downstream outputs and may be propagated as a MXPM to other downstream inputs; (7) Broadcast Upstream SNPM (B_USPM): When received from a downstream output, may be propagated to other downstream inputs and may be propagated as a MXPM to other downstream outputs; (8) Broadcast Mixed Path SNPM (B_MXPM): When received from a port, may be propagated to other ports In one embodiment, periodic SNPMs are used by the PDMEs/SDMEs to broadcast their capabilities, discover their directional connectivity, and collect network paths availabilities, with the following options: (1) Each T-Adaptor may identify its connected native edge device, collect its capabilities, using various methods according to the T-Adaptor type and report the information to its local PDME/SDME. (2) Each PDME may generate periodic Edge SNPMs, on behalf of its T-Groups and their associated T-Adaptors, towards its connected edge SDME. The PDME may send these messages periodically with an interval of A seconds+/−B mSec between consecutive periodic messages; (3) Each edge SDME may generate periodic intra SNPMs, towards its intra ports, on behalf of its directly connected end nodes and on behalf of the integrated T-Adaptors/T-Groups in this switch device. The edge SDME may send these intra messages periodically with an interval, uniformly distributed, in the range of C to D seconds+/−E mSec, between consecutive periodic messages; (4) Each SDME may propagate periodic SNPMs which it receives through its intra ports towards its other intra ports according to the SNPM propagation rules; (5) The periodic SNPMs allow each SDME to learn/store which T-Adaptors exist in the T-Network, what are their capabilities and their directional connectivity from this SDME; (6) Each edge SDME may generate periodic edge SNPMs towards its edge ports conveying to its connected PDMEs its knowledge about the other, directionally connected, T-Adaptors in the T-Network. The edge SDME may send these edge messages periodically with an interval of F seconds+/−G mSec between consecutive periodic messages; (7) Each PDME/SDME conveys to each of its embedded T-Adaptors the needed information regarding other T-Adaptors, considering the directional connectivity and type of those other T-Adaptors; (8) SDMEs are also using those periodic SNPMs to build a switching table, marking which entities are accessible, per direction, through which port devices of the switch, with how many hops and with what network path availability; (9) On standby mode, periodic SNPMs continue to flow using the LPPF #1 and #2 modes of operation: (a) Switch ports may support LPPF #2 (HDSBI+Ethernet); (b) End node ports do not have to support Ethernet and may use HD-CMP over HLIC over HDSBI in LPPF #1.

Figure 13:
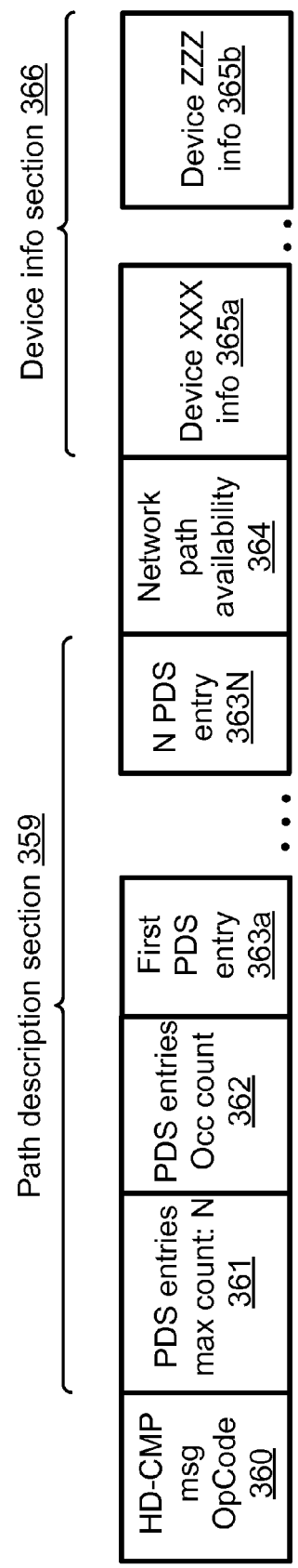
FIG. 13 illustrates one embodiment of periodic SNPM HD-CMP OpCode and Payload Format.

FIG. 13 illustrates one embodiment of periodic SNPM HD-CMP OpCode and Payload Format. The SNPM-HD message includes a HD-CMP message OpCode 360 field, a PDS entries max count 361 field specifying the number of following PDS entries, multiple PDS entries 363a and 363N as specified by the PDS entries max count 361 field, network path availability 364 field, and at least one device information field 365a and 365b. In addition: (1) HD-CMP OpCode—A broadcast SNPM has a certain 'Type' field and three directional options (DSPM, USPM and MXPM); (2) PDS—Like every broadcast SNPM, the HD-CMP payload may start with a Path Description Section: (a) Periodic Edge SNPMs may contain a "PDS Entries Max Count" of zero and a "PDS Entries Occ Count" of zero with no PDS entries, since these messages are not propagated throughout the network; (b) Periodic Intra SNPMs may contain a "PDS Entries Max Count" value of X; (c) Future devices may use other PDS sizes so propagating SDMEs might not assume these sizes. (3) NPA—Like every broadcast SNPM, the payload continues with the Network Path Availability section; (4) Devices Info Section—The rest of the payload is a variable length series containing a DIS (Device Info Section) per reported device. This section may be built by the generator entity of the SNPM describing end node and edge switch devices with their embedded T-Groups and T-Adaptors. Propagating SDMEs might not update/change this section. Upon reception of a periodic SNPM with a loop (identified using the PDS), the information conveyed in this section may be discarded, and might not be learned/stored by the receiving entity.

In one embodiment, the edge SDMEs may generate periodic Intra SNPMs: (1) Periodic Intra DSPMs may be generated towards the downstream output ports conveying information "learned" from edge DSPMs; (2) Periodic Intra USPMs may be generated towards the downstream input ports conveying information "learned" from edge USPMs; (3) Periodic Intra MXPMs may be generated towards each port conveying the information "learned" from edge SNPMs which was not already sent to that port in periodic DSPMs or USPMs; (4) Embedded active T-adaptors may be treated as virtual edge node. The internal connectivity between the embedded T-Adaptors and the switching function within the switch device is implementation depended, and may be DS, US, or Bi-Directional. Embedded T-Adaptor information may be reported accordingly in the proper directional periodic SNPM.

A number of examples may be cited for SNPM generation and propagation. These examples are illustrative only, and non-limiting. These examples will be explained with reference to various of the specific elements appearing in FIG. 6.

EXAMPLE 1

Each end node PDME generates edge SNPMs according to the directionality of its link. For example, 8E, 3E, and 4E, may generate periodic DSPM messages towards their downstream outputs. End nodes which do not provide Ethernet termination (for example 3E and 4E), may transmit their edge SNPM over HLIC.

EXAMPLE 2

Periodic Intra SNPMs are generated only towards intra ports. For example, 220 may generate Intra SNPMs only towards port 1$i$, which is 220's only Intra port. Periodic Intra SNPMs convey information regarding the end nodes connected to this Edge SDME. Since port 1$i$ is a downstream input, 220 generates a periodic USPM towards port 1$i$, reporting the information of 1E and 2E, which was learned by 220 from previous edge USPMs. Additionally, 220 sends an MXPM to port 1$i$, reporting the information from 8E learned from previous DSPMs. 1E and 2E are not reported in this MXPM, since they were already reported by the USPM towards port 1$i$. Generated Intra SNPMs convey information learned only from previous Edge SNPM and embedded T-Adaptors information. For example, 222 generates DSPMs towards ports 6$i$ and 7$i$, reporting 3E and 4E, but 222 does not generate MXPMs nor reports 5E since the information regarding 5E arrives to 222 using Intra SNPMs and not edge SNPMs. 223 reports 5E in its generated Intra SNPMs, since 5E is an embedded T-Adaptor within 223. Since the internal connectivity inside 223 through the virtual edge port 1V is considered, by 223, as downstream input (5E is an HDMI source T-Adaptor), 223 reports 5E in MXPMs to its other downstream inputs and as DSPMs to its downstream output. Periodic Intra SNPMs are generated only by Edge SDMEs. 221 does not generate any SNPMs, it only propagates SNPMs, since 221 does not have any edge ports nor embedded T-Adaptors.

EXAMPLE 3

Propagating Periodic Intra SNPMs. Step 1: 222 generates a periodic intra DSPM conveying the information collected from 3E and 4E. Step 2: 221 propagates the incoming DSPM to its downstream outputs (2$i$ and 4$i$) and as a MXPM to its other downstream input. Step 3: 220 does not propagate the incoming DSPM, since 220 does not have other intra ports. 224 receives an MXPM through port 12$i$ and propagates it to its other intra port 11$i$. 223 receive a DSPM through port 9$i$, and propagates it to its downstream output 10$i$. It also converts it to an MXPM towards its downstream input 8$i$. Step 4: 222 receives through port 5P the MXPM sent by 223, checks the PDS entries, finds its own entry (discovers a loop), and therefore discards the packet. 223 receives through port 10$i$ the MXPM sent by 224, and propagates it to its other intra ports 9$i$ and 8$i$. 224 receives through port 11$i$ the DSPM sent by 223, and propagates it to its other intra downstream output 12$i$. 224 does not propagate it to its edge ports 1Et and 7P. In the next step, 221 will discover loops and hence discard the DSPM it receives through port 3$i$ and the MXPM it receives through port 4$i$. Similarly, 222 will discard the MXPM it receives through port 7$i$.

EXAMPLE 4

Edge SDMEs Generating Periodic Edge SNPMs. Each Edge SDME generates per each edge port an edge SNPM according to the directionality of the port, for downstream input ports: USPM, and for downstream output ports: DSPM. Each SNPM conveys the information learned from received intra SNPMs of the same type (DSPM/USPM) and information about its embedded T-Adaptors (223 does not generates edge SNPMs since it does not have edge ports only the virtual edge port 1V). The rest of the end nodes' information is reported per port with an additional MXPM such that each device is aware of the devices in the sub network. Since 4E does not provide Ethernet termination, 222 sends its SNPMs over HLIC.

A number of examples may be cited for PDS Usage in Periodic DSPM. In one example, with reference to various of the specific elements appearing in FIG. 6, PDS Usage in Periodic DSPM includes the following steps. Step 1: 220 generates a periodic intra DSPM towards port 6$i$, initializes the PDS to 7 zeroed entries, puts its ID in the first entry, sets the input port to zero and the output port to 1, and sets the Occ Count to 1. Step 2: 221 checks the PDS of the DSPM it receives from port 5$i$, and since it cannot find its own ID in it (no loop) properly fills the next PDS entry and propagates the message to port 4$i$. Step 3: 223 checks the PDS of the DSPM it receives from port 9$i$, and since it cannot find its own ID in it (no loop) properly fills the next PDS entry and propagates the message as an MXPM to port 8$i$. In the next step, 223 will check the PDS of the MXPM it receives from port 1V, and since it will find its own ID in (loop is detected) will discard it.

In one embodiment, Update SNPMs are used by the PDMEs/SDMEs to broadcast, to the sub network, a change in their capabilities/status. The Update SNPMs may use the same message format as the Periodic SNPMs, with the exception that the 'Type' sub field within the HD-CMP OpCode may contain the value 'one' (and not 'zero' as in Periodic SNPMs). The Devices Info Section in the message may contain DISs of devices with changed information. Each DIS in the update SNPM may contain the relevant TPGs and T-Adaptors with changed information. The PDME/SDME may minimize the unchanged information sent by the Update SNPM message to reduce unnecessary network traffic.

Unicast SNPM

In one embodiment, Unicast SNPMs (U_SNPM) may be used to create sub network restricted messages between source and final destination management entities, passing the intermediate management entities on the network path between them. Unlike broadcast SNPMs which propagate, according to a certain direction, to all available sub network links without a specific final destination entity, a unicast SNPM conveys a source entity and a final destination entity and the propagation of the message is stopped at the final destination. The motivation for U_SNPM is to query/search-for a network path between two management entities and/or to collect information from/configure the devices along a path. These functionalities are needed for example for session creation, termination and maintenance. SDMEs propagate U_SNPMs to their link partners in a similar way to Periodic SNPMs with additional restrictions according to the HD-CMP Op Code and the final destination entity reference. When a U_SNPM reaches its final destination entity or an edge SDME which is connected to this final destination device its propagation is stopped by the SDME. Unlike Periodic SNPMs, edge U_SNPMs are also propagated by the SDMEs. This allows PDMEs to send U_SNPMs to other PDMEs. SDMEs and PDMES may send their U_SNPMs encapsulated within HLIC packets. SDMEs and PDMEs may accept U_SNPMs received in both Ethernet and HLIC encapsulations.

Within Unicast, network discovering may occur, according to one embodiment, with some or more of the following features: (1) Within the HD-CMP OpCode, there may be a field that determines the U_SNPM directional propagation method, with propagation to the points within the proper direction according to data type, propagation to the proper directional ports with known path to the final destination device, propagation to the proper directional port with the best path to the final destination device, and propagation according to the PDS list within this message. (2) Within the HD-CMP OpCode, there may be a field that defines the propagation directionality of this message, including options such as discard upon reception, propagation only to downstream outputs, propagation only to upstream outputs, and propagation both downstream and upstream. (2) Final Destination Entity Reference (FDER)—The HD-CMP payload may start with a (Device ID: TPG) reference to the final destination management entity of this message. This field may be propagated intact along the network path and may be used, by the intermediate SDMEs, in conjunction with the OpCode to determine the proper propagation; (3) Real Source Entity Reference (RSER)—The HD-CMP payload may continue with (Device ID: TPG) reference to the source management entity of this message. This field may be propagated intact along the network path; (4) PDS—The HD-CMP payload may continue with a Path Description Section. The generator entity of the message may allocate/initialize the proper section size and each intermediate device may update the PDS properly before propagating it; (5) NPA—The payload continues with the Network Path Availability section. The generator entity of the message may allocate/initialize the proper section size and each intermediate device may update the NPA properly before propagating it; (6) Session ID Query (SIQ)—The SIQ field is used to find out which are the active/already allocated session ids (SIDs) along the network path. The SIQ field comprises a series of bytes which creates a bitmap of bits. One bit of the first transmitted byte is marking the existence of the SIQ field and the other bits each represents a SID. The following features may apply in an embodiment: (a) SIQ Exists Flag: One Byte is transmitted first and the MSB in this byte, represents, if set to one, the existence of the SIQ in this message. The U_SNPM generating entity may set this flag according to the U_SNPM message type; (b) SIQ Bitmap: Defined only when 'SIQ Exists Flag' is set to one, and holding a bitmap representing a session id (SID), starting from SID 1. Each SDME, on the message path, may set to one the proper bits in the SIQ bitmap according to the allocated SIDs passing through any port of this SDME (not just the ports this message arrive or continue through), such that at the end of the U_SNPM "journey" the SIQ entries bitmap shows the active/allocated session IDs along the network path. Propagating SDMEs might not clear to zero any bitmap bit; (7) Body: The rest of the U_SNPM message may be constructed according to the message type defined by the HD-CMP OpCode.

In one embodiment, SDMEs may propagate, a received U_SNPM, according to all or some of the following rules: (1) A received Intra U_SNPM, which contains a PDS entry occupied with the receiving device ID (loop detected), may be discarded; (2) A received U_SNPM, which contains an already full PDS (Number of occupied entries is equal to PDS max entries) might not be propagated; (3) SDMEs which receive a U_SNPM, with a Final Destination Entity Reference (FDER) field matching an entity in the receiving switch device, might not propagate the message to any of its ports; (4) Edge SDMEs which receive a U_SNPM, with a FDER field matching a PDME which is directly connected in a proper direction according to the OpCode's 'Dix' sub field, may propagate the message to the edge port directly attached to this PDME and might not propagate the message to any other port; (5) Edge SDMEs which receive a U_SNPM, with a FDER field matching a PDME which is directly connected not in the proper direction according to the OpCode's 'Dix' sub field, may discard the message; (6) A 'By PDS' ('Mod' sub field in the OpCode equals 11) U_SNPM may be propagate according to the 'By PDS' rules, regardless of the OpCode's 'Dix' sub field content; (7) SDMEs receiving a 'By PDS' U_SNPM identifying that it is the last device on the message path (last PDS entry when Occ Count is positive or first PDS entry when Occ Count is negative) may compare the device id portion of the message FDER to its own device id: (a) When device ids matches—The SDME may check the Port ID sub field of the FDER and if it matches a PDME "borrowed" identity, it may forward the message to that, directly attached, matching PDME; (b) When device ids do not match—The SDME may check the directly attached PDME device ids and if it finds a matching one, it may forward the message to that, directly attached, matching PDME; (8) A Bi-Directional port may be considered as both a downstream input port and a downstream output port implemented on the same port; (9) Non 'By PDS', Unicast Downstream SNPM from a downstream input, may be propagated, according to the 'Mod' sub field, to the matching, other downstream outputs. (U_DSPM): When received; (10) Non 'By PDS', Unicast Upstream SNPM (U_USPM): When received from a downstream output, may be propagated, according to the 'Mod' sub field, to the matching, other downstream inputs; (11) Non 'By PDS', Unicast Mixed Path SNPM (U_MXPM): When received from a port, may be propagated, according to the 'Mod' sub field, to the matching ports; (12) SDMEs receiving a 'Best Path' U_SNPM, with a FDER field not matching an entity in the receiving switch device, which cannot find a best path port, with the proper directionality as conveyed in the 'Dix' sub field, may change the 'Mod' sub field to 'With Path' and try to propagate the modified message; (13) SDMEs receiving a 'With Path' U_SNPM, with a FDER field not matching an entity in the receiving switch device or trying to propagate a message which was modified to 'With Path', which cannot find a port with a path to that FDER with the proper directionality as conveyed in the 'Dix' sub field, may change the 'Mod' sub field to 'All Ports' and try to propagate the modified message; (14) SDMEs receiving an 'All Ports' U_SNPM, with a FDER field not matching an entity in the receiving switch device or trying to propagate a message which was modified to 'All Ports', which cannot find a port with the proper directionality as conveyed in the 'Dix' sub field, may discard the message.

A number of examples may be cited for 'With Path' U_DSPM Propagation. In one example, with reference to various of the specific elements appearing in FIG. 6, 'With Path' U_DSPM Propagation includes the following steps. Step 1—Generation: 3E generates a 'With Path' U_DSPM targeting 7E7 towards port 4P, initializes the PDS to 7 zeroed entries, puts its own ID in the first entry, sets the input port to zero and the output port to 1 and sets the Occ Count to 1. Step 2—First Propagation: 222 propagates the 'With Path' U_DSPM towards its DS outputs (ports 6$i$ and 7$i$) since from both of them there is a DS path to 7E. Per propagated message 222 updates the PDS accordingly and sets the Occ Count to 2. Note that 222 does not propagate the message to port 5P, since port 5P is not a DS output with a path to 7E. Step 3—Second Propagation: 221 propagates the 'With Path' U_DSPM towards port 4$i$ since it is a DS output with a path to 7E. 221 does not propagate the message to port 2$i$ since port 2$i$ (which is also a DS output) does not have a DS path to 7E. 223 propagates the 'With Path' U_DSPM, received from port 8$i$, towards port 10$i$ since port 10$i$ is a DS output with path to E7. Step 4—Third Propagation: 224 propagates the 'With Path' U_DSPM, received from port 11$i$, towards port 7P, since port 7P is a DS output and is directly connected to 7E. 224 does not propagate the message to any other port since port 7P is the Edge SDME directly connected to 7E. The four hops message then arrives to 7E. 223 propagates another 'With Path' U_DSPM received from port 9$i$, towards port 10$i$, since port 10$i$ is a DS output with a path to 7E. Step 5—Fourth Propagation: 224 propagates the second 'With Path' U_DSPM, received from port 11$i$, towards port 7P, since port 7P is a DS output and is directly connected to 7E. 224 does not propagate the message to any other port since port 7P is the Edge SDME directly connected to 7E. The second five hops message then arrives to 7E.

A number of examples may be cited for Backwards 'By PDS' U_DSPM Propagation. In one example, with reference to various of the specific elements appearing in FIG. 6, Backwards 'By PDS' U_DSPM Propagation includes the following steps. Step 1—Generation: 7E generates a backwards 'By PDS' U_USPM message targeting 3E, it sets the FDER to the reference of 3E and the Real Source Entity Reference to its own reference (7E). 7E uses the PDS it received in the previous example, setting Max Count to four and Occ Count to minus four to mark backwards 'By PDS'. Step 2—First Propagation: 224 receives the backwards 'By PDS' U_USPM from port 7P with "−4" Occ Count Value, it identifies that this is a backward 'By PDS' message and therefore it uses the input port field of the fourth PDS entry as the output port (port 1). It sets Occ Count to "−3" to mark the next entry on the PDS for the next SDME (223). Step 3—Second Propagation: 223 receives the backward 'By PDS' U_USPM from port 10$i$ with "−3" Occ Count Value, it identifies that this is a backward 'By PDS' message and therefore it uses the input port field of the third PDS entry as the output port (port 8$i$). It sets Occ Count to "−2" to mark the next entry on the PDS for the next SDME (222). Step 4—Third Propagation: 222 receives the backward 'By PDS' U_USPM from port 7$i$ with "−2" Occ Count Value, it identifies that this is a backward 'By PDS' message and therefore it uses the input port field of the second PDS entry as the output port (port 4P). It sets Occ Count to "−1" to mark the next entry on the PDS for the next PDME (3E). Finally, 3E receives the message and identifies that the message FDER is 3E.

Figure 14:
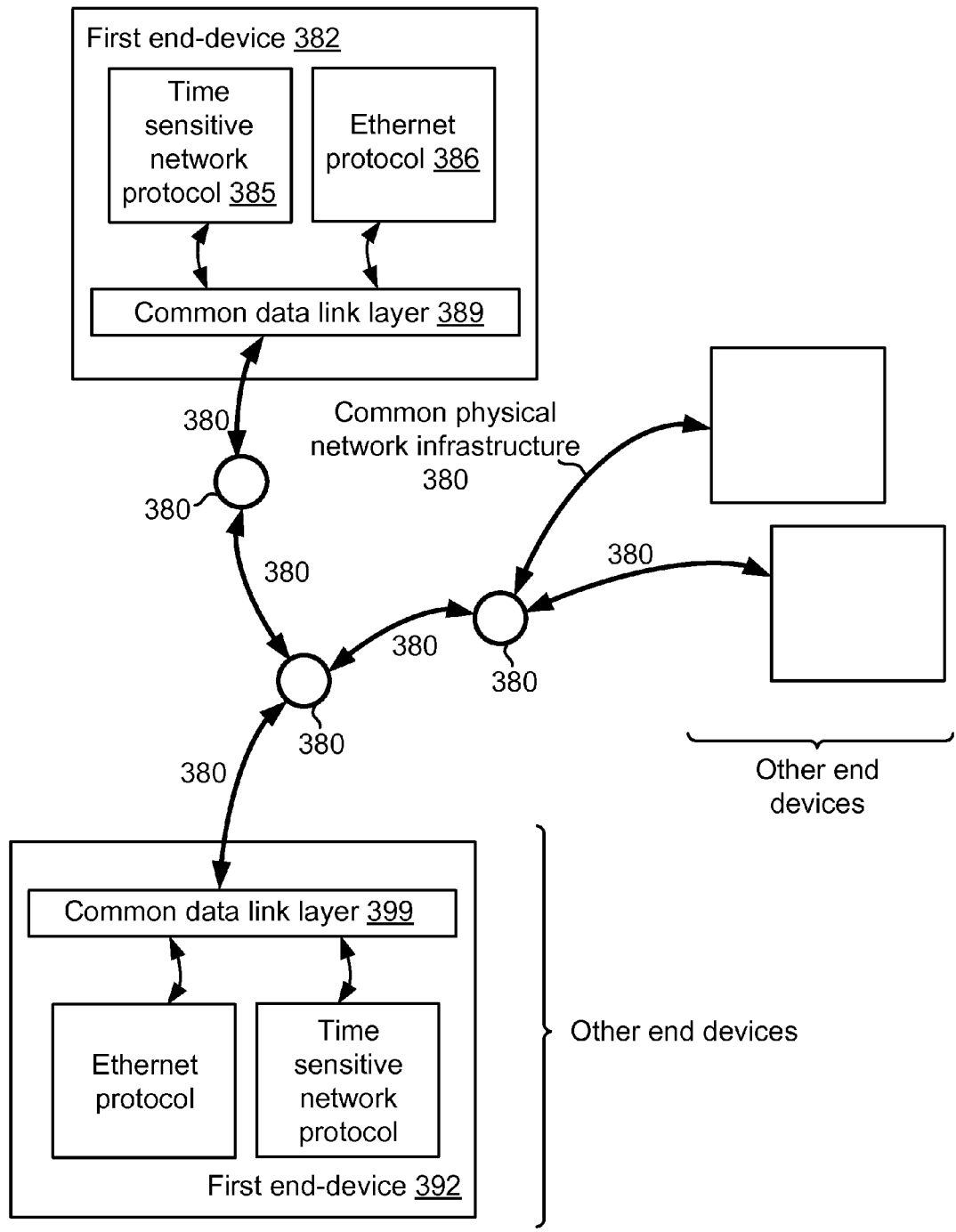
FIG. 14 illustrates some embodiments of using a hybrid network.

FIG. 14 illustrates some embodiments of using a hybrid network. In one embodiment, a first end device 382 connects to a common physical network infrastructure 380. The common physical network infrastructure 380 supports transport of both Ethernet dada and time sensitive network data. The first end device 382 uses Ethernet protocol 386 to discover at least one other end device 392 connected to the common physical network infrastructure 380, while the at least one other end device 392 uses Ethernet protocol to be discovered. The first end device 382 then uses a time sensitive network protocol 385 to send time sensitive network data, over the common physical network infrastructure 380, to the at least one other end device 392, using the time sensitive network protocol. Optionally, a common data link layer 389 is used by the first end device 382 to transport both Ethernet protocol data and the time sensitive network data.

In one embodiment, a first end device 382 connects to a common physical network infrastructure 380. The common physical network infrastructure 380 supports transport of command and control messages using Ethernet protocol 386, and time sensitive network data streams using a time sensitive network protocol 385. The first end device then uses Ethernet protocol 386 to send command and control messages to at least one other end device 392 connected to the common physical network infrastructure 380. Sending of the command and control messages facilitates future transport of time sensitive network data streams between the first end device 382 and the at least one other end device 392. The first end device 382 then uses the time sensitive network protocol 385 to transport time sensitive network data streams between the first end device 382 and the at least one other end device 392. Optionally, a common data link layer 389 is used by the first end device 382 to transport both the command and control messages and the time sensitive network data streams.

Figure 15:
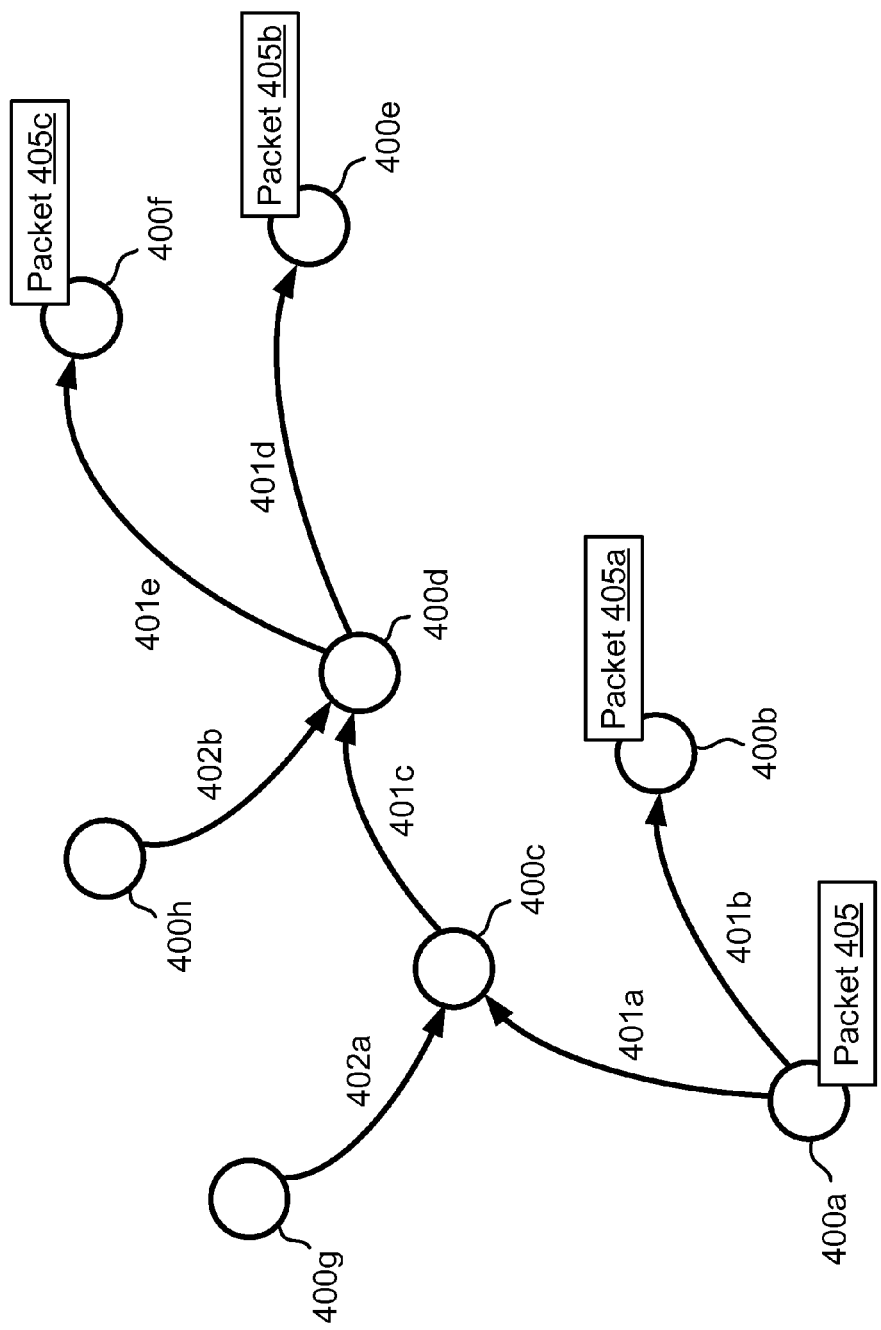
FIG. 15 illustrates some embodiments of an asymmetrical network having downstream and upstream directions.

FIG. 15 illustrates some embodiments of an asymmetrical network, having a downstream direction and an upstream direction. In one embodiment, the asymmetrical network simultaneously determines and analyzes downstream paths of the asymmetrical network using downstream broadcasting techniques. In one embodiment, a first network node 400$a$ downstream broadcasts a packet 405 comprising at least one updatable accumulative field, via at least one downstream link 401$a$ and 401$b$, to at least one additional network node 400$c$ and 400$b$, which are connected to the first network node 400$a$. Each of the at least one additional network node 400$c$ and 400$b$ updates the updatable accumulative field of each packet downstream broadcasted by the first network node 400$a$, with data related to a network parameter associated with the at least one additional network node 400$c$ and 400$b$. The at least one additional network node 400$c$ and 400$b$ and following network nodes 400$d$ continue downstream broadcasting and updating the downstream broadcasted packet, until N packets 4005$a$, 405$b$, and 405$c$, resulting from downstream broadcasting packet 405, end up in at most N network nodes 400$b$, 400$e$, and 400$f$ respectively. The at most N network nodes 400$b$, 400$e$, and 400$f$ have no downstream links, so downstream broadcasting the packets stops at the at most N network nodes 400$b$, 400$e$, and 400$f$. One of the results is that the at least one updatable accumulative field of each of the N packets 4005$a$, 405$b$, and 405$c$ stores an accumulated numerical value related to the accumulation of the network parameters along a path connecting the first network node 400$a$ and the node that stores the packet. By way of example, packet 405$a$ stores an accumulated numerical value related to the accumulation of the network parameters along a path that includes downstream link 401b and network node 400b. Packet 405b stores an accumulated numerical value related to the accumulation of the network parameters along a path that includes downstream link 401a, network node 400c, downstream link 401c, network node 400d, downstream link 401d, and network node 400e. Packet 405c stores an accumulated numerical value related to the accumulation of the network parameters along a path that includes downstream link 401a, network node 400c, downstream link 401c, network node 400d, downstream link 401e, and network node 400f. In one embodiment, a list of nodes visited along the propagation path of each downstream broadcasted packet is updated, in a dedicated field of the downstream broadcasted packets. According to one example, packet 405c has a dedicated field storing the list of nodes visited along the propagation path of packet 405 to packet 405c. The dedicated field of packet 405c lists nodes 400c, 400d, and 400f. In one embodiment, the updatable accumulative field is related to a capacity of each node to transport packets, and the resulting N packets 405a, 405b, and 405c store accumulated numerical values associated with the capacity of each corresponding path to transport packets. It is noted that both path lists and path parameters are obtained using a single downstream broadcast process. It is further noted that nodes 400g and 400h are excluded from the downstream broadcast process, since there is no downstream path connecting node 400a with nodes 400g and 400h as a result of the direction of paths 402a and 402b.

Direct Messages.

In one embodiment, direct HD-CMP messages may be sent, as unicast or broadcast messages, over the Ethernet active topology using the Ethernet encapsulation. A PDME which does not provide Ethernet termination may send these messages over HLIC using full form encapsulation, on the edge link towards its Edge SDME and the Edge SDME may resend these messages over Ethernet to their final target entity. Note that only unicast direct messages may be forwarded, by the Edge SDMEs, over HLIC toward PDMEs with no Ethernet termination. Direct messages are being used to interact with control functions, in several such messages a Request/Response scheme is used. The Request transaction includes a single request packet, followed by a response transaction, which may include one or more response packets. In some message types, a control function may broadcast a request packet. In such cases, only Edge SDMEs may consider the message as intended for them and may respond, each creating a different Response transaction with the requesting control function entity. (There is an exception for this rule: SDMEs and not just Edge SDMEs may respond to broadcast SDME Link Status (SLS) requests). This mechanism allows a control function to proactively discover devices/connectivity/sessions in the network.

Figure 16:
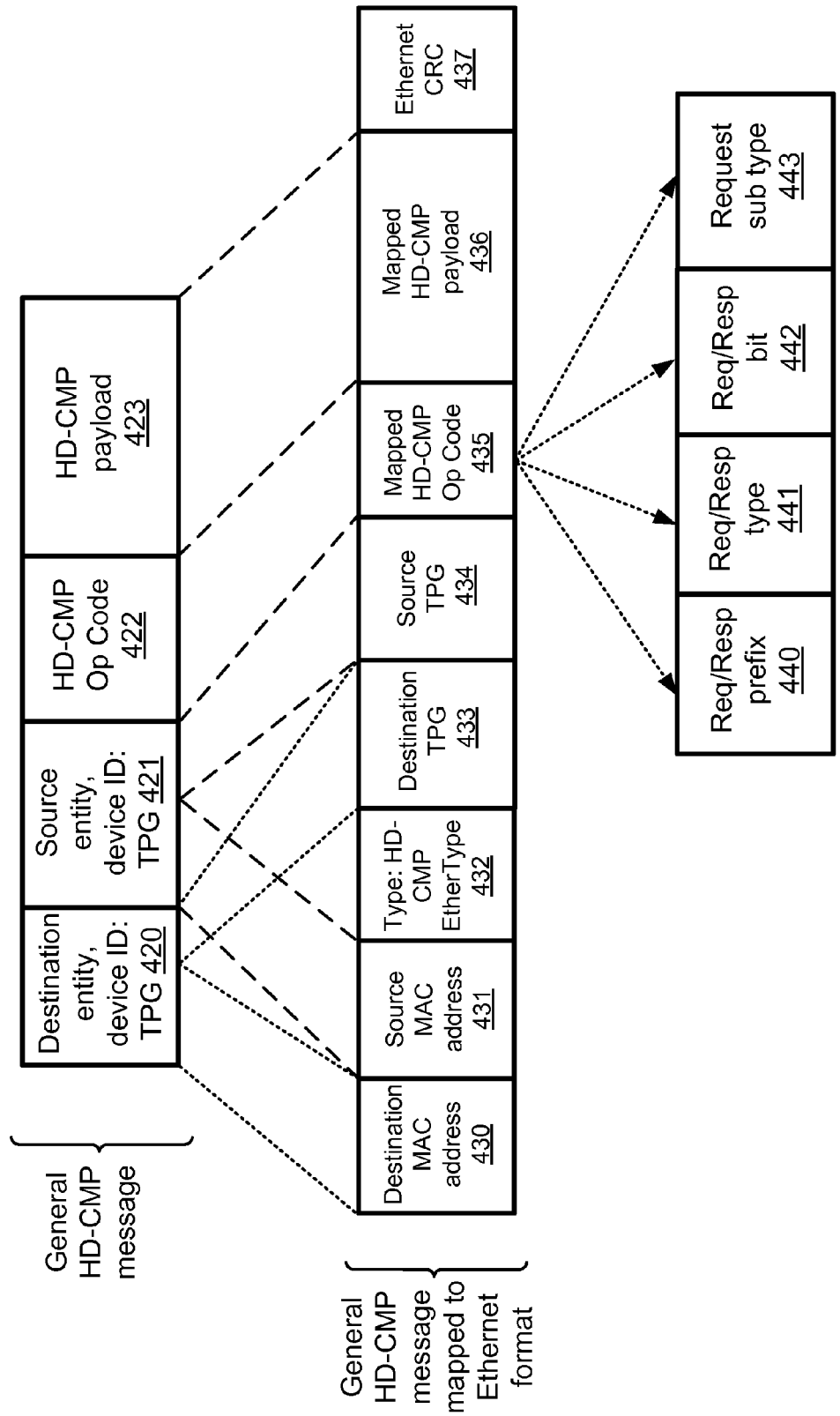
FIG. 16 illustrates one embodiment of a direct request/response/notify message format.

FIG. 16 illustrates one embodiment of a direct request/response/notify message format. The general HD-CMP message includes a destination entity device ID 420 field, a source entity device ID 421 field, which are both optionally expressed in a Port and T-Group ID format (TPG), a HD-CMP OpCOde 422 field, and a HD-CMP payload 423. The general HD-CMP message may be mapped to Ethernet format as follows: (i) the destination entity device ID 420 is mapped into a destination MAC address 430 field and a destination TPG 433 field, (ii) the source entity device ID 421 is mapped into a source MAC address 431 field and a source TPG 434 field, (iii) the HP-CMP OpCode 422 is mapped into a mapped HP-CMP OpCode 435, (iv) the HD-CMP payload 423 is mapped into a mapped HD-CMP payload 436, and (v) an Ethernet CRC 437 is optionally added. The mapped HD-CMP OpCode 435 may include a req/resp prefix 440 field, a req/resp type 441 field, a req/resp bit 442, and a request sub type 443 field.

In addition: (1) Destination Entity Reference: The destination entity for this message. In the case this reference is a broadcast (broadcast Ethernet MAC: TPG=0), this message is destined to the Edge SDMEs; (2) Source Entity Reference: The source entity for this message; (3) Destination Entity Reference: The destination entity for this message. In some message types may be also broadcast; (4) Source Entity Reference: The source entity for this message.

In this context, the term 'Notify' is being used for a "Response transaction" which was not triggered by a request packet (self triggered "Response transaction") or when a request packet triggers a broadcast "Response transaction". These types of transaction are referred to as Notify transactions. The format of the Notify Packet/transaction may be the same as the Response packet/transaction. A responding/notifying entity may minimize the amount of response packets it sends as part of a Response/Notify transaction. In multiple packets Response/Notify transaction, the receiving entity of the response packets ("receiving entity") may monitor the Response Index sub-field to make sure that the transaction's packets have been arrived. Upon reception of a unicast Response Packet with valid sequence Response Index equal, the receiving entity may reply with Direct Response Ack ("DRA") to notify the responding/notifying entity that it received the correct response sequence and the responding/notifying entity may now continue to send the next packet with Response Index. If the responding/notifying entity does not receive such DRA it may request it by sending DRA request. This mechanism is needed to avoid confusion regarding packets, which belong to the same transaction, with the same Response Index (assuming that due to Ethernet active topology dynamic changes, Ethernet packets order is not guaranteed):

At any time, during and after a Response Transaction, the responding/notifying entity may request a Direct Response Ack and the receiving entity may reply with the received sequence indexes. After receiving a non successful DRA (NACK) the responding/notifying entity may abort its active Response/Notify transaction while the receiving entity may generate a request packet to start the Response(/Notify) transaction again. If the responding entity would like to abort a response transaction it may send a DRA (Abort) towards the receiving entity. The receiving entity might not reply to such Abort message. Unicast Notify transactions may act the same as a Response transaction (Response transaction is always unicast). In broadcast Notify transaction the receiving entities might not self generate DRA (only when unicast is specifically requested). In broadcast Notify transaction, after sending a response packet with response index 3, the notifying entity may wait at least 25 mS before sending the next packet on the same transaction. If the receiving entity receives a first packet in a new notify (unicast or broadcast) transaction, during an uncompleted transaction with the same notifying entity and with the same response type (OpCode), it may abort the uncompleted transaction and start the new one. The requesting (receiving) entity might not send a new request packet, during an uncompleted transaction with the same responding entity with the same request type (OpCode), it may first send a DRA Abort. If the responding entity receives a new request message during active Response transaction with the same requesting entity and with the same type it may abort the active transaction and start the new one.

In one embodiment, a DRA Request message is a unicast only direct HD-CMP message, used by the responding/notifying entity to request an acknowledge response from the receiving entity: (1) "Destination Entity Reference" means the receiving entity reference; and (2) "Source Entity Reference" means the responding/notifying entity reference. The combination of "receiving entity" reference, "responding/notifying entity" reference, and the original last transmitted OpCode, uniquely identifies the original transaction enabling the receiving entity to respond properly.

In one embodiment, the DRA Response Message is used by the receiving entity to provide some feedback to the responding/notifying entity during and after a Response/Notify transaction. It also enables both the receiving entity and the responding/notifying entity, to abort or reject a transaction: (1) "Destination Entity Reference" means the destination entity for this message; (2) "Source Entity Reference" means the source entity for this message; (3) The Response Index for the HD-CMP OpCode has at least three significant bits which may convey the type of DRA response packet, such as ACK (used by the receiving entity to indicate that the previous response packets have been received"); NACK (used by the receiving entity to indicate that some previous response packets were not received); Not Supported (used by the responding entity to indicate that the requested transaction type is not supported by it); Not Ready (used by the responding entity to indicate that the requested transaction type is supported by it, but it is not yet ready to reply to this transaction ("you can try later"); and Abort (used by either entity to indicate to the other entity to abort this response transaction). (4) Transaction Last Transmitted OpCode—A field conveying the original OpCode of the last transmitted Request/Response Packet of this transaction; (5) Number of Received Messages—A field conveying the number of already received response packets in this transaction (from the first packet marked as zero). The transaction is identified using both entities references and the "Last Transmitted OpCode" fields; (6) Received Indexes—A bit map where each bit index represents a received response index in this current Response Index cycle.

Devices and T-Network Topology Discovery.

In one embodiment, each management entity may discover and maintain a knowledge base regarding the Multimedia Network according to the following, per entity, specification: (1) PDMEs—may discover and maintain a knowledge base regarding the other T-Adaptors located with the proper direction, at the same sub network, which are potential session partners for the local T-Adaptors, associated with this PDME; (2) SDMEs—may discover and maintain a knowledge base regarding the T-Adaptors located at the same sub network with their associated devices (PDMEs and Edge SDMEs with embedded T-Adaptors) and their directional connectivity with this SDME. Using this knowledge base, SDMEs may be able to compute an output port targeting a certain T-Adaptor/End-Node at the proper directionality; (3) CPMEs—may discover and maintain a knowledge base regarding the T-Adaptors with their associated devices (PDMEs and Edge SDMEs with embedded T-Adaptors) in the reachable sub-networks and the directional connectivity of each one of them to the others. A CPME is not required to maintain the full topology of the network but it may be able to present which T-Adaptors/End-nodes can be connected to which other T-Adaptors/End-nodes; (4) RPE—may conform to the CPME requirements and in addition may discover and maintain a knowledge base regarding the devices in the network, the directional connectivity of each one of them to its neighbors and the status of those connecting links.

In one embodiment, Edge SDMEs may use periodic SNPMs, sent by their directly attached PDMEs, to build their knowledge base regarding the directly connected T-Adaptors capabilities, status and directional connectivity. Edge SDMEs may use periodic SNPMs to report, their directly connected T-Adaptors capabilities and status, to the rest of the sub network: (1) Each edge SDME may generate periodic intra SNPMs towards its intra ports, on behalf of its directly connected end nodes and on behalf of the integrated T-Adaptors/T-Groups in this switch device; (2) Each SDME may propagate periodic SNPMs which it receives through its intra ports towards its other intra ports according to the SNPM propagation rules. The periodic SNPMs allow each SDME to learn/store which T-Adaptors exists in the T-Network, what are their capabilities, status and their directional connectivity from this SDME. SDMEs may also use these periodic SNPMs to build a switching table, marking which end node devices are accessible, per direction, through which port devices of the switch, with how many hops and with what network path availability. Each SDME may discover and maintain a knowledge base regarding the devices which include embedded T-Adaptors (PDMEs and Edge SDMEs with embedded T-Adaptors) located at the same sub network. Per such device, the SDME may also store the directly connected Edge SDME. Per Edge SDME, "this SDME" may store the currently "best" port ID per direction connecting to that target Edge SDME. "Best Port", on all directions, may be computed in terms of largest DS available throughput as extracted from the periodic SNPMs. Per Edge SDME's Best Port, "this SDME" may store the PDS OCC_Count (number of hops) and NPA, as extracted from the Periodic SNPM to be used for future best port computation and for the propagation of U_SNPMs.

In one embodiment, Control Point (CP) functions may be implemented at an end node, a switch, or a pure Ethernet device. A "CPME" is the management entity of a CP. A CPME may provide Ethernet termination. The CPME functionality is needed for the CP to present the devices in the network with their directional connectivity and to initiate sessions. The CPME builds and maintains its knowledge base through interaction with the SDMEs and other CPMEs, as follows: (1) Device Discovery—CPMEs may use Device Status messages sent by edge SDMEs to discover: (a) T-Adaptors in the network; (b) The local-PDME/Edge-SDME associated with each of these T-Adaptors; (c) The associated edge SDME which is directly connected to the above mentioned local PDMEs; (d) The directional connectivity between the T-Adaptors and their associated edge SDME. (2) Directional Connectivity Discovery—CPMEs may use Device Connectivity messages sent by edge SDMEs to discover the directional connectivity between edge SDMEs in the sub network. When combining the information gathered from the Device Discovery and the Directional Connectivity step, the CPME may store the directional connectivity between T-Adaptors/PDMEs in the network. (3) Session Route Computation—When an RPE does not exist in the network, the CPME may use the U_SNPM, DRS method for the computation of session sub network route/path and ID. When an RPE exists in the network the CPME may use the RPE route and ID computation services. In addition to the information gathered using the Device Status messages the CPME may directly access each device HDCD, using HLIC over HD-CMP, to retrieve deeper information regarding this device properties, capabilities and status.

In one embodiment, multiple CPs may be functional at the same time in the Multimedia Network. In order to balance between the number of Discovery messages sent by the SDMEs and the will to minimize general Ethernet broadcasts, a CP registration mechanism may be defined. Each CPME may broadcast periodically its existence in the network; edge SDMEs may track these messages and may store an internal list of registered CPMEs. These list entries may be aged out if the CPME did not continue to send the registration messages. When the number of active CPMEs is defined as "Few" the edge SDME may send the Device Status and Directional Connectivity messages as unicast messages to each registered CPME. When the number of active CPMEs is defined as "Many" the edge SDME may broadcast the Device Status and Directional Connectivity messages to the CPMEs. The threshold number when "Few" becomes "Many" may be stored in the SDME HDCD, as a RW entity, with default value of X (X or more than X CPs considered as "Many", less than X are still "Few"). A CP may change this HDCD entity value during operation. If the active CPME list is not empty, each edge SDME may send periodic Device and Directional Connectivity messages, summarizing the information of its directly connected PDMEs and its embedded T-Adaptors, with the same period as periodic SNPMs. Upon a detection of a change (change in its internal T-adaptors or a received Edge update SNPM) it may send update Device and Directional Connectivity message.

In one embodiment, the Multimedia Network enables the usage of an optional Routing Processor Entity (RPE) which may be implemented at any device, on top of the CPME functionality. The combination of RPE and CPME provides an entity which is aware and can maintain the full topology and status of each link in the network, and is capable of computing the optimal route and a valid session ID for each session upon creation. For Device and Directional Connectivity Discovery the RPE is using the CPME methods. In addition, the RPE may build and maintain its knowledge base about the exact topology and status of the network through Link Status messages sent by the SDMEs/CPMEs. Using its knowledge base, the RPE may provide session route computation services for any management entity upon request. While the CPME sends the CPME registration messages it may also specify if it includes RPE functionality allowing the SDMEs to keep track of the RPEs currently active in the network. When the number of active RPEs is defined as "Few" the SDME may send the Link Status messages as unicast messages to each registered RPE. When the number of active RPEs is defined as "Many" the SDME may broadcast the Link Status messages to the RPEs. If the active RPE list is not empty each SDME may send Link Status messages, summarizing the information of its directly connected Multimedia Network links, periodically, and upon a detection of a change.

FIG. 17 illustrates some examples of various different discovery methods used by each management entity at the different, possible, management entities constellations, in the Multimedia Network. Note that since the RPE contains the functionality of a CPME, if there are no CPs there are no RPEs, if there are a "Few" RPEs there are at least a "Few" CPs and also if there are only a "Few" CPs there are not "Many" RPEs.

In one embodiment, Device Status Messages are Direct HD-CMP messages used by CPs and SDMEs to discover devices and to exchange status information. These messages may be used in the following cases: (1) Periodic Device/T-Adaptor Status Notification: When CPs exists in the network, the Edge SDMEs may periodically send, at the same period as their periodic SNPMs, Device Status Notify messages. The messages may be sent using unicast or broadcast according to the number of active CP's in the network. (2) Event basis (update) Device/T-Adaptor Status Notification: Whenever the status of a device or T-Adaptor is changed, the Device may generate an update SNPM towards its Edge SDME and the Edge SDME may send a unicast/broadcast Device Status Notify message according to the number of active CP's in the network. Upon the detection of a newly attached CP which is the first CP, known to a certain Edge SDME, the Edge SDME may generate a unicast Device Status Notify message which includes its related devices. (3) Request/Response basis Status exchange: A device requests the device status of other devices, for example, a newly attached CP requests the device status of devices in the network from another CP. In response to that device status request, the CP sends the device status information of the devices that it has discovered.

In one embodiment, the Device Status Request message is a direct HD-CMP message, used to request the status of devices in the network usually by Control Points. (1) Destination Entity Reference: The destination entity for this message. (2) Source Entity Reference: The source entity for this message.

In one embodiment, the Device Status Notify/Response Message is used by devices to report their related status periodically, upon change or as a response to a request from another entity. When reporting/replying-to-request, the full notification/response transaction may be larger than what can be fitted into an HD-CMP packet, therefore several response messages may be needed. The following features may apply: (1) Destination Entity Reference is the destination entity for this message. (2) Source Entity Reference is the source entity for this message. (3) Devices Info Section—The rest of the payload is a variable length series containing a DIS (Device Info Section) per reported device. This section may be built by the packet generator with proper fields according to the type of Notify/Response transaction according to these parameters: (a) Periodic—similar to periodic SNPM, only active T-Adaptors are reported; (b) Update Change—similar to update SNPM, only changed T-Groups/T-Adaptors are reported; (c) Response to a request—may contain only the relevant DIS entities as were requested in the request message, both active and non-active Ports/T-Groups/T-Adaptors may be reported; (i) Request for specific T-Group: If the request was for a specific T-Group info within a specific port device, that device DIS may contain only that TPG info with all active/non-active T-Adaptors; (ii) Request for specific Port Device: If the request was for a specific Port Device (TPG=non-zero Port ID with zero T-Group ID) within a specific device, that device DIS may contain only that Port info with all T-Groups with their active/non-active T-Adaptors; (iii) Request for specific Device: If the request was for a specific Device and zero TPG, that device DIS may contain all Port devices info with all T-Groups with their active/non-active T-Adaptors; (iv) Request for Unknown Device/Port/T-Group: If a device (A) was requested to provide info of another device (B) and the (B) device is not known or is unrelated to device (A), Device (A) may send a response message with the 'U' bit of the 'Device Type' field in the DIS of device (B) set to one. If a device (A) was requested to provide info of a TPG (B) and the (B) TPG (Port or T-Group) is not known to device (A), then Device (A) may send a response message with the 'U' bit of the 'Port Type' field in the DIS of device (A) set to one. If the Port Device is not known to device (A), the TPG ID within the DIS, may contain only the Port ID with zero T-Group, with the 'U' bit set in the 'Port Type' field; (v) Request for all related devices: If the request message contains zeroed 'Devices Number' subfield within the HD-CMP OpCode, it means that all related devices may be reported.

The 'Related Devices" in the request for all related devices, include: $_1$The responding device itself; (2) If the responding device is an Edge SDME, The response transaction message/s may contain the DIS of the Edge SDME followed by the DISs of all the end node devices which are directly connected to this Edge SDME; (3) If the responding device is a CPME the response transaction message/s may contain the DIS of the CP device and the DISs of all End-Node/SDME devices which are known to this CPME. Per known Edge SDME, the response may contain the DIS of the Edge SDME followed by the DISs of all the end node devices which are directly connected to this Edge SDME.

When a control point receives a unicast Device Status Request, it may respond with the device status information of all active devices in the network, gathered from Device Status Notify messages. When a SDME receives Device Status Request, it may respond with device status information on behalf of all the edge PDMEs connected to this SDME and embedded T-Adaptors within this SDME (if exist). A control point may keep the active device information from device status notify messages. When a new control point discovers an existing control point with its activity value set, the new control point might not need to discover all the other Multimedia Network devices. Instead, it can receive the discovered device information from the existing control point.

Directional Connectivity Messages.

In one embodiment, Directional Connectivity Messages are Direct HD-CMP messages used by CPs to discover the directional connectivity between SDMEs in the sub network. These messages may be used in the following cases: (1) Periodic SDC Notification: When CPs exists in the network, the Edge SDMEs may periodically send, at the same period as their periodic SNPMs, SDC Notify messages to notify their directional connectivity with the other Edge SDMEs in the sub-network. The messages may be sent using unicast or broadcast according to the number of active CP's in the network. (2) Event basis (update) SDC Notification: Whenever the Directional Connectivity of Edge SDME with another edge SDME is changed, the Edge SDME may generate a unicast/broadcast SDC notify message according to the number of active CP's in the network, Containing only the changed information. Upon the detection of a newly attached CP which is the first CP, known to a certain Edge SDME, the Edge SDME may generate a unicast Directional Connectivity Notify message which includes its related directional connections. (3) Request/Response basis Status exchange: A CP requests a SDC response from a SDME or from another CP, for example a newly attached CP requests the SDC status of devices in the network from another CP. In response to a SDC request, a CP sends the SDC information of the devices that it has discovered.

In one embodiment, an SDME Directional Connectivity Request Message is a direct HD-CMP message, used to request the directional connectivity of some "Target Edge SDMEs" from given "Base SDMEs". When this message is sent to a SDME the "Base SDME" is the receiving SDME and the "Target Edge SDMEs" are listed in the message body or the request was made for the other Edge SDMEs. When this message is sent to a CP, the "Base SDMEs" are listed in the request message body and from each, listed "Base SDME", it requests the connectivity to the other Edge SDMEs, in which "Destination Entity Reference" is the destination entity for this message, and "Source Entity Reference" is the source entity for this message.

In one embodiment, the SDME Directional Connectivity Notify/Response Message is used by SDMEs to report their directional connectivity with other Edge SDMEs periodically, upon change or as a response to a request from another entity. When reporting/replying-to-request the full notification/response transaction may be larger than what can be fitted into an HD-CMP packet, therefore several response messages may be needed, in which: (1) Destination Entity Reference is the destination entity for this message; (2) "Source Entity Reference" is the source entity for this message. In addition, in the Connectivity Info Section, the rest of the payload is a variable length series of "Base SDME" Connectivity Info sub-sections, and each sub-section may contain the following fields: (1) DS Best Port BW—A field which contains the current available throughput in the best DS path from the "Base SDME" to the "Target SDME" as taken from the best path NPA field; (2) US Best Port BW—A field which contains the current available throughput in the best DS path from the "Target SDME" to the "Base SDME" as taken from the best path NPA field; (3) MX Best Port BW—A field which contains the current available throughput in the best Mixed path from the "Base SDME" to the "Target SDME" as taken from the best path NPA field.

In addition, the Connectivity Info Section may be built by the packet generator populated with proper fields according to the type of Notify/Response transaction, in which: (1) "Periodic"—Each Edge SDME reports its directional connectivity with the other Connected Edge SDMEs; (2) "Update"—Upon a change, the Edge SDME reports its Directional Connectivity Change, using an Base SDME sub-section since the reporting SDME is the "Base SDME", while the "Target SDMEs" are the other Edge SDMEs which their connectivity with the reporting SDME have been changed; (3) Response to a request may contain only the relevant "Base SDME" sub-sections with the relevant "Target SDMEs" within it, in which Request for Unknown "Target Edge SDME": If a SDME (A) was requested to provide its directional connectivity with another device (B) and the (B) device is not known or is unrelated to device (A), Device (A) may send a response message, the "Best SDME" sub-section of Device (A) in the response packet may contain a "Target SDME" entry for Device (B) with connection status 'No Connection'. If a CP device (A) was requested to provide directional connectivity info of a "Base SDME" (B) and the (B) device is a not a SDME or not known to the CP (A), the response packet may contain a (B) "Base SDME" sub-section with 'Number of Target SDMEs' equal to a pre-defined number, with no Target SDME entries following.

In one embodiment, Link status Messages are Direct HD-CMP messages used by RPEs to discover the network topology and status. Each SLS notify message conveys the directionality and status of the links connecting SDMEs with their neighboring devices. These messages are used in the following cases: (1) Periodic SLS Notification: When RPEs exists in the network, SDMEs may periodically send, at the same period as periodic SNPMs, SLS Notify messages to notify their direct links status. The messages may be sent using unicast or broadcast according to the number of active RPE's in the network. (2) Event basis (update) SLS Notification: Whenever a direct link status is changed, the SDME may generate a unicast/broadcast SLS notify message according to the number of active RPE's in the network, Containing only the changed information. Upon the detection of a newly attached RPE which is the first RPE, known to a certain SDME, the SDME may generate a unicast Link Status Notify message which includes its related links. (3) Request/Response basis Status exchange: A RPE requests a SLS response from a SDME or from another RPE, for example, a newly attached RPE requests the SLS from a SDME. In response to a SLS request, the SDME sends the SLS information of its direct links. Only a RPE entity may broadcast a SLS request, in this case all SDMEs (Edge SDMEs and non Edge SDMEs)

may respond (special case since in all other message types, only Edge SDME may respond to broadcast requests).

In one embodiment, an SDME Link Status Request Message is a direct HD-CMP message, used to request the Link Status of the links connecting a given "Base SDME". When this message is sent to a SDME the "Base SDME" is the receiving SDME. When this message is sent to a RPE, the "Base SDMEs" are listed in the request message body and from each, listed, "Base SDME" it request the connectivity info of the links, connected and unconnected, is requested.

In one embodiment, the SDME Link Status Response/Notify Message is used by SDMEs to report their directly attached links status periodically, upon change or as a response to a request from another entity. When reporting/replying-to-request the full notification/response transaction may be larger than what can be fitted into an HD-CMP packet, therefore several response messages may be needed.

In one embodiment, CPME Registration Message is a Broadcast HD-CMP message sent by the CPME/RPE to notify the SDMEs and other CPMEs, its existence in the network and its capabilities. If an Edge SDME does not receive CPR from a certain registered CPME within a specified time (typically, a few seconds), the SDME may delete this CPME from the registered CPME list. The SDMEs may track these messages sent by CPMEs with RPE capability and may store an internal list of registered RPEs.

In one embodiment, the T-Adaptor Instance Specific (TIS) messages are Unicast, Direct HD-CMP messages used to communicate with a certain T-Adaptor instance. These messages are used to retrieve T-Adaptor specific information from the T-Adaptor instance or to configure the instance. The TIS messages are exchanged in a Request/Response manner.

T-Network Sessions

In one embodiment, in order for a T-Adaptor to communicate over the T-Network, with another T-Adaptor, a session may be created. The session defines a bi-directional communication, sub network path and reserves the proper service along it. Each active session may be marked by a SID (Session ID) token. This SID token may be carried by each Multimedia Network packet, belonging to this session. The T-Switches along the sub network path, may switch those packets according to their SID tokens. The SID may be unique per switch device on the path. Different sessions, active at the same time, may share the same SID if their network paths do not have a common switch device. Each session may include several T-Streams each comprised of several packet streams. The packet streams may flow in both directions (from T-Adaptor A to T-Adaptor B and from T-Adaptor B to T-Adaptor A) along the sub network path. Each packet stream may pass through exactly the same links/hops, intermediate switch devices and ports (but may flow in opposite directions). A Session may be created by an Initiating Entity between two Session Partners, a First Partner and a Second Partner.

In one embodiment, each session, upon creation, may reserve the required path throughput per direction (downstream and upstream). The required directional throughput for a session may be determined according to the aggregated packet stream throughput used by this session. For a given sub network path, the available path throughput per direction is defined as the throughput of the link with the minimal throughput at the proper direction from the links which compose the path. The available throughput and the number of committed PSU per sub network path, per direction, per priority are collected using the Periodic SNPM. Upon creation, each session may reserve the required path PSU budget per priority, per direction (DS and US). The required PSU budget for a session may be determined according to the aggregation of packet streams used by this session. Session requirements may be represented using an NPA structure.

In order to control latency variation, the Multimedia Network in one embodiment limits the max packet size per priority and the amount of interfering PSU per sub network path, per direction, per priority. The Full Path PSU Budget represents the max number of interfering packet streams (in PSU) a victim packet from a certain priority may encounter over the full sub network path. This scheme allows congesting more streams into the network by dynamically reducing the max packet size as long as there is enough available bandwidth to accommodate for the framing overhead increase. Optionally, each T-Adaptor declares the PSU usage per priority it needs for its T-Stream and the session declares the accumulation of PSU per Priority over the T-Adaptors in the session. A session may use a sub network path if the path can accommodate the additional required PSU within a defined budget.

In one embodiment, unlike other widely spread "dynamic switching/routing per packet" schemes, the T-Network operates using fixed route sessions. The session route may be set upon creation over a sub network path, and might be changed later. If the network topology/conditions change such that the route is no longer valid for this session, the session may be terminated and another session may be created. While the session is active over a certain route the incoming packets may be routed by the T-Switches according to their SID token. Therefore, one session routing task is to identify possible valid paths/SIDs for a certain session creation, and to select the optimal path among them.

In one embodiment, a sub network path is a "valid path" for a certain session creation when the following conditions are met: (1) The path may include no more than a predetermined number of hops, e.g., five. (2) The path may have available DS throughput which is larger than the DS throughput required by the session. (3) The path may have available US throughput which is larger than the US throughput required by the session. (4) The path may be able to accommodate the additional DS PSU requested by the session within the DS Full Path PSU budget. (5) The path may be able to accommodate the additional US PSU requested by the session within the US Full Path PSU budget. (6) The creation of this session using this path might not cause another session, using another path which is partly overlapping with this path, to violate its DS/US Full Path PSU budget (Cross Path PSU Violation (XPSU)). (7) A unique, over the path, session ID can be allocated (SID which is not used by any of the switches along the path).

The following definitions may be used in the following sections describing Multimedia Network session management: (1) "Initiating Entity"—Any management entity (PDME/SDME/CPME), requesting a session initiation. (2) "Session Partners"—The session is defined between two edge management entities (and their associated T-Group/T-Adaptors), these entities are referred to as the "Session Partners", which: (a) "First Partner—One of the "Session Partners" entities, as selected by the "Initiating Entity"; and (b) "Second Partner"—The other one of the "Session Partners" entities, as selected by the "Initiating Entity". (3) Initiating Entity Reference (IER)—The Initiating Entity may provide N byte IER which may be associated with the session by the different management entities managing this session (Session Partners, SDMEs along the session path and CPME). The IER is an N byte TPG reference (Device ID: Port ID, T-G ID). If the Initiating Entity is a CPME the Device ID reference is sufficient for uniquely identify the CPME therefore the CPME may use the TPG field as follows: (a) Port ID—The X bit Port ID sub field may be used as a "Control Point User ID" (CP UID) which allows another level of referencing for the different users operating the CP the value zero is reserved for indicating "unspecified user"; (b) T-Group ID—The Y bit T-G ID sub field may be used to indicate the Session Creation Index (SCI) of this initiation attempt and therefore provide means for the same Initiating Entity to conduct several initiation attempts of different sessions at the same time even with the same "Session Partners".

In one embodiment, session management comprises the following operations: (1) Session Creation—An "Initiating Entity" creates a session between the "Session Partners". (2) Session Maintenance—Each session partner sends periodically Session Maintenance Message using Unicast SNPM (SMU), the SMU message updates the session's descriptors at each intermediate switch device along the session's path and keeps the session active; (3) Session Status—Using Session Status messages control functions may retrieve information regarding the sessions currently active in the network. (4) Session Update—Session Partners and control functions may modify an active session properties using Session Update messages. (5) Session Duplication—Some uni directional T-Streams (T-Adaptors output), which are part of an active session, may be duplicated by control functions. (6) Session Termination—Session Partners, Control Functions and intermediate Switch Devices may terminate active sessions using session termination messages.

In one embodiment, Multimedia Network session management provisioning may be implemented at the Control Function and at the Session Partners implementations. In one embodiment, intermediate switch devices do not provision session management operations and "obey" each command sent, by the session partners, using U_SNPM (SRQ, SRST, STU, SMU) to the best of their abilities. This description defines means to identify the "owner" of the session, the entities which are trying to change the session properties and the following per operation provisioning framework: (1) Session Creation—Both Session Partners may approve the session properties in order to create it. (2) Session Update—To remove a resource from an active session (T-Adaptor T-Stream, Throughput), one partner approval is sufficient for the operation. To add a resource to a session may require the approval of multiple partners. (3) Session Duplication—To duplicate a session, the original Partner which contains the "source" T-Adaptor may approve the operation. (4) Session Termination—One partner approval is sufficient for session termination.

Session Creation.

In the session creation process, "Selecting Entity" means the entity which chooses one of the possible paths for the session creation. In one embodiment, the default DRS session creation process comprises the following steps: (1) Session Initiation Request (SIR): The "Initiating Entity" may send, Direct HD-CMP, Session Initiation Request messages, to both "Session Partners" management entities, checking their availability and requirements for such a session. The "Initiating Entity" selects the First and Second partners identity and instructs them how to execute the next steps of the session creation process. The First and Second Partner respond with SIR responses to the SIR requests. (2) Session Route Query (SRQ): As instructed, by the "Initiating Entity", the First session Partner may send a Session Route Query U_SNPM targeting the second session partner. The First Partner may also send the corresponding Send SRQ SIR response to the Second Partner notifying it of the start of the SRQ stage. (3) Session Route Select (SRSL): The second session partner may operate according to the instructions embedded in the Session Route Query with the following options: (a) The second partner selects by itself the best route out of the received queries results; (b) The second partner collects all/ some of the route queries results and sends a Direct Session Route Select Request to another entity, the "selecting entity". The "selecting entity" will decide on the best route and reply with a Direct Session Route Select Response containing the selected PDS and session ID. (4) Session Route Set (SRST): The second session partner may send a Session Route Set, 'By PDS', backward U_SNPM which sets the session and reserves the resources on the intermediate devices along the path. If one of the devices along the path (SDMEs or the "First Partner") cannot set the session it may reply back to the "Second Partner" with 'By PDS', Session Termination U_SNPM (STU) to terminate the session already created on the previous devices on the SRST path. The "Second Partner" may try to resolve the problem according to the termination cause as stated in the STU and if it can (or "thinks it can"), it may send an additional SRST. If it cannot resolve the problem, it may notify the "First Partner" and the "Initiating Entity" that this session cannot be set using a direct Session Termination Response. (5) Session Creation Completed (SCC): When the first session partner receives the Session Route Set message it may generate a direct broadcast Session Status Response message to announce the session creation to the CPs in the network.

In one embodiment, the network may include multiple Control Points, which can initiate sessions simultaneously. Per T-adaptor, once an SRQ message is sent, the Session Creation process may be resolved before another session creation involving the same T-adaptor is started. Different sessions involving the same T-adaptor (Multi T-stream) may therefore be created sequentially. In the SIR response, a Session Partner may notify an Initiating Entity if it is requesting to initiate a session involving a T-adaptor which is already involved in a Session Creation process (beyond step 2 above). A Session Partner may reject a request for sending an SRQ involving a T-adaptor which is already involved in a Session Creation process (beyond step 2 above).

Figure 18:
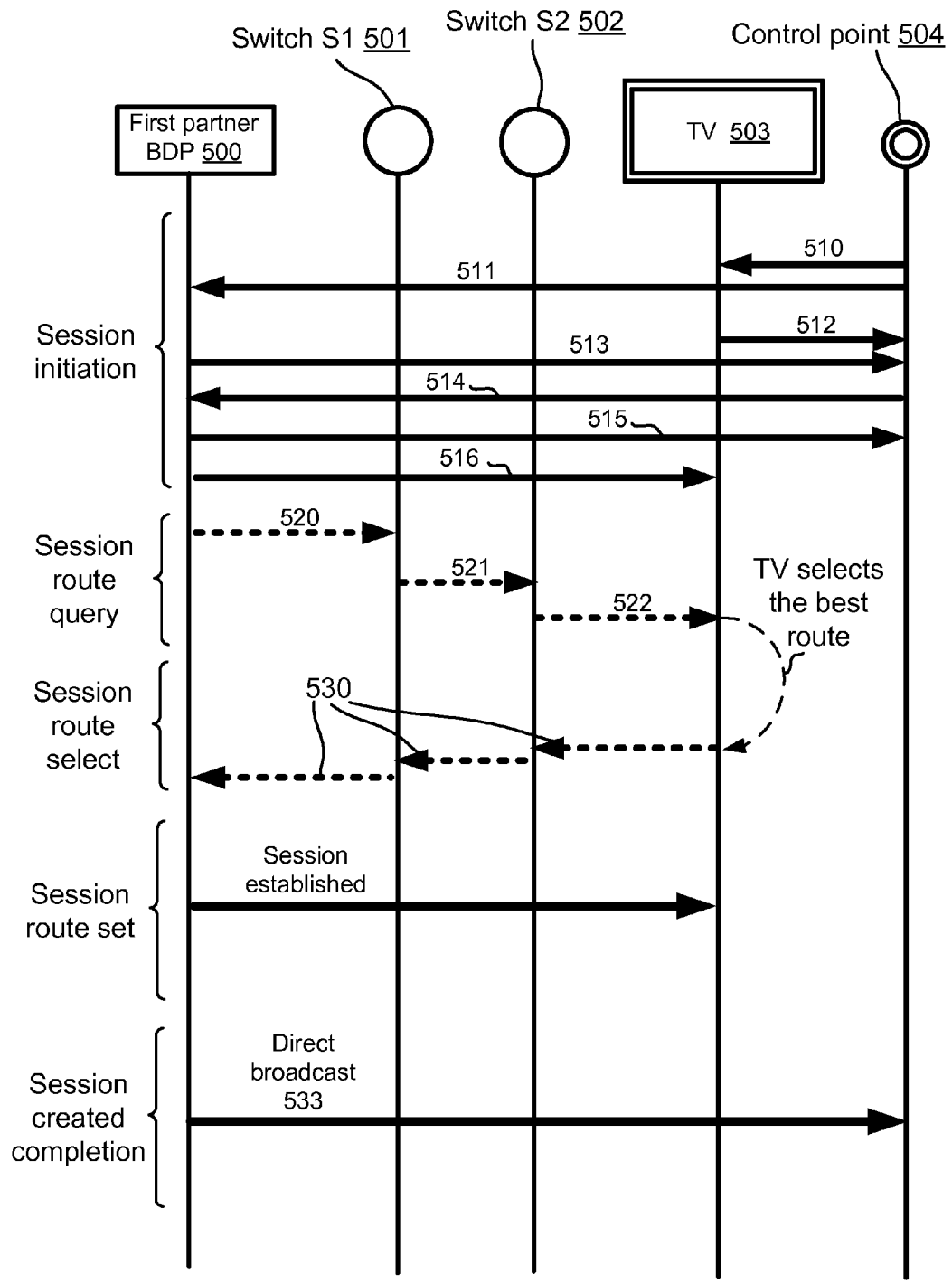
FIG. 18 illustrates one embodiment of a DRS session creation process.

FIG. 18 illustrates one embodiment of a DRS session creation process. Full arrows represent Direct HD-CMP messages and dashed arrows represent U_SNPM. The CP (Control Point) 504 is the initiating entity creating an HDMI session between an HDMI Source T-Adaptor within BDP 500, which it selects as a first partner, and a HDMI Sink T-Adaptor within TV 503, which is the second partner. CP 504 sends Session Initiation Requests 510 and 511 to TV 503 and BDP 500 in order to verify their ability to participate in such session and to get their requirements form the session route. When Ack Responses 512 and 513 arrive with the session requirements, CP 504 sends another Session Initiation Request 514 to the BDP 500 with instruction to send the SRQ, 'Best Path', U_DSPM 520 towards TV 503, indicating that TV 503 may also act as the Selecting Entity in this process. BDP 500 sends SRQ 520 to TV 503 marking a FDER with a T-Group reference associated with the HDMI sink T-Adaptor within TV 503. The SRQ 520 propagates 521 and 522, according to the U_SNPM propagation rules, as a 'Best Path' U_DSPM, through switch S1 501 and switch S2 502 to TV 503. SRQ 522 message reaches TV 503 still as a 'Best Path' message, which means that switch S1 501 and switch S2 502 have a record of the best path targeting TV 503. When a 'Best Path' SRQ 522 reaches TV 503, there is no need to select the path from several path options, since 'Best Path' defines single message hence single option. The path conveyed in the arriving U_DSPM's PDS is adequate to accommodate the session and therefore TV 503 selects it as the path for the session. TV 503 sends a backward 'By PDS', U_USPM, SRST 530 using the same PDS as received from SRQ 522. This message propagates through switch S2 502 and switch S1 501 up to BDP 500, where in each device it sets the chosen session id and reserves the resources for it. The session is now active on the devices. In order to update CPs in the network about the new session after SRST 530 reaches BDP 500, BDP 500 send a Direct Broadcast Session Status Response message 533 announcing the session id, chosen PDS and committed resources for the session, to any CP in the network. TV 503 does not necessarily receive this broadcast message since it does not necessarily have to provide Ethernet termination, but TV 503 can now sense the activity of the session through incoming periodic session maintenance packets.

Figure 19:
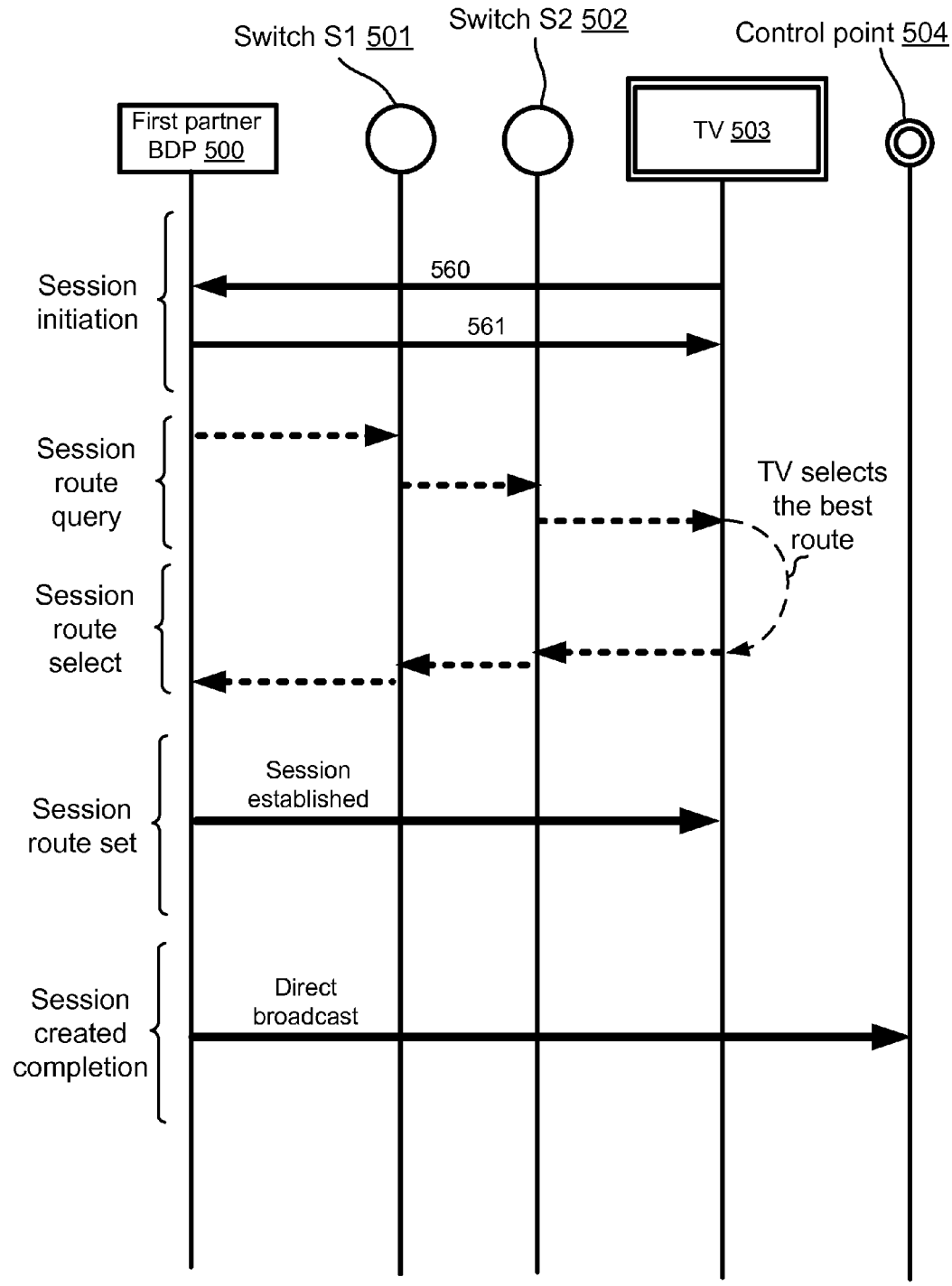
FIG. 19 illustrates one embodiment of the DRS session creation process.

FIG. 19 illustrates one embodiment of the DRS session creation process. TV 503 is the initiating entity and the selecting entity. Therefore, the Session Initiation step 560 and 561 is short. TV 503 also sends a 'Send SRQ' SIR to BDP 500 without the preceding 'Get Requirements' SIR. In this case, BDP 500 may update the Session Requirements field, send the SRQ and notify TV 503 of the requirement update (SIR Response). The rest of the process is identical to the session creation process illustrated by FIG. 18.

In this case, the TV is the "Initiating Entity", the "Second Partner", and the "Selecting Entity". Therefore, the Session Initiation step is shorter. The "Initiating Entity" also sends a 'Send SRQ' SIR to the "First Partner" without the preceding 'Get Requirements' SIR (as was true in the preceding example in FIG. 18). In this case, the "First Partner" may update the Session Requirements field, send the SRQ, and notify the "Initiating Entity" of the requirement update (SIR Response). Note that in any case, the "Initiating Entity" may receive first the requirements of the "Second Partner" before sending the 'Send SRQ' SIR to the "First Partner". In this example, it is obvious, since the "Initiating Entity" is the "Second Entity". The rest of the process is identical to the previous example.

Figure 20:
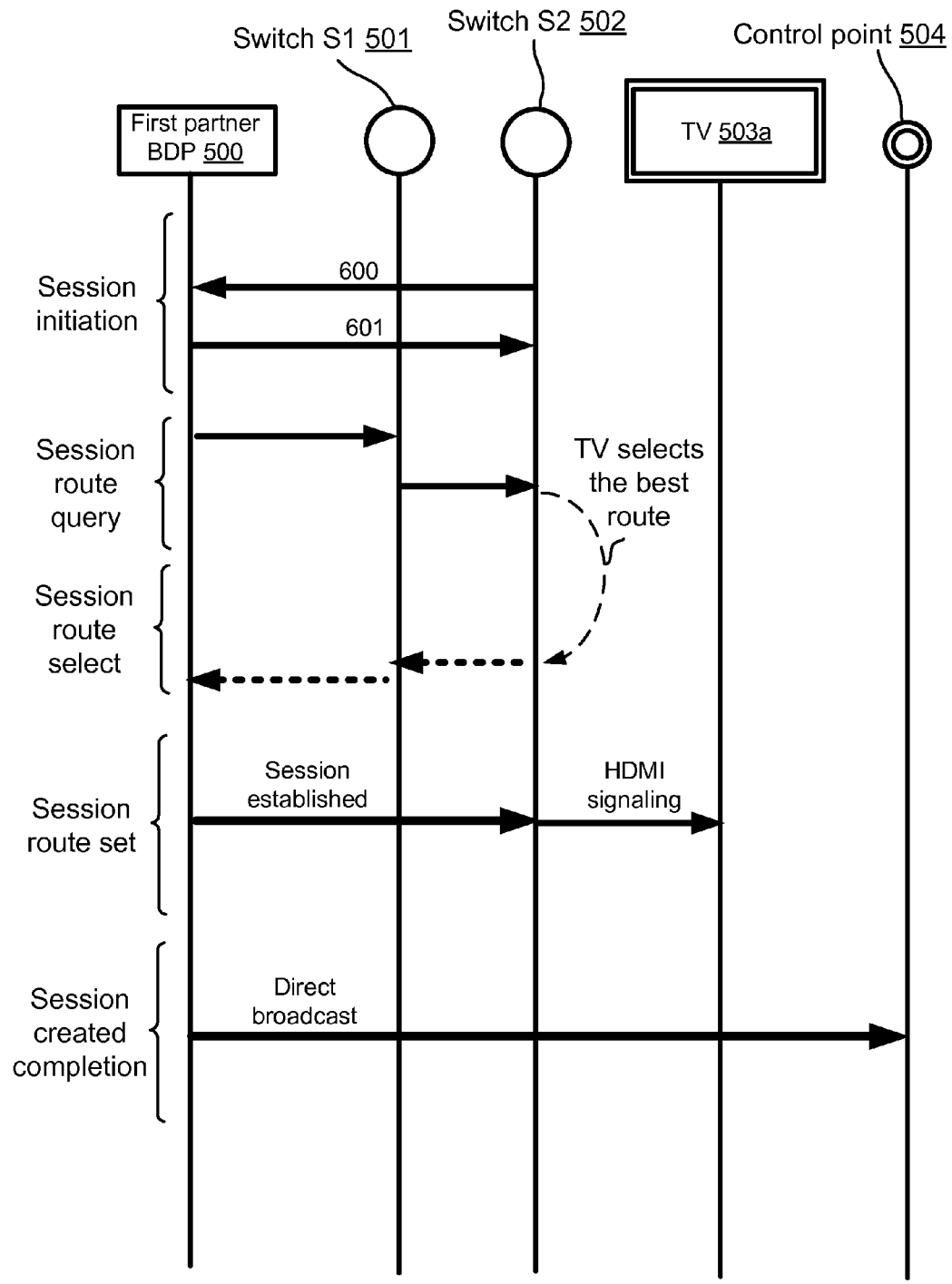
FIG. 20 illustrates one embodiment of DRS session creation process.

FIG. 20 illustrates one embodiment of DRS session creation process. TV 503*a* is a legacy HDMI-CEC TV that selects BDP 500 using CEC mechanism. Switch S2 502 has an embedded HDMI Sink T-Adaptor that is connected using regular HDMI cable to legacy TV 503*a*; this T-Adaptor intercepts the CEC command and instructs switch S2 502 SDME to create 600 and 601 a proper session. Switch S2 502 then takes the roles of an initiating entity and a selecting entity. It is to be noted that there is no need for any CP function, since the control is done using legacy CEC and a DRS is taking care of the rest. CP 504 becomes informed only about the new session and does not take any active role in the process.

In one embodiment, the Multimedia Network, unlike some other networks, has a low power mode, called "Stand-By". The Multimedia Network combines a low power network with resource allocation, and maintains this configuration through the how power mode. Maintaining resource allocation during the low power mode provides at least two benefits, which are: (1) It shortens the time to resume system operation; and (2) It ensures that no other stream will capture the resources. In one embodiment, each session partner may declare its Stand-By status to enable the network (the switches along its network path) to go into Stand-By (LPPF) mode of operation in some of the links along this session's network path. SDMEs may monitor these Session's Stand-By Status declarations and if on a certain network link the active sessions, in both directions, are in "Stand-By" (e.g., can accommodate network links which are in LPPF mode), it may move to LPPF mode on that link. Note that when a partner declares "Stand-By", it does not automatically mean changing its committed session resources. Session partners may explicitly modify their required session resources when applicable. A session may go into Stand-By, passing only some control information but still maintaining the resources committed by the network to resume activation without the need to reallocate the network resources. Declaration of Stand-By status may be done using the first Additional Info entry which may contain the "Duplication/Stand-By Properties" as specified in Duplication/Stand-By Properties Additional Info Entry.

Session partner of a non duplicated session which is in active mode may omit the "Duplication/Stand-By Properties" entry from its additional info field. If the "Duplication/Stand-By Properties" entry is omitted it may be considered as if active mode was reported. During session creation the "Initiating Entity" may specify, in its SIR's Additional Info Stand-By Status, to request creation of the session in Stand-By. Session partners may declare their Stand-By requirements during the session creation steps (SIR, SRQ, SRSL, SRST) and during session maintenance (SMU).

In one embodiment, some unidirectional T-Streams (T-Adaptors output), which are part of an active session, may be duplicated by control functions to another sub-network location (Partner). Assuming the partner 'A' contains the "source" T-Adaptor/s of the to-be-duplicated T-Stream/s which are currently participating in a Session S1 targeting the partner 'B'. The duplication is done by creating a new session S2 between the original partner 'A' and a new partner 'C' which contains the same A's T-Group as in S1 with some of the T-Adaptors instances already participating in S1.

In one embodiment, Session Initiation Request messages are sent from the "Initiating Entity" to the "First Partner" or to the "Second Partner" using Direct HD_CMP messages, typically over Ethernet.

Figure 21:
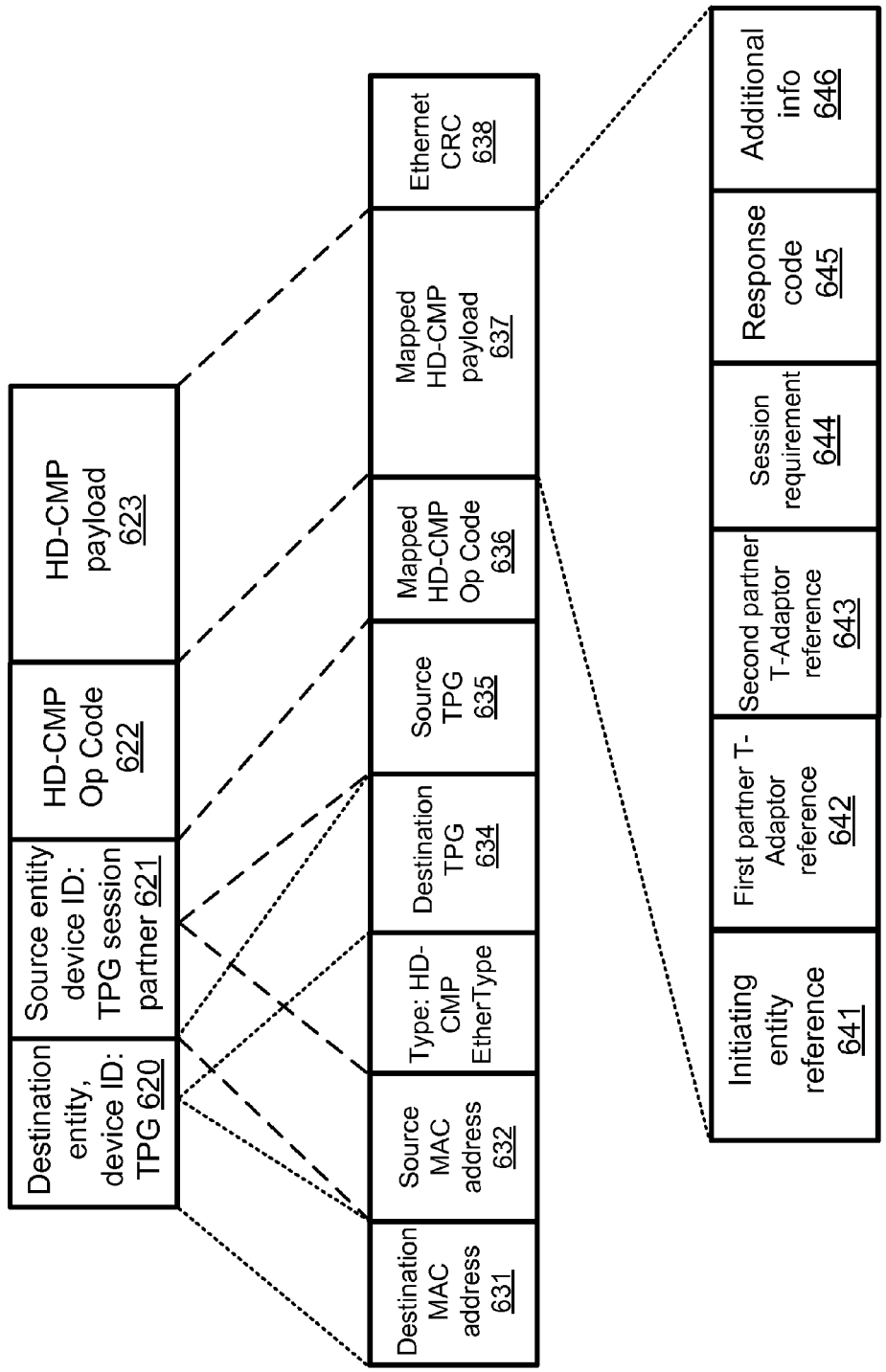
FIG. 21 illustrates one embodiment of a Session Initial Responses.

FIG. 21 illustrates one embodiment of a Session Initial Responses ("SIR"), useful, among other things, for finding a route and/or for checking the crosstalk of the interferences. SIR messages are sent from the "First Partner" or the "Second Partner" back to the "Initiating Entity" using Direct HD_CMP messages typically over Ethernet. An SIR response is also sent by the First Partner to the Second Partner when sending a Session Response Query ("SRQ"). FIG. 21 illustrates one embodiment of an SIR message format with its mapping to an Ethernet packet, in response to an SRQ.

The top layer of FIG. 21, including elements 620, 621, 622, and 623, is the packet formatting layer. Destination entity device ID: TPG 620, is the reference for the destination entity of this message. The Destination entity reference is also known as the "Initiating Entity" or as the "Second Partner" (in contrast to the First Partner that sends an SRQ). Session entity device ID: TPG session partner 621, is a source entity for this message, and is also known as the "Session Partner" management entity reference. HD-CMP OpCode 622 is an SNPM message, comprising N number of significant bits, and a request/response bit flag, and a sub type which may the same type as the request packet. The HD-CMP payload 623 is one or more information packets which respond to the SRQ.

The middle layer of FIG. 21, including elements 631, 632, 634, 635, 636, 637, and 638, is a packet reformatting layer, or what may be called a "mapping" of the upper level packet formatting. Information in 620 is divided between Destination MAC address 631 and a Destination TPG 634. Information in 621 is divided between a Source MAC address 632 and Source TPG 635. 622 has now become Mapped HD-CMP Op Code 636. 623 has now become Mapped HD-CMP payload 637. Ethernet CRC 638 is a quality check on the reformatted packet.

The bottom layer of FIG. 21, including elements 641, 642, 643, 644, 645, and 646, is a blowup of Mapped HP-CMP payload 637. Initiating Entity Reference ("IER") may be the same as in the request packet. First Partner T-Adaptors Reference ("FPTR") 642—if the "Session Partner" 621 cannot use certain listed T-Adaptors (as were sent in the request packet) for this session, it may update the FPTR and the SPTR fields accordingly, otherwise it may use the same FPTR as in the request packet. The "Session Partner" might not add additional unlisted T-Adaptors to the response packet. Second Partner T-Adaptors Reference (SPTR) 643—if the "Session Partner" 621 cannot use certain listed T-Adaptors (as were sent in the request packet) for this session, it may update the SPTR and the FPTR fields accordingly, else it may use the same SPTR as in the request packet. The "Session Partner" might not add additional unlisted T-Adaptors to the response packet. Session Requirements 644 is a field that may be updated if the "Session Partner" 621 requires more resources than were listed in the request packet. If the "Session Partner" 621 requires equal or fewer resources than were listed in the request packet, it might not alter this field and may use the same value as in the request packet.

Response Code 645—a bit map field may convey the response code of the "Session Partner" 621. Various bits in the response code 645 may fulfill various functions, such as (1) 'TG' bit—May be set to one if TPG reference is not valid for this session partner; (2) 'TA' bit—May be set to one if T-Adaptors type mask or Additional Info were updated, FPTR and SPTR as well as Additional Info of this response packet contains the updated values; (3) 'SR' bit—May be set to one if Session Requirements field was updated, this response packet contains the updated value. (4) 'DR' bit—May be set to one if the instructed direction for the SRQ is not consistent with this partner; (5) 'ER' bit—May be set to one if there is a general error in this session partner; (6) 'NT' bit—May be set to one if the session partner needs more time to assemble its response. If it is set and the 'TA' bit is also set it means that at least one of the T-adaptors is already engaged in a Session Initiation process, and the Initiating Entity might not resend its request within a prescribed period of time. Otherwise, if it is set to 1, the meaning of this code is 'Not yet', response is not ready yet but "I am working on it" and the real response will follow in a while. The session partner may send this response code periodically, N number of times at time intervals T. This mechanism allows the utilization of relatively short timers at the Initiating Entity to identify "no response condition"; (7) 'RS' bit—Reserved bit may be cleared to zero when transmitted and ignored upon reception; (8) 'RQ' bit—May be set to one, if the session partner did transmit or is going to transmit the SRQ message. If the SRQ was or may be transmitted, the response packet may contain the FPTR, SPTR, Session Requirements and Addition Info fields as were or will be transmitted in the SRQ packet. If the 'TG' bit or the 'DR' bit or the 'ER' bit are set to one, the first partner might not send the SRQ and may clear the 'RQ' bit in the response code. In other cases the first partner has the flexibility to decide whether to transmit the SRQ or not but it may report its decision using the 'RQ' bit. For example if the first partner discovers it needs slightly more path throughput than what was listed in the request packet, it may send the SRQ with the modified session requirements field and mark the 'RQ' bit in the response code. Another example is that if the first partner cannot allocate one of the listed T-Adaptors in the session it may send the SRQ with modified FPTR and SPTR, mark the 'RQ' bit and update the FPTR/SPTR in the response packet.

Additional Info 646—If the "Session Partner" 621 cannot comply with the Additional Info section (as sent in the request packet) for this session, it may update the Additional Info section accordingly. Otherwise, it may use the same Additional Info as in the request packet.

Figure 22:
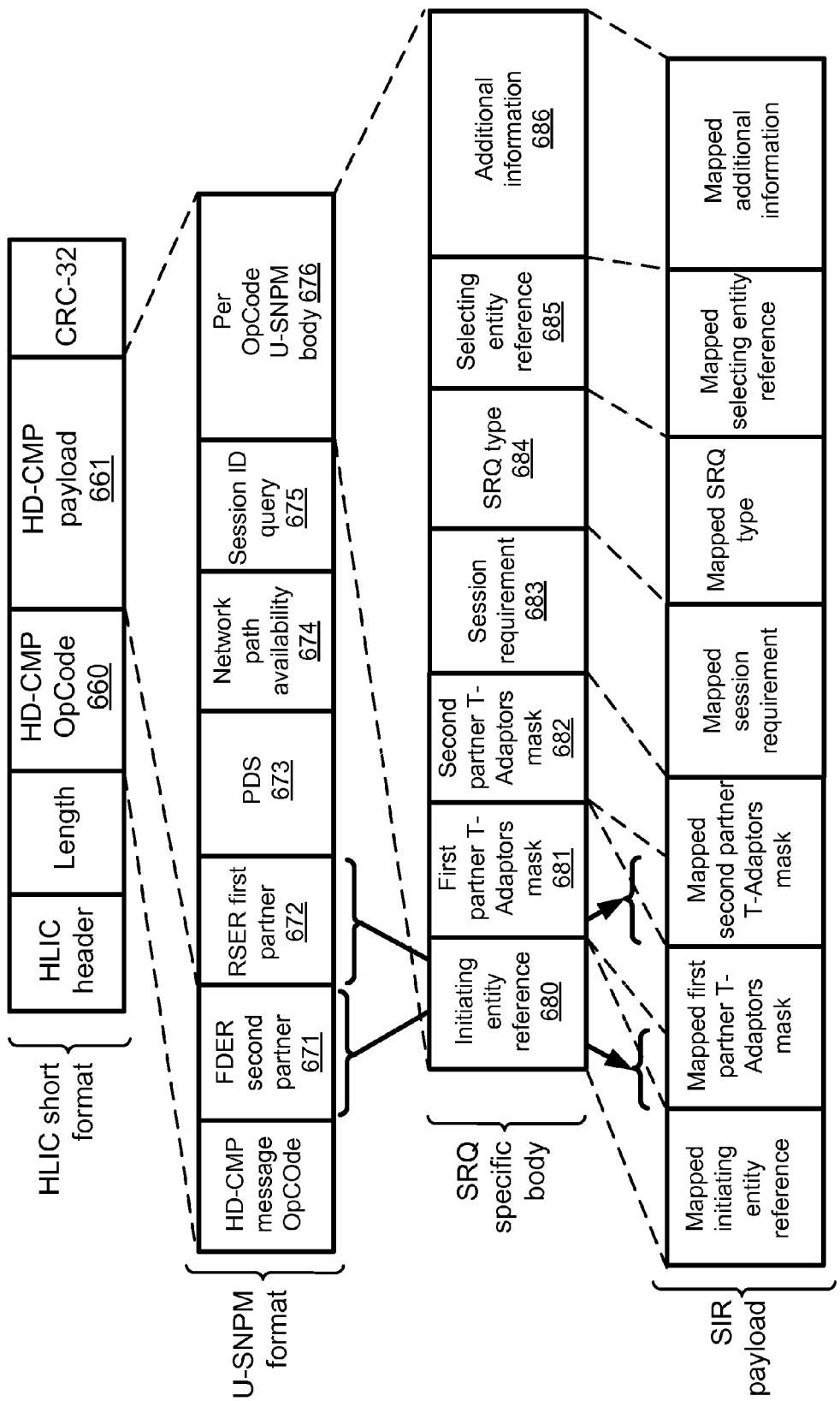
FIG. 22 illustrates one embodiment of a Session Route Query message.

In one embodiment, Session Route Query messages are sent from the "First Partner" to the "Second Partner", using U_SNPM messages. These messages may be sent using short form HLIC encapsulation to reduce their latency and network overhead. FIG. 22 illustrates one embodiment of a Session Route Query message format with its mapping to HLIC packet and to the SIR message whose initiate it. In FIG. 22, HD-CMP OpCode 660 comprises some or all of: (1) Prefix—The message is a U_SNPM and may set the first OpCode's byte accordingly. (2) U_SNPM Type marking the SRQ U_SNPM type. (3) U_SNPM Mod—The SRQ message may be sent according to some bits of the SIR's SRQ Type field. (4) U_SNPM Dir—The SRQ message may be sent according to some bits of the SIR's SRQ Type field.

HD-CMP payload 661 has one or more information packets which respond to the SRQ. The second layer of FIG. 22 is U-SNPM format. FDER second partner 671 is a FDER field that may contain N bytes of the "Second Partner" (Device ID: TPG). RSER first partner 672 is a RSER field that may contain N bytes of "First Partner" (Device ID: TPG). PDS 673 may initialize a PDS with N entries and fill the first entry with its own info. Each propagating entity may properly update the PDS. NPA 674 Network path availability 674: The First Partner may initialize a NPA. Each propagating entity may properly update the NPA. SQI 675 Session ID Query: The First Partner may initialize a full SIQ section (N bytes). Each propagating entity may properly update the SIQ. Per OpCode U-SNPM body 676 is a U-SNPM format field blownup in the next layer of FIG. 22.

SRQ specific body is a blowup 676, including: Initiating Entity Reference (IER) 680—may be the same as in the SIR request packet. First Partner T-Adaptors Mask (FPTM) 681 An N byte field which may convey the "First Partner" T-Adaptors Type Mask, such that the full reference of RSER:FPTM may be the full reference for the "First Partner" T-Adaptors entities, participating in this session (equal to the FPTR field as sent in the SIR response). Second Partner T-Adaptors Mask (SPTM) 683—An N byte field which may convey the "Second Partner" T-Adaptors Type Mask, such that the full reference of FDER:SPTM may be the full reference for the "Second Partner" T-Adaptors entities, participating in this session (equal to the SPTR field as sent in the SIR response). Session Requirements 683—An N byte field which may convey the updated session requirements as sent by the SIR. Note that these requirements may have been updated by the first partner. This field may travel intact to the FDER and it might not be used by any SDME to stop the propagation (in the case that the NPA+SR is bigger than the limit). SRQ Type 684—N LSBs may be the same as in the SIR request packet. M MSBs may be used to indicate Cross-PSU violation (XPSU). These bits may denote the PDS entry index of the propagating entity which discovered the violation. Selecting Entity Reference 685—may be the same as in the SIR request packet. Additional Info 686—may be the same as in the SIR response packet.

In the case of Session Duplication, the First Partner may update the "Duplication Properties", and when propagating a SRQ message each SDME may perform the following 'best path' validity checks.

In one embodiment, per each received 'Best Path' SRQ message, each propagating SDME may update the SRQ NPA, and may compute the additional effect of this session's PSU requirements on the path from the first partner to the next hop. If this computation results in violation of the Full Path PSU budget (DS or US), if there is no available throughput in at least one direction, then the propagating SDME may convert the message to an 'All Ports' SRQ message and may propagate it accordingly. The SDME may compute the additional effect of this session PSU requirements, per direction, using the following (in which "TSR" denotes This Session Requirements as in the SR sub-field at the proper direction): (1) Additional_P1_PSU=TSR_P1_PSU+(TSR_P2_PSU+ TSR_P3_PSU)*PDS_OCC_Count: For a victim P1 packet, This Session P1 streams interferes only once in the path while This Session Priority 2 and 3 streams may re-interfere with P1 packet at each SDME. (2) Additional_P2_PSU= (TSR_P2_PSU+TSR_P3_PSU)*PDS_OCC: This Session Priority 2 and Priority 3 streams may re-interfere with the victim P2 packet at each SDME. (3) Additional_P3_PSU=TSR_P3_PSU: For a victim P3 packet, This Session P3 streams may interfere only once in the path.

In one embodiment, per each received SRQ message, each propagating SDME may compute the additional effect, of this session's PSU requirements, on the remaining path from this SDME to the target edge SDME using its "Best Port" stored Best_PDS_OCC_Count (number of remaining hops on the best path) and stored NPA. If this computation results in violation of the Full Path PSU budget (DS or US), or if there is no available throughput in at least one direction for the remaining path, the propagating SDME may convert the message to 'All Ports' SRQ and may propagate it accordingly. The SDME may compute the additional effect of this session PSU requirements, per direction, using the following (in which "TSR" denotes This Session Requirements as in the SR sub-field at the proper direction): (1) Additional_P1_PSU=TSR_P1_PSU+(TSR_P2_PSU+ TSR_P3_PSU)*Best_PDS_OCC_Count: For a victim P1 packet, This Session P1 streams interferes only once in the path while This Session Priority 2 and 3 streams may re-interfere with P1 packet at each SDME. (2) Additional_P2_PSU=(TSR_P2_PSU+TSR_P3_PSU)*Best_PDS_OCC: This Session Priority 2 and Priority 3 streams may re-interfere with the victim P2 packet at each SDME. (3) Additional_P3_PSU=TSR_P3_PSU: For a victim P3 packet, This Session P3 streams may interfere only once in the path.

In one embodiment, per each received SRQ message with a zero XPSU sub-field in the SRQ Type field, each propagating SDME may update the SRQ PDS according to the propagation port and detect if the additional effect, of this session's PSU requirements, on each of the other sessions using the same propagation port, will cause this other session to violate the Full Path PSU budget (DS or US). If such violation is detected, the propagating SDME may update accordingly the XPSU sub-field in the SRQ Type field, convert (if needed) the message to 'All Ports' SRQ and may propagate it accordingly. Per such "other session" the SDME may use its, per session, stored Full_Path_NPA and stored Full_Path_PDS. The SDME may compute the additional effect as follows (wherein "TSR" denotes This Session Requirements as in the SR sub-field at the proper direction and OSHC denotes the number of hops shared between the new session's updated PDS and the other session's FULL_PATH_PDS): (1) Additional_P1_PSU=TSR_P1_PSU+(TSR_P2_PSU+ TSR_P3_PSU)*OSHC: For a victim P1 packet, This Session P1 streams interferes only once in the path while This Session Priority 2 and 3 streams may re-interfere with P1 packet at each SDME. (2) Additional_P2_PSU=(TSR_P2_PSU+ TSR_P3_PSU)*OSHC: This Session Priority 2 and Priority 3 streams may re-interfere with the victim P2 packet at each SDME. (3) Additional_P3_PSU=TSR_P3_PSU: For a victim P3 packet, This Session P3 streams may interfere only once in the path.

If the SDME is the first SDME in the SRQ path it may also perform this check for the other sessions of the SRQ's incoming port.

Session Routing.

Figure 23:
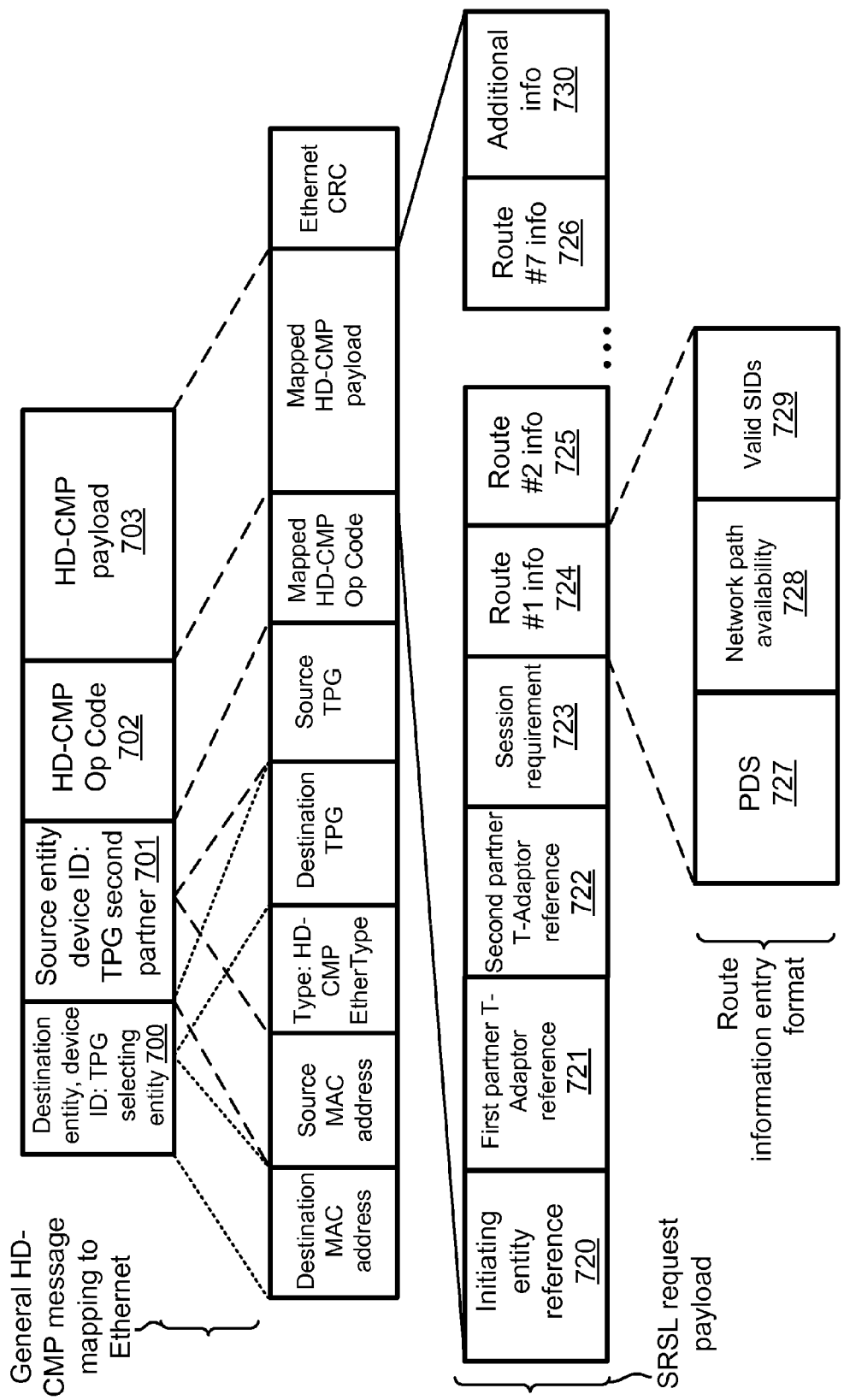
FIG. 23 illustrates one embodiment of the Session Route Select Request message.

In one embodiment of the Multimedia Network, Session Route Select Request messages are sent from the "Second Partner" to the "Selecting Entity" using Direct HD_CMP messages typically over Ethernet. FIG. 23 illustrates one embodiment of the Session Route Select Request message format with its mapping to Ethernet packet. Destination entity, device ID: TPG selecting entity 700: Destination Entity Reference: The "Selecting Entity" reference is the destination entity for this message. Source entity device ID: TPG second partner 701: The "Second Partner" management entity reference is the source entity for this message. HD-CMP OpCode 702 includes: (1) Prefix (not an SNPM message); (2) Request/Response Bit Flag—marking request/response and may be zero to mark request packet; (3) Routes Number—may convey the number of Route Info Entries transmitted with this message. The HD-CMP payload 703 is one or more information packets which respond to the SRQ.

HD-CMP payload 703 includes: Initiating Entity Reference (IER) 720: may be the same as in the SRQ packets. First Partner T-Adaptor Reference (FPTR) 721—A reference (Device ID: TPG: T-Adaptors Type Mask) which may hold the full reference for the T-Adaptors entities, at the first partner device, to be participating in this session. Second Partner T-Adaptors Reference (SPTR) 722—A reference (Device ID: TPG: T-Adaptors Type Mask) which may hold the full reference for the T-Adaptors entities, at the second partner device, to be participating in this session. Session Requirement 723: A field with the same format as the NPA conveying the session requirements in terms of available throughput and PSU budget from the sub network path. Routes Info Entries, including Route #1 724, Route #2 725, and Route #7 726: A vector of Route Info Entries which may contain number of entries as listed in the OpCode's 'Routes Number' sub field. Each Route Entry may represent an incoming SRQ and may contain the following fields. PDS 727: A field which may contain only the occupied PDS entries as received with the SRQ. NPA 728: A field which may contain the NPA as received with the SRQ. Valid SIDs 729: A field which may contain one or two optional valid SID for this route, generated by the "Second Partner" from the SIQ it received with the SRQ. If it cannot find even one valid SID the "Second Partner" may discard such route and might not send it in the SRSL Request. If only one valid SID can be found, the first byte may contain the valid SID and the second may be zero. Additional Info 730: may be the same as in the SRQ packets.

Figure 24:
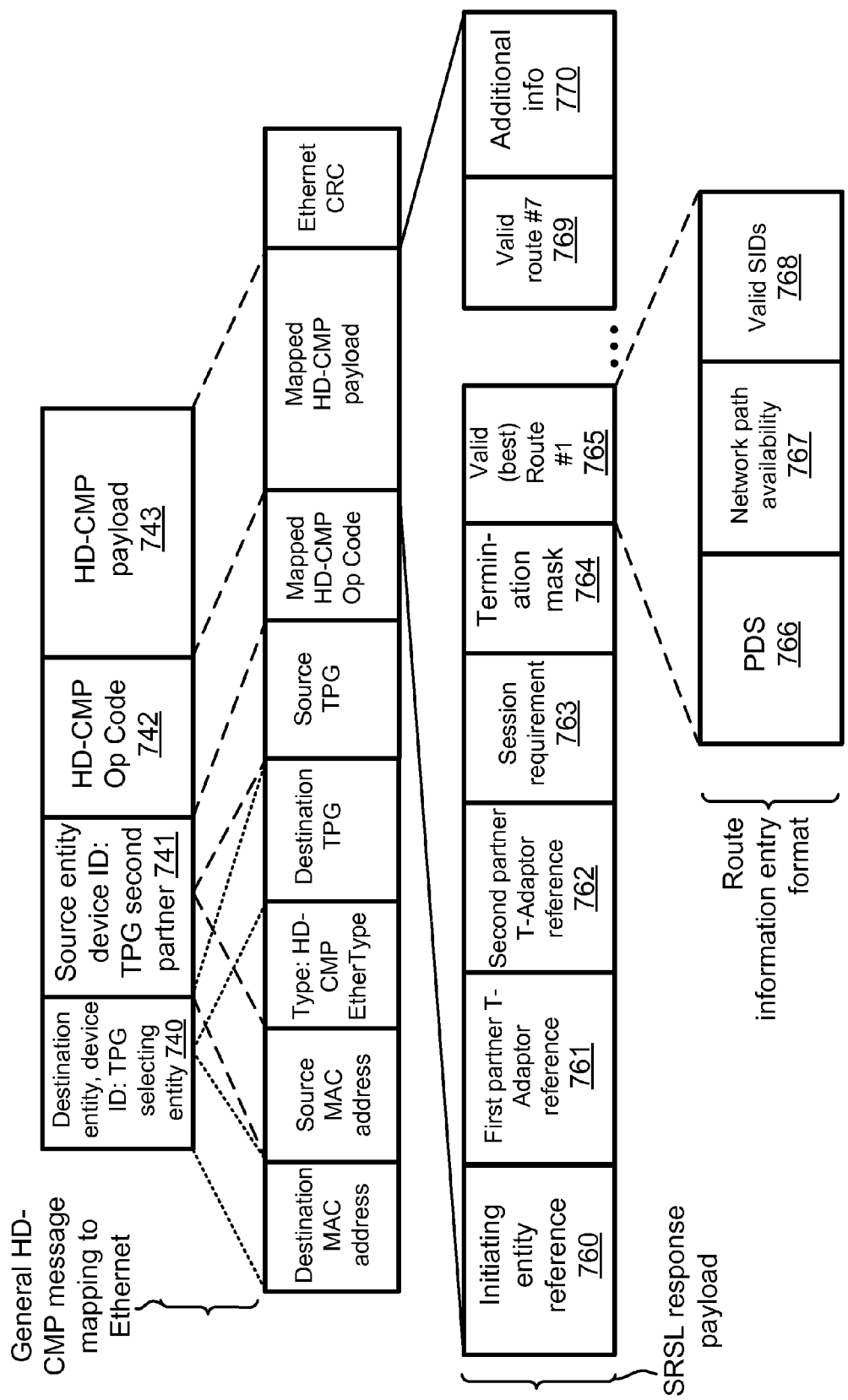
FIG. 24 illustrates one embodiment of the Session Route Select Response message.

In one embodiment, Session Route Select Response messages are sent from the "Selecting Entity" or an RPE to the "Second Partner" using Direct HD_CMP messages typically over Ethernet. The "Selecting Entity" may send several valid routes prioritized such that the first route is the best and the last is the worst, but all of these routes may be valid for this session. The "Second Partner" may use these alternative routes if it cannot set the best route. FIG. 24 illustrates one embodiment of the Session Route Select Response message format with its mapping to Ethernet packet:

Destination entity, device ID: TPG selecting entity 740: The "Second Partner" management entity reference is the destination entity for this message. Source entity device ID: TPG second partner 741: The "Selecting Entity" reference is the source entity for this message. HD-CMP OpCode 742 includes: (1) Prefix (not an SNPM message). (2) Request/Response Flag—marking request/response. (3) Routes Number—may convey the number of Valid Routes Info Entries transmitted with this message. HD-CMP payload 743 is one or more information packets which respond to the SRQ. HD-CMP payload is mapped to Mapped HD-CMP payload, which is blown up in the third layer of FIG. 24.

Initiating Entity Reference (IER) 760: May be the same as in the SRSL request packet. First Partner T-Adaptor Reference (FPTR) 761: A reference (Device ID: TPG: T-Adaptors Type Mask) which may hold the full reference for the T-Adaptors entities, at the first partner device, to be participating in this session. Second Partner T-Adaptors Reference (SPTR) 762: A reference (Device ID: TPG: T-Adaptors Type Mask) which may hold the full reference for the T-Adaptors entities, at the second partner device, to be participating in this session. Session Requirements 763: A field with the same format as the NPA conveying the session requirements in terms of available throughput and PSU budget from the sub network path. Note that the "Selecting Entity" may change this field value from what was transmitted in the request message, therefore the value conveyed in the response message may be used for setting the session. Termination Mask 764: A field indicating which termination errors may be ignored during the SRST stage. Routes Info Entries, including Route #1 765, and Route #7 769: A vector of Route Info Entries which may contain number of entries as listed in the OpCode's 'Routes Number' sub field. Each Route Entry may represent an incoming SRQ and may contain the following fields. PDS 766: A field which may contain only the occupied PDS entries as received with the SRQ. NPA 767: A field which may contain the NPA as received with the SRQ. Valid SIDs 768: A field which may contain one or two optional valid SID for this route, generated by the "Second Partner" from the SIQ it received with the SRQ. If it cannot find even one valid SID the "Second Partner" may discard such route and might not send it in the SRSL Request. If only one valid SID can be found, the first byte may contain the valid SID and the second may be zero. Additional Info 770: may be the same as in the SRQ packets.

The SRSL Response may also be used by the "Second Partner" to notify the "First Partner" and the "Initiating Entity" that the SRQ attempt failed to find a valid route for this session. In this case the "Second Partner" may zero the OpCode's 'Routes Number' sub field.

In one embodiment, Session Route Set messages are sent from the "Second Partner" to the "First Partner", using U_SNPM messages. These messages may be sent using short form HLIC encapsulation to reduce their latency and network overhead. Each intermediate SDME propagating this message may activate this session and reserve its resources until it is terminated. When a PDME/SDME cannot activate this session, it may respond with a Session Route Terminate U_SNPM message targeting the initiator of the SRST (Second Partner) to notify each node on the way that this session is terminating. This one embodiment is a way of using SMPM for distributed routing. One message travels through the nodes in the path with the required resources, instead of sending multiple messages. The message also defines the ports and session ID. If there is a problem, and after calculating the path, it may be understood that it is impossible to use a particular path (possibly because another path using the same ID was calculated at the same time), in which case the message might be terminated. Elements of this embodiment may include: (1) HD-CMP OpCode, with (a) Prefix—The message is a U_SNPM and may set the first OpCode's byte accordingly; (b) U_SNPM Type—may be '1' indicating a SRST U_SNPM type; (c) U_SNPM Mod—May be set to 'By PDS'; and (d) U_SNPM Dir—The "Second Partner" may set the Dir sub field properly. (2) FDER—The FDER field may contain the full TPG reference (Device ID: TPG) of the "First Partner". (3) RSER—The RSER field may contain the full TPG reference (Device ID: TPG) of the "Second Partner". (4) PDS—The Second Partner may properly initialize the PDS to the selected route using only the occupied entries. If needed it may mark backward PDS by setting Occ Count sub field to negative value. (5) NPA—The Second Partner may initialize a NPA each propagating entity may properly update the NPA. (6) SIQ—The Second Partner may initialize an empty SIQ section. The rest of the bits are reused for a Termination Cause Mask indicating which termination errors may be ignored during the SRST stage. (7) Initiating Entity Reference (IER)—Reference to the Session Initiating Entity. (8) First Partner T-Adaptors Mask (FPTM)—A field which may convey the "First Partner" T-Adaptors Type Mask, such that the full reference of FDER:FPTM may be the full reference for the "First Partner" T-Adaptors entities participating in this session. (9) Second Partner T-Adaptors Mask (SPTM)—A field which may convey the "Second Partner" T-Adaptors Type Mask, such that the full reference of RSER:SPTM may be the full reference for the "Second Partner" T-Adaptors entities. (10) Session Requirements—A field which may convey the updated session requirements. These requirements may be committed by each node on the path. (11) SID—A field which may convey the new Session ID to be use by each node on the path, until the session is terminated. (12) Full Path NPA—A field sent by the Second Partner indicating the NPA of the selected route with the effect of the new session. It is calculated by adding to the selected route NPA (as received in the SRSL response or in the selected SRQ when there is no "Selecting Entity") the following quantities (TSR denotes This Session Requirements as in the SR sub-field at the proper direction): (a) Additional_P1_PSU=TSR_P1_PSU+ (TSR_P2_PSU+TSR_P3_PSU)*PDS_Max_Count: For a victim P1 packet, This Session P1 streams interferes only once in the path while This Session Priority 2 and 3 streams may re-interfere with P1 packet at each SDME. (b) Additional_P2_PSU=(TSR_P2_PSU+TSR_P3_PSU) *PDS_Max_Count: This Session Priority 2 and Priority 3 streams may re-interfere with the victim P2 packet at each SDME. (c) Additional_P3_PSU=TSR_P3_PSU: For a victim P3 packet, This Session P3 streams may interfere only once in the path. (13) Additional Info—may be the same as in the SRQ packet.

Session Status. In one embodiment, Session Status Messages are Direct HD-CMP messages used by CPs and SDMEs to discover sessions and to exchange their status information. These messages are used in the following cases: (1) Periodic Session Status Notification: When CPs exists in the network, the Edge SDMEs may periodically send, at the same period as their periodic SNPMs, Partial Session Status Notify messages which contain its "related sessions" (the sessions which this Edge SDME is or directly-attached-to the "First Partner" entity, of these sessions). The messages may be sent using unicast or broadcast according to the number of active CP's in the network. (2) Event basis (update) Session Status Notification: Whenever the status of a related session is changed, the Edge SDME may send a unicast/broadcast, full, Session Status Notify message according to the number of active CP's in the network. Upon the detection of a newly attached CP which is the first CP, known to a certain Edge SDME, the Edge SDME may generate a unicast full Session Status Notify message which includes its related sessions. (3) Request/Response basis Status exchange: A device requests from another device some/all of its related sessions status. For PDME related sessions means the sessions this PDME is participating in, for SDME, related sessions means the sessions which are routed through one of its ports, and for CP all sessions are related. For example a newly attached CP requests the session status of sessions in the network from another CP. In response to that session status request, the CP sends the session status information of the sessions that it has discovered.

In one embodiment, there is a Session Status Request message format, with its mapping to an Ethernet packet, and comprising the following: (1) Destination Entity Reference for this message. (2) Source Entity Reference for this message. (3) Number of Sessions field conveying the number of requested SID entries provided in this packet. Per supplied SID, the requester expects to receive the proper sessions status information. (4) SID Entries—A vector of SID Entries which may contain a number of entries as listed in the 'Number of Sessions' field. Each SID Entry may specify a session reference, related to the destination entity reference, for status retrieval. Note that the destination entity supplied reference includes the TPG field which allows the requesting entity to specify: (a) A certain T-Group with in a Port Device (TPG=Port ID: T-Group ID): Sessions related to this T-Group instance; (b) A certain port device (TPG=Port ID: Zeroed T-Group ID): Sessions routed through this port devices; (c) All sessions related to the specified device (TPG=0); (5) Optionally, when requesting sessions information, the supplied destination reference includes the TPG field to enable referencing a PDME with no Ethernet termination.

In one embodiment, a Session Status Response messages may be sent as a response for an SSTS request or whenever there are changes in the sessions' status. The message is a Direct Broadcast/Unicast HD-CMP message typically sent over Ethernet. The following use cases are an example for SSTS response usage: (1) "First Partner" broadcast newly created session. (2) "Session Partner" broadcast terminated session. (3) SDME is responding to a CP SSTS request. (4) CP is responding to another CP SSTS request.

In one embodiment, there is an SSTS Response message format with its mapping to Ethernet packet, including some or more of the following elements: (1) Destination Entity Reference: May contain the requesting management entity or Ethernet Broadcast address with zero TPG to broadcast this status to the CPs in the network. (2) Source Entity Reference: The management entity, sending this response, reference. (3) Type/Number of Sessions—A field conveying the SSTS Type of this Response/Notify packet (full or partial as defined above in the SSTS Request packet) and the number of sessions reported in this message. (4) Session Status Entries—The rest of the payload may be a vector of session status entries which may contain the number of entries as listed in the 'Number of Sessions' field. Each Entry may contain the following fields: (a) SID field which may contain the SID for this session entry; (b) Session Status—A bit map field which may convey the status code of the session; (c) Initiating Entity Reference (IER)—Reference to the Session Initiating Entity; (d) First Partner T-Adaptors Reference (FPTR)—A reference (Device ID: TPG: T-Adaptors Type Mask) which may hold the updated full reference for the T-Adaptors entities, at the first partner device, to be participating in this session; (e) Second Partner T-Adaptors Reference (SPTR)—A reference (Device ID: TPG: T-Adaptors Type Mask) which may hold the updated full reference for the T-Adaptors entities, at the second partner device, to be participating in this session; (f) Committed Session Requirements field with the same format as the NPA conveying the updated committed session requirements in terms of available throughput and PSU budget from the sub network path; (g) Actual Session Requirements field with the same format as the NPA conveying real time measurements of the actual network resources usage by the session. (h) DS Input Port ID field conveying the DS input port ID of the reporting device used for this session. The SDME may fill this field with valid port ID according to the 'DS' flag in the session status field. In the case 'DS' bit is zero the SDME may choose each of the two ports, involved with this session, to be marked as 'Input Port ID'; (i) DS Output Port ID field conveying the DS output port ID of the reporting device used for this session. The SDME may fill this field with valid port ID according to the 'DS' bit in the session status field. In the case 'DS' bit is zero the SDME may choose the 'other port' (not the one marked as 'Input') of the two ports, involved with this session, to be marked as 'Output Port ID'; (j) Full Path NPA—An M byte field indicating the NPA of the session route; (k) PDS field which may contain only the occupied PDS entries, conveying this session PDS. This field may be allocated only when the 'PD' bit in the session status field is set to one; and (l) Additional Info—Specifies the Additional Info for the session.

In one embodiment, this section may be built by the packet generator populated with proper fields according to the type of Notify/Response transaction: (1) Full Response/Notify With PDS—May include the above specified fields; (2) Full Response/Notify Without PDS—May include the above specified fields except the PDS; (3) Partial Response/Notify—May include, per session status entry, only the first five fields (up to, not including, the 'Committed SR' field). (4) Periodic—Edge SDMEs may report, using a partial Notify message, for each session which the Edge SDME or one of its directly connected devices is the "First Partner" for this session. (5) Update—Upon a change in a session properties (excluding minor changes in 'Actual SR' field) such change may be reported using partial/full Notify with/without PDS message according to the context (for example for terminated session a partial notify is sufficient, for newly session creation a full notify with PDS is needed). (6) Response to a request—may contain only the relevant SID entities as were requested in the request message: (a) Request for specific T-Group: If the request was for a specific T-Group info within a specific port device, the message may contain only that TPG related sessions. (b) Request for specific Port Device: If the request was for a specific Port Device (TPG=non-zero Port ID with zero T-Group ID) within a specific device, the message may contain only that Port related sessions. (c) Request for specific Device: If the request was for a specific Device and zero TPG, the message may contain the sessions related to that device. (d) Request for Unknown SID: If a device/port/T-Group (A) was requested to provide info of a session with SID (B) and the (B) session is not known or is unrelated to device/port/T-Group (A), Device (A) may send a response message, with the 'UN' bit of the 'Session Status' field of the Session Status associated with SID (B) set to one with the rest of the Session Status entry omitted (only the SID and the Session Status fields may exist); (e) Request for the related sessions: If the 'Number of Sessions' field in the request message was zero, it means that the related sessions may be reported. The 'Related Devices' include: (i) The sessions routed through the responding entity; (ii) If the responding device is a CPME the related sessions are the sessions which are known to this CPME.

In one embodiment, when the "First Partner" receives a successful SRST, it may broadcast a full SSTS Response to inform the CPs in the network about the newly created session. The message may be directed to broadcast Ethernet MAC address, may contain only one session status entry (the new one), may set the 'NW' bit in the session status field and may provide the PDS for the new session.

Session Maintenance and Termination.

In one embodiment, each session partner may send periodically a 'by PDS' Session Maintenance Unicast SNPM (SMU) encapsulated using a short form HLIC packet. The SMU message updates the session's descriptors at each intermediate node along the session's path and keeps the session active. The period between transmissions of consecutive SMU messages (of the same session) may be no longer than smu_period. Upon detection of a change in a session the session partner may send an SMU message. If a session partner does not receive an SMU message from the other session partner for a smu_aging_time it may regard the session as terminated and send an SSTS termination message to the other Partner and the Initiating Entity. If a SDME does not receive a SMU message from a certain direction (for a certain session) for a smu_aging_time, it may regard the session as terminated. The information conveyed in the SMU may be used by the message receivers to update their Session Descriptors.

In one embodiment, the Multimedia Network may have an SMU message format with its mapping to a short form HLIC packet, including the following elements: (1) FDER—The FDER field may contain the full TPG reference (Device ID: TPG) of the target partner. (2) RSER—The RSER field may contain the full TPG reference (Device ID: TPG) of the sender partner. (3) PDS—The sender may properly initialize the PDS to the selected session route using only the occupied entries. If needed it may mark backward PDS by setting Occ Count sub field to negative value. (4) NPA—The Second Partner may initialize a NPA each propagating entity may properly update the NPA. (5) SIQ—The partner may initialize an empty SIQ section. (6) SID—A field which may convey the Session ID. (7) Session Properties—A bit map field which may convey properties of the session and message. (8) First Partner T-Adaptors Mask (FPTM)—A field which may convey the "First Partner" T-Adaptors Type Mask, such that the full reference of FDER:FPTM if the sender is the Second Partner (SP bit of Session Properties is 1) or RSER:FPTM if the sender is the First Partner (SP bit of Session Properties is 0) may be the full reference for the "First Partner" T-Adaptors entities participating in this session. (9) Second Partner T-Adaptors Mask (SPTM)—A field which may convey the "Second Partner" T-Adaptors Type Mask, such that the full reference of FDER:FPTM if the sender is the First Partner (SP bit of Session Properties is 0) or RSER:FPTM if the sender is the Second Partner (SP bit of Session Properties is 1) may be the full reference for the "Second Partner" T-Adaptors entities participating in this session. (10) Partner Committed Session Requirements—An field with the same format as the US/DS Path Availability conveying the updated committed session requirements in terms of available throughput and PSU budget from the sub network path in the direction going out of the message sender. (11) Partner Actual Session Requirements—A field with the same format as the US/DS Path Availability conveying real time measurements of the actual network resources usage by the session in the direction going out of the message sender. This field may be valid only if the 'AC' bit is set to one in the session properties field. (12) Full Path NPA—A J byte field indicating the NPA of the session route. (13) Additional Info—Specifies the Additional Info for the session.

In one embodiment, control functions may request the initiation of an active session termination process by sending Session Termination Request message to the Session Partners. Session Partners may initiate the termination process by sending STU to the session path. The devices along the session path including the partners may terminate the session upon reception of a STU. Switch devices (which are not partners) along the session path, might not terminate active sessions as a result of a Session Termination Request, they may initiate a termination process when they can no longer support the session (for example when their direct link, which is part of the session, is lost). In these cases, the switch devices may send STU to each port which is still part of the session, targeting the relevant session partner, to inform the rest of the path of the session termination. When a switch device is aging out an active session due to a lack of SMU messages it may also notify the session path by sending STUs.

In one embodiment, Session Termination U_SNPM messages may be sent in order to inform the devices along the session path that this session is terminating. The message may target a session partner and the generator of the message may be the other session partner or one of the intermediate SDMEs along the path. These messages may be sent using short form HLIC encapsulation to reduce their latency and network overhead. The sender and each intermediate SDME propagating this message may free the committed resources attached with this session upon message transmission and the destination partner may free the session resources upon reception of the message. One advantage of this embodiment is if a message is terminated and one link falls, each node in the path saves the network path, and each node connected to the fallen link notifies backwards. In this way, the nodes will be notified that the session has been terminated. Another advantage of this embodiment is in a situation that arises when a termination message has been lost, while there is a commitment for the session. It would be desirable in this case not to hold the termination message longer than necessary. Thus the system sends a session maintenance message to identify cases where the session was lost and no session maintenance message was received (that is, when the maintenance message is not received, the switch terminates the session).

In one embodiment, the STU message format may have its mapping to HLIC packet, including the following elements: (1) FDER—The FDER field may contain the full TPG reference (Device ID: TPG) of the target partner. (2) RSER—The RSER field may contain the full TPG reference (Device ID: TPG) of the sender. (3) PDS—The sender may properly initialize the PDS to the selected session route using only the occupied entries. If needed it may mark backward PDS by setting Occ Count sub field to negative value. (4) NPA—The Second Partner may initialize a NPA each propagating entity may properly update the NPA. (5) SIQ—The Second Partner may initialize an empty SIQ section. (6) SID—A field which may convey the terminating Session ID. (7) Termination Cause Code—A bit map field which may convey the session termination cause code, including some or all of the following: (a) 'TA'—May be set to one, by a session partner, if TPG or T-Adaptors type mask or Adaptor Info is not valid (for example one of the listed T-Adaptors cannot participate); (b) 'SR'—May be set to one, by a session partner, if Session Requirements are too low; (c) 'PA'—May be set to one, by a SDME, if Session Requirements are too high for this path availability; (d) 'ID'—May be set to one, as a response to SRST, if session ID is not valid; (e) 'PD'—May be set to one, by a SDME, if the PDS is not valid anymore, for example when topology changes; (f) 'RS'—Reserved. May be cleared to zero when transmitted and ignored upon reception; (g) 'ER'—May be set to one if there is a general error in one of the devices; (h) 'BR'—May be set to one, if the destination session partner may transmit a broadcast termination response to notify the CPs about this termination.

In one embodiment, the Multimedia Network may have a Session Termination Request message format with its mapping to an Ethernet packet, including some or more of the following elements: (1) Destination Entity Reference: The unicast destination entity for this message. The destination entity of a STR request may be a Partner in the session to be terminated. A non-Partner entity might not terminate a session. (2) Source Entity Reference for this message. (3) SID Entries—A vector of SID Entries which may contain a number of entries as listed in the 'Number of Sessions' field. Each SID Entry may specify a session reference, related to the destination entity reference, for termination. (4) Zero Padding—A zero padding field to ensure minimum Ethernet packet length will not be violated. (5) Note that when requesting sessions termination the supplied destination reference includes the TPG field to enable referencing a PDME with no Ethernet termination.

In one embodiment, the Multimedia System may have an STR Response message format with its mapping to an Ethernet packet, including some or all of the following elements: (1) Destination Entity Reference for this message. (2) Source Entity Reference for this message. (3) SID Entries—A vector of SID Entries which may contain a number of entries as listed in the 'Number of Sessions' field. Each SID Entry may contain the following fields: (a) SID—A field conveying the ID of the session that was requested to be terminated. (b) STR Error Code—A field conveying the Error Code of the termination attempt result, possibly with one or more of the following exemplified values: (i) 0—Success: STU was sent and termination process started, termination SSTS will mark the end of the process. (ii) 1—Unknown: Supplied SID is unknown to this entity. (iii) 2—Non Partner: This entity is not a Partner in any active session. (iv) 3—Reserved; (v) 4—Permission: SID exists but requesting entity does not have permission to terminate this session. (vi) 5—Lock: SID exists and was locked by its initiating entity. (vii) 6—General Error. (4) Zero Padding—A zero padding field to ensure minimum Ethernet packet length will not be violated.

In one embodiment, each management entity may maintain a knowledge base of session descriptors according to the following description of the Session Descriptor: (1) SID—A field which may contain the SID for this session entry. (2) Session Properties—A bit map field which may convey the properties of the session: (a) Dir—Defines the direction of the session from the First to the Second Partner with the same format as the Dir sub-field U-SNPM opcode; (b) The rest of the bits are reserved and may be zero. (3) Initiating Entity Reference (IER)—Reference to the Session Initiating Entity. (4) First Partner T-Adaptors Reference (FPTR)—A reference (Device ID: TPG: T-Adaptors Type Mask) to the session's First Partner device. (5) Second Partner T-Adaptors Reference (SPTR)—A reference (Device ID: TPG: T-Adaptors Type Mask) to the session's second partner device. (6) Committed Session Requirements—A field with the same format as the NPA conveying the updated committed session requirements in terms of available throughput and PSU budget from the sub network path. (7) Actual Session Requirements—A field with the same format as the NPA conveying real time measurements of the actual network resources usage by the session. (8) Full Path NPA—A field indicating the NPA of the session route. (9) PDS—A field conveying the session's PDS.

In one embodiment, each management entity may maintain a knowledge base regarding the Multimedia Network sessions according to the following, per entity, specification: (1) PDMEs—may maintain a knowledge base containing its sessions' descriptors and T-adaptor Additional Info. The knowledge is updated upon session creation (SRST), termination (STU, SSTS termination). (2) SDMEs—may discover and maintain a knowledge base containing descriptors of the session which have this SDME as part of their path. The knowledge base is updated upon session creation (SRST), maintenance (SMU) and termination (STU) or aging (lack of SMU). (3) CPMEs—may discover and maintain a knowledge base containing the sessions. The knowledge base is updated upon session creation and termination (SSTS). CPMEs might not store session's PDSs. (4) RPE—may conform to the CPME requirements, and store also PDSs.

In one embodiment, an optional RPE takes in account the latency variation when calculating the routing, according to some or all of the following criteria: (1) In order to support session routing, the link status may be monitored and optimal routes discovered according to the link status. (2) Link status routing is applied to implement Multimedia Network Session routing. RPE will send Link Status Request only to SDME. The SDME of a device which received Link Status Request may send its local connectivity information, Link Status, to RPEs of other devices in the same sub network. (3) One RPE may discover and interact with other RPE exchanging Routing Table Information. (4) A RPE of a device collects the link status updates, builds a complete network topology, and uses this topology to compute paths to the destinations. Because a RPE of a node has knowledge of the full network topology, there is minimal dependence among nodes in the routing computation. (5) The RPEs have complete topology information and link cost information by Link Status Notify packets. (6) The RPEs have the Link Status Table which represents global topology information and link cost information. The Link Status Table is built and updated by receiving the Link status Notify messages after sending Link Status Request. Link status includes TX port and RX port ID for indicating a specific Multimedia Network Link, bandwidth information and active session information. (7) HD-CMP or HD-CMP over HLIC is used to transfer session routing information which includes the following information types: (a) Link Status Notify; (b) Session Initiation Request and Session Initiation Response; (c) Session Route Request, Session Route Response; (d) Session Release Request and Session Release Response. (8) HD-CMP over HLIC is to allow an End node on the edge links of the sub network to exchange HD-CMP messages. (9) RPE or SDME of a device can compute the optimal path and Session routing information from a source to a sink based on link status information.

In this description, numerous specific details are set forth. However, the embodiments of the invention may be practiced without some of these specific details. In other instances, well-known hardware, software, materials, structures, and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, it is intended to embrace all such alternatives, modifications, and variations that fall within the spirit and scope of the appended claims and their equivalents.

What is claimed is:

1. A method for translating and conveying control channels between first and second legacy end-devices supporting first and second different legacy control formats respectively, the method comprising:
   discovering, by a network, the first and second legacy end-devices supporting the first and second legacy control formats, respectively;
   discovering, by the network, a third legacy end-device;
   wherein the network is not a mere point-to-point connection, and supports at least two different connectivity combinations between the first, second, and third legacy end-devices;
   spoofing, by the network, a first network view for the first legacy end-device to enable the first legacy end-device to communicate with both the second and third legacy end-devices over the network using the first legacy control format;
   spoofing, by the network, a second network view for the second legacy end-device to enable the second legacy end-device to communicate with both the first and third legacy end-devices over the network using the second legacy control format; and
   after receiving an indication that the first legacy end-device selected the second legacy end-device, converting a first legacy message generated by the first legacy end-device to a network message, conveying the network message over the network, and converting the network message to a second legacy message before forwarding it to the second legacy end-device; wherein the first legacy message, the second legacy message and the network message are different.

2. The method of claim 1, further comprising waiting for an indication of the first legacy end-device to select the second legacy end-device.

3. The method of claim 2, further comprising generating a session over the network between the first and second legacy end-devices.

4. The method of claim 3, wherein the session includes resource allocation.

5. The method of claim 4, wherein the resource allocation includes guaranteed bandwidth.

6. The method of claim 4, wherein the resource allocation sets a maximum number of interfering streams.

7. The method of claim 1, wherein the network message is a Multimedia Network Control and Management Protocol (HD-CMP) messages.

8. A method for translating and conveying control channels between at least three legacy end-devices supporting at least two different legacy control formats, the method comprising:
   discovering by a network, first, second, and third legacy end-devices coupled to the network, wherein the network is not a mere point-to-point connection and supports at least two different connectivity combinations between the first, second, and third legacy end-devices coupled to the network;
   spoofing, by the network, network views for the first, second, and third legacy end-devices to enable the first, second, and third legacy end-devices to communicate with each other over the network using their legacy control formats; wherein the legacy control formats of the first and second legacy end-devices are different;
   receiving a selection indication between the first and second legacy end-devices coupled to the network;
   determining that the network is able to guarantee required resources needed to connect between the first and second legacy end-devices;
   generating a session over the network between the first and second legacy end-devices;
   allocating the resources needed for the session; and
   after receiving an indication that the first legacy end-device selected the second legacy end-device, converting a first legacy message generated by the first legacy end-device to a network message, conveying the network message over the network, and converting the network message to a second legacy message before forwarding it to the second legacy end-device; wherein the first legacy message, the second legacy message and the network message are different.

9. The method of claim 8, further comprising transmitting the selection indication from the first legacy end-device to the second legacy end-device, over the network, by converting the legacy format of the first legacy end-device to the format supported by the network, and then converting the network supported format to the format supported by the second legacy end-device.

10. The method of claim 8, wherein the network message is a Multimedia Network Control and Management Protocol (HD-CMP) messages.

11. A network comprising:
- a network adaptor configured to utilize first and second different legacy control formats to communicate with first and second legacy end-devices, respectively, in order to discover the first and second legacy end-devices;
- the network adaptor further communicates with a third legacy end-device, utilizing a legacy control format appropriate to the third legacy end-device, in order to discover the third legacy end-device;
- wherein the network is not a mere point-to-point connection, and supports at least two different connectivity combinations between the first, second, and third legacy end-devices;
- a first spoofing adaptor configured to utilize a first network view for the first legacy end-device in order to enable the first legacy end-device to communicate with both the second and third legacy end-devices over the network using the first legacy control format; wherein the first network view comprises addresses appropriate to the first legacy control format;
- a second spoofing adaptor configured to utilize a second network view for the second legacy end-device in order to enable the second legacy end-device to communicate with both the first and third legacy end-devices over the network using the second legacy control format; wherein the second network view comprises addresses appropriate to the second legacy control format; and
- after receiving an indication that the first legacy end-device selected the second legacy end-device, converting a first legacy message generated by the first legacy end-device to a network message, conveying the network message over the network, and converting the network message to a second legacy message before forwarding it to the second legacy end-device; wherein the first legacy message, the second legacy message and the network message are different.

12. The network of claim 11, wherein the network message is a Multimedia Network Control and Management Protocol (HD-CMP) message.

13. The network of claim 12, wherein after receiving the indication the network generates a session over the network between the first and second legacy end-devices.

14. The network of claim 13, wherein the network sets a maximum number of interfering streams for the session between the first legacy end-device and the second legacy end-device.

15. The network of claim 13, wherein the network sets a guarantee bandwidth for the session between the first legacy end-device and the second legacy end-device.

16. The network of claim 15, wherein the network utilizes the guaranteed bandwidth in order to set a maximum number of interfering streams.

* * * * *